(12) United States Patent
Momma et al.

(10) Patent No.: US 11,728,478 B2
(45) Date of Patent: Aug. 15, 2023

(54) POSITIVE ELECTRODE ACTIVE MATERIAL INCLUDING IMPURITY ELEMENTS IN A CRYSTAL DEFECT OR A CAVITY

(71) Applicant: SEMICONDUCTOR ENERGY LABORATORY CO., LTD., Atsugi (JP)

(72) Inventors: Yohei Momma, Kanagawa (JP); Takahiro Kawakami, Kanagawa (JP); Teruaki Ochiai, Kanagawa (JP); Masahiro Takahashi, Kanagawa (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 0 days.

(21) Appl. No.: 16/917,190

(22) Filed: Jun. 30, 2020

(65) Prior Publication Data

US 2020/0373567 A1     Nov. 26, 2020

Related U.S. Application Data

(63) Continuation of application No. 16/900,108, filed on Jun. 12, 2020, which is a continuation of application
(Continued)

(30) Foreign Application Priority Data

Nov. 18, 2016   (JP) ................................. 2016-225046

(51) Int. Cl.
    *H01M 4/52*    (2010.01)
    *H01M 4/46*    (2006.01)
    (Continued)

(52) U.S. Cl.
    CPC ............ *H01M 4/466* (2013.01); *C01G 51/42* (2013.01); *H01M 4/131* (2013.01);
    (Continued)

(58) Field of Classification Search
    None
    See application file for complete search history.

(56) References Cited

U.S. PATENT DOCUMENTS

| 4,302,518 A | 11/1981 | Goodenough et al. |
| 4,668,595 A | 5/1987 | Yoshino et al. |

(Continued)

FOREIGN PATENT DOCUMENTS

| CN | 001346160 A | 4/2002 |
| CN | 001434527 A | 8/2003 |

(Continued)

OTHER PUBLICATIONS

Noboru Taguchi, Tomoki Akita, Kuniaki Tatsumi, Hikari Sakaebe, Characterization of MgO-coated-LiCoO2 particles by analytical transmission electron microscopy, Journal of Power Sources, vol. 328, 2016 p. 161-66. (Year: 2016).*

(Continued)

*Primary Examiner* — Lucas J. O'Donnell
(74) *Attorney, Agent, or Firm* — Fish & Richardson P.C.

(57) ABSTRACT

Provided is a positive electrode active material for a lithium ion secondary battery having favorable cycle characteristics and high capacity. A covering layer containing aluminum and a covering layer containing magnesium are provided on a superficial portion of the positive electrode active material. The covering layer containing magnesium exists in a region closer to a particle surface than the covering layer containing aluminum is. The covering layer containing aluminum can be formed by a sol-gel method using an aluminum alkoxide. The covering layer containing magnesium can be formed as follows: magnesium and fluorine are mixed as a starting material and then subjected to heating after the sol-gel step, so that magnesium is segregated.

5 Claims, 26 Drawing Sheets

Related U.S. Application Data

No. 15/800,184, filed on Nov. 1, 2017, now abandoned.

(51) Int. Cl.

| | | |
|---|---|---|
| *H01M 4/1391* | (2010.01) | |
| *H01M 4/62* | (2006.01) | |
| *H01M 4/36* | (2006.01) | |
| *C01G 51/00* | (2006.01) | |
| *H01M 4/525* | (2010.01) | |
| *H01M 4/131* | (2010.01) | |
| *H01M 10/0525* | (2010.01) | |
| *G01N 23/2273* | (2018.01) | |
| *H01M 4/02* | (2006.01) | |

(52) U.S. Cl.
CPC ......... *H01M 4/1391* (2013.01); *H01M 4/366* (2013.01); *H01M 4/525* (2013.01); *H01M 4/62* (2013.01); *H01M 4/625* (2013.01); *H01M 10/0525* (2013.01); *C01P 2002/00* (2013.01); *C01P 2002/85* (2013.01); *C01P 2004/04* (2013.01); *C01P 2006/40* (2013.01); *G01N 23/2273* (2013.01); *H01M 2004/028* (2013.01)

(56) References Cited

U.S. PATENT DOCUMENTS

| | | |
|---|---|---|
| 5,240,794 A | 8/1993 | Thackeray et al. |
| 5,443,929 A | 8/1995 | Yamamoto et al. |
| 5,576,608 A | 11/1996 | Nagai et al. |
| 5,604,396 A | 2/1997 | Watanabe et al. |
| 5,637,981 A | 6/1997 | Nagai et al. |
| 5,705,291 A | 1/1998 | Amatucci et al. |
| 5,783,333 A | 7/1998 | Mayer |
| 5,824,278 A | 10/1998 | Yao |
| 5,834,139 A | 11/1998 | Shodai et al. |
| 5,871,866 A | 2/1999 | Barker et al. |
| 5,910,382 A | 6/1999 | Goodenough et al. |
| 6,085,015 A | 7/2000 | Armand et al. |
| 6,127,065 A | 10/2000 | Yamamoto et al. |
| 6,218,050 B1 | 4/2001 | Yoon et al. |
| 6,277,521 B1 | 8/2001 | Gao et al. |
| 6,346,348 B1 | 2/2002 | Nakajima et al. |
| 6,458,487 B1 | 10/2002 | Takeuchi et al. |
| 6,514,640 B1 | 2/2003 | Armand et al. |
| 6,582,814 B2 | 6/2003 | Swiler et al. |
| 6,589,499 B2 | 7/2003 | Gao et al. |
| 6,680,143 B2 | 1/2004 | Thackeray et al. |
| 6,737,195 B2 | 5/2004 | Kweon et al. |
| 6,753,111 B2 | 6/2004 | Kweon et al. |
| 6,846,592 B2 | 1/2005 | Kweon et al. |
| 6,878,490 B2 | 4/2005 | Gao et al. |
| 6,919,144 B2 | 7/2005 | Miyazaki et al. |
| 6,974,601 B2 | 12/2005 | Kweon et al. |
| 6,984,469 B2 | 1/2006 | Kweon et al. |
| 7,018,741 B2 | 3/2006 | Suhara et al. |
| 7,138,209 B2 | 11/2006 | Kweon et al. |
| 7,294,435 B2 | 11/2007 | Miyamoto et al. |
| 7,303,840 B2 | 12/2007 | Thackeray et al. |
| 7,309,546 B2 | 12/2007 | Kweon et al. |
| 7,368,071 B2 | 5/2008 | Dahn et al. |
| 7,393,476 B2 | 7/2008 | Shiozaki et al. |
| 7,481,991 B2 | 1/2009 | Kawasato et al. |
| 7,504,180 B2 | 3/2009 | Tatsumi et al. |
| 7,635,536 B2 | 12/2009 | Johnson et al. |
| 7,709,148 B2 | 5/2010 | Kawasato et al. |
| 7,709,151 B2 | 5/2010 | Inoue et al. |
| 7,727,673 B2 | 6/2010 | Ooyama et al. |
| 7,736,807 B2 | 6/2010 | Hasegawa et al. |
| 7,790,308 B2 | 9/2010 | Johnson et al. |
| 7,892,679 B2 | 2/2011 | Shimizu et al. |
| 7,927,506 B2 | 4/2011 | Park |
| 7,935,270 B2 | 5/2011 | Park |
| 8,003,256 B2 | 8/2011 | Ohishi |
| 8,007,941 B2 | 8/2011 | Kweon et al. |
| 8,034,486 B2 | 10/2011 | Kweon et al. |
| 8,080,340 B2 | 12/2011 | Thackeray et al. |
| RE43,276 E | 3/2012 | Kweon et al. |
| 8,236,449 B2 | 8/2012 | Nakura |
| 8,394,534 B2 | 3/2013 | Lopez et al. |
| 8,470,477 B2 | 6/2013 | Miwa et al. |
| 8,475,959 B2 | 7/2013 | Venkatachalam et al. |
| 8,476,510 B2 | 7/2013 | Swager et al. |
| 8,535,832 B2 | 9/2013 | Karthikeyan et al. |
| 8,540,902 B2 | 9/2013 | Xing et al. |
| 8,557,440 B2 | 10/2013 | Yu et al. |
| 8,652,687 B2 | 2/2014 | Zhamu et al. |
| 8,685,569 B2 | 4/2014 | Oguni et al. |
| 8,685,570 B2 | 4/2014 | Miwa et al. |
| 8,709,654 B2 | 4/2014 | Takeuchi et al. |
| 8,741,485 B2 | 6/2014 | Lopez et al. |
| 8,753,532 B2 | 6/2014 | Levasseur et al. |
| 8,808,918 B2 | 8/2014 | Jung et al. |
| 8,877,377 B2 | 11/2014 | Hosoya |
| 8,877,381 B2 | 11/2014 | Yasuda et al. |
| 8,883,351 B2 | 11/2014 | Todoriki et al. |
| 8,906,547 B2 | 12/2014 | Taniguchi et al. |
| 8,927,148 B2 | 1/2015 | Kawakami |
| 8,945,770 B2 | 2/2015 | Koo et al. |
| 8,945,772 B2 | 2/2015 | Kawakami et al. |
| 8,951,448 B2 | 2/2015 | Toyama et al. |
| 8,993,167 B2 | 3/2015 | Chang et al. |
| 9,087,626 B2 | 7/2015 | Xing et al. |
| 9,105,926 B2 | 8/2015 | Fujiki et al. |
| 9,126,845 B2 | 9/2015 | Nagai |
| 9,225,003 B2 | 12/2015 | Yukawa |
| 9,227,850 B2 | 1/2016 | Ooishi |
| 9,293,236 B2 | 3/2016 | Kawakami et al. |
| 9,362,557 B2 | 6/2016 | Watanabe et al. |
| 9,385,366 B2 | 7/2016 | Yamakaji et al. |
| 9,391,322 B2 | 7/2016 | Liu et al. |
| 9,478,796 B2 | 10/2016 | Li et al. |
| 9,505,631 B2 | 11/2016 | Masukuni et al. |
| 9,515,313 B2 | 12/2016 | Umeyama et al. |
| 9,614,225 B2 | 4/2017 | Park |
| 9,666,326 B2 | 5/2017 | Kawakami et al. |
| 9,698,420 B2 | 7/2017 | Ishizaki et al. |
| 9,774,034 B2 | 9/2017 | Kawakami et al. |
| 9,786,903 B2 | 10/2017 | Ryu et al. |
| 9,812,702 B2 | 11/2017 | Ikeuchi et al. |
| 9,812,709 B2 | 11/2017 | Endoh et al. |
| 9,825,283 B2 | 11/2017 | Kim et al. |
| 9,871,246 B2 | 1/2018 | Kim et al. |
| 9,899,664 B2 | 2/2018 | Yamaki et al. |
| 9,923,244 B2 | 3/2018 | Takanashi et al. |
| 9,929,402 B2 | 3/2018 | Kawakami |
| 9,972,834 B2 | 5/2018 | Kong et al. |
| 10,026,960 B2 | 7/2018 | Lee et al. |
| 10,128,495 B2 | 11/2018 | Satow et al. |
| 10,141,567 B2 | 11/2018 | Choi et al. |
| 10,177,377 B2 | 1/2019 | Yu et al. |
| 10,243,215 B2 | 3/2019 | Shitaba et al. |
| 10,340,513 B2 | 7/2019 | Sugiura |
| 10,347,916 B2 | 7/2019 | Sun et al. |
| 10,361,432 B2 | 7/2019 | Takaichi et al. |
| 10,559,810 B2 | 2/2020 | Yanagihara et al. |
| 10,741,828 B2 * | 8/2020 | Ochiai ............... H01M 4/8657 |
| 10,777,815 B2 | 9/2020 | Kanada et al. |
| 2001/0010807 A1 | 8/2001 | Matsubara |
| 2002/0055042 A1 | 5/2002 | Kweon et al. |
| 2002/0071990 A1 | 6/2002 | Kweon et al. |
| 2002/0071991 A1 | 6/2002 | Kweon et al. |
| 2002/0102459 A1 | 8/2002 | Hosoya et al. |
| 2002/0110736 A1 | 8/2002 | Kweon et al. |
| 2002/0164156 A1 | 11/2002 | Bilbrey |
| 2002/0195591 A1 | 12/2002 | Ravet et al. |
| 2003/0104279 A1 | 6/2003 | Miyazaki et al. |
| 2003/0134186 A1 | 7/2003 | Shizuki |
| 2003/0138697 A1 * | 7/2003 | Leising ............... H01M 6/16 429/231.1 |
| 2004/0142241 A1 | 7/2004 | Nagayama |

(56) References Cited

U.S. PATENT DOCUMENTS

| | | |
|---|---|---|
| 2004/0229123 A1 | 11/2004 | Takahashi et al. |
| 2004/0229124 A1 | 11/2004 | Miyamoto et al. |
| 2004/0234857 A1 | 11/2004 | Shiozaki et al. |
| 2005/0019662 A1 | 1/2005 | Suhara et al. |
| 2006/0051671 A1 | 3/2006 | Thackeray et al. |
| 2006/0051673 A1 | 3/2006 | Johnson et al. |
| 2006/0068289 A1* | 3/2006 | Paulsen ............... H01M 4/131 429/231.1 |
| 2006/0121352 A1 | 6/2006 | Kejha et al. |
| 2006/0188780 A1 | 8/2006 | Fujii et al. |
| 2006/0210879 A1 | 9/2006 | Kawasato et al. |
| 2006/0263690 A1 | 11/2006 | Suhara et al. |
| 2006/0275664 A1 | 12/2006 | Ohzuku et al. |
| 2006/0286459 A1 | 12/2006 | Zhao et al. |
| 2007/0026315 A1 | 2/2007 | Lampe-Onnerud et al. |
| 2007/0099086 A1 | 5/2007 | Kang et al. |
| 2007/0117014 A1 | 5/2007 | Saito et al. |
| 2007/0122712 A1 | 5/2007 | Kang et al. |
| 2007/0148546 A1 | 6/2007 | Shimizu et al. |
| 2007/0160906 A1 | 7/2007 | Tooyama et al. |
| 2007/0212609 A1 | 9/2007 | Iwami |
| 2007/0224506 A1 | 9/2007 | Ooyama et al. |
| 2008/0131780 A1 | 6/2008 | Kawasato et al. |
| 2008/0166637 A1 | 7/2008 | Inagaki et al. |
| 2008/0241693 A1 | 10/2008 | Fukuchi et al. |
| 2009/0011335 A1 | 1/2009 | Takeda et al. |
| 2009/0017383 A1 | 1/2009 | Suhara et al. |
| 2009/0081547 A1 | 3/2009 | Nakura |
| 2009/0087731 A1 | 4/2009 | Fukui et al. |
| 2009/0104530 A1* | 4/2009 | Shizuka ............... C01G 53/50 429/223 |
| 2009/0104532 A1 | 4/2009 | Hosoya |
| 2009/0123813 A1 | 5/2009 | Chiang et al. |
| 2009/0123842 A1 | 5/2009 | Thackeray et al. |
| 2009/0220862 A1 | 9/2009 | Toyama et al. |
| 2010/0019194 A1 | 1/2010 | Fujiwara et al. |
| 2010/0035147 A1 | 2/2010 | Kotato et al. |
| 2010/0086854 A1 | 4/2010 | Kumar et al. |
| 2010/0129714 A1 | 5/2010 | Toyama et al. |
| 2010/0129715 A1 | 5/2010 | Saito et al. |
| 2010/0143784 A1 | 6/2010 | Johnson et al. |
| 2010/0143799 A1 | 6/2010 | Park |
| 2010/0159330 A1 | 6/2010 | Sugiura et al. |
| 2010/0178464 A1 | 7/2010 | Choi et al. |
| 2010/0216024 A1 | 8/2010 | Kanno et al. |
| 2010/0233542 A1 | 9/2010 | Endo et al. |
| 2010/0247986 A1 | 9/2010 | Toyama et al. |
| 2010/0248033 A1 | 9/2010 | Kumar et al. |
| 2010/0294985 A1 | 11/2010 | Suhara et al. |
| 2011/0020708 A1 | 1/2011 | Fujiki et al. |
| 2011/0033749 A1 | 2/2011 | Uchida et al. |
| 2011/0059367 A1 | 3/2011 | Morita et al. |
| 2011/0076564 A1 | 3/2011 | Yu et al. |
| 2011/0171371 A1 | 7/2011 | Li et al. |
| 2011/0200879 A1 | 8/2011 | Saito et al. |
| 2011/0229757 A1 | 9/2011 | Kawakami et al. |
| 2011/0244331 A1 | 10/2011 | Karthikeyan et al. |
| 2011/0256437 A1 | 10/2011 | Katsuki et al. |
| 2011/0269023 A1 | 11/2011 | Kawakami et al. |
| 2011/0297876 A1 | 12/2011 | Masukuni et al. |
| 2011/0300441 A1 | 12/2011 | Kawakami |
| 2012/0034516 A1 | 2/2012 | Koo et al. |
| 2012/0045692 A1 | 2/2012 | Takemura et al. |
| 2012/0058397 A1 | 3/2012 | Zhamu et al. |
| 2012/0064406 A1 | 3/2012 | Sato et al. |
| 2012/0064409 A1 | 3/2012 | Zhamu et al. |
| 2012/0088151 A1 | 4/2012 | Yamazaki et al. |
| 2012/0088156 A1 | 4/2012 | Nomoto et al. |
| 2012/0118149 A1 | 5/2012 | Dabrowski et al. |
| 2012/0244430 A1 | 9/2012 | Yamazaki et al. |
| 2012/0256337 A1 | 10/2012 | Yokoyama et al. |
| 2012/0258358 A1 | 10/2012 | Yura et al. |
| 2012/0258365 A1 | 10/2012 | Yokoyama et al. |
| 2012/0258369 A1 | 10/2012 | Yokoyama et al. |
| 2012/0261622 A1 | 10/2012 | Honma |
| 2012/0295163 A1 | 11/2012 | Yanagita et al. |
| 2012/0308891 A1 | 12/2012 | Todoriki et al. |
| 2012/0315544 A1 | 12/2012 | Yasuda et al. |
| 2012/0328951 A1 | 12/2012 | Hirohashi et al. |
| 2012/0328956 A1 | 12/2012 | Oguni et al. |
| 2012/0330044 A1 | 12/2012 | Hou |
| 2013/0004657 A1 | 1/2013 | Xu et al. |
| 2013/0017435 A1 | 1/2013 | Sato et al. |
| 2013/0040193 A1 | 2/2013 | Tsuchida et al. |
| 2013/0045418 A1 | 2/2013 | Oguni et al. |
| 2013/0052534 A1 | 2/2013 | Fujiki et al. |
| 2013/0052547 A1 | 2/2013 | Ogino et al. |
| 2013/0065120 A1 | 3/2013 | Miwa et al. |
| 2013/0078516 A1 | 3/2013 | Taniguchi et al. |
| 2013/0084384 A1 | 4/2013 | Yamakaji |
| 2013/0089786 A1 | 4/2013 | Jeong et al. |
| 2013/0130103 A1 | 5/2013 | Kim et al. |
| 2013/0134051 A1 | 5/2013 | Takahashi et al. |
| 2013/0156683 A1 | 6/2013 | Holzapfel et al. |
| 2013/0156942 A1 | 6/2013 | Yamakaji et al. |
| 2013/0157034 A1 | 6/2013 | Choi et al. |
| 2013/0164619 A1 | 6/2013 | Yamakaji et al. |
| 2013/0177806 A1 | 7/2013 | Caldwell et al. |
| 2013/0183579 A1 | 7/2013 | Kim et al. |
| 2013/0189585 A1 | 7/2013 | Kang et al. |
| 2013/0190449 A1 | 7/2013 | Kinloch et al. |
| 2013/0202953 A1 | 8/2013 | Sharma et al. |
| 2013/0212879 A1 | 8/2013 | Ogino |
| 2013/0230770 A1 | 9/2013 | Oya et al. |
| 2013/0266858 A1 | 10/2013 | Inoue et al. |
| 2013/0266859 A1 | 10/2013 | Todoriki et al. |
| 2013/0313471 A1 | 11/2013 | Endo et al. |
| 2013/0316237 A1 | 11/2013 | Miki |
| 2013/0337320 A1 | 12/2013 | Yukawa |
| 2014/0004412 A1 | 1/2014 | Ogino |
| 2014/0023920 A1 | 1/2014 | Yamazaki et al. |
| 2014/0079995 A1 | 3/2014 | Wakada |
| 2014/0099554 A1 | 4/2014 | Inoue et al. |
| 2014/0113194 A1 | 4/2014 | Tsunozaki et al. |
| 2014/0127567 A1 | 5/2014 | Kuriki et al. |
| 2014/0127568 A1 | 5/2014 | Kawakami et al. |
| 2014/0131633 A1 | 5/2014 | Ito et al. |
| 2014/0147740 A1 | 5/2014 | Kokubu et al. |
| 2014/0162132 A1 | 6/2014 | Ishii et al. |
| 2014/0166946 A1 | 6/2014 | Miwa et al. |
| 2014/0184172 A1 | 7/2014 | Momo et al. |
| 2014/0186663 A1 | 7/2014 | Hiroki et al. |
| 2014/0212759 A1 | 7/2014 | Blangero et al. |
| 2014/0234700 A1 | 8/2014 | Moriwaka et al. |
| 2014/0234716 A1 | 8/2014 | Lopez et al. |
| 2014/0242463 A1 | 8/2014 | Song et al. |
| 2014/0295068 A1 | 10/2014 | Nanba et al. |
| 2014/0332715 A1 | 11/2014 | Kawakami et al. |
| 2014/0332731 A1 | 11/2014 | Ma et al. |
| 2014/0370184 A1 | 12/2014 | Takemura et al. |
| 2015/0014581 A1 | 1/2015 | Kawakami et al. |
| 2015/0014605 A1 | 1/2015 | Kawakami et al. |
| 2015/0064565 A1 | 3/2015 | Todoriki et al. |
| 2015/0093648 A1 | 4/2015 | Son et al. |
| 2015/0099178 A1 | 4/2015 | Kawakami et al. |
| 2015/0099179 A1 | 4/2015 | Ikenuma et al. |
| 2015/0123050 A1 | 5/2015 | Yamazaki et al. |
| 2015/0155556 A1 | 6/2015 | Kawakami et al. |
| 2015/0162598 A1 | 6/2015 | Kim et al. |
| 2015/0166348 A1 | 6/2015 | Ikenuma et al. |
| 2015/0262762 A1 | 9/2015 | Ikenuma et al. |
| 2015/0325855 A1 | 11/2015 | Kawakami et al. |
| 2015/0333320 A1 | 11/2015 | Tamaki et al. |
| 2015/0333324 A1 | 11/2015 | Umeyama et al. |
| 2015/0357641 A1 | 12/2015 | Sugie et al. |
| 2015/0380722 A1* | 12/2015 | Blangero ............... H01M 4/525 429/231.3 |
| 2015/0380737 A1 | 12/2015 | Kawasato et al. |
| 2016/0006032 A1* | 1/2016 | Paulsen ............... C01G 51/42 429/220 |
| 2016/0028080 A1 | 1/2016 | Sugiura |
| 2016/0049644 A1 | 2/2016 | Lee. et al. |
| 2016/0056469 A1 | 2/2016 | Kawakita et al. |
| 2016/0064726 A1 | 3/2016 | Ikenuma et al. |

(56) References Cited

U.S. PATENT DOCUMENTS

| | | |
|---|---|---|
| 2016/0087315 A1 | 3/2016 | Oyama |
| 2016/0099469 A1 | 4/2016 | Paulsen. et al. |
| 2016/0104880 A1 | 4/2016 | Gao et al. |
| 2016/0118646 A1 | 4/2016 | Ikenuma |
| 2016/0118649 A1 | 4/2016 | Yamamoto et al. |
| 2016/0118658 A1 | 4/2016 | Kawakami et al. |
| 2016/0156030 A1 | 6/2016 | Sun et al. |
| 2016/0164089 A1 | 6/2016 | Kawakami et al. |
| 2016/0181611 A1 | 6/2016 | Cho et al. |
| 2016/0218360 A1 | 7/2016 | Nakahara et al. |
| 2016/0268601 A1 | 9/2016 | Paulsen. et al. |
| 2016/0276658 A1 | 9/2016 | Choi et al. |
| 2016/0276659 A1 | 9/2016 | Choi et al. |
| 2016/0285102 A1 | 9/2016 | Shitaba et al. |
| 2016/0308200 A1 | 10/2016 | Yamakaji et al. |
| 2016/0329533 A1 | 11/2016 | Tajima |
| 2016/0336595 A1 | 11/2016 | Choi et al. |
| 2016/0349905 A1 | 12/2016 | Momma et al. |
| 2016/0380263 A1 | 12/2016 | Nakayama et al. |
| 2016/0380271 A1 | 12/2016 | Ochiai et al. |
| 2017/0005364 A1 | 1/2017 | Yamazaki et al. |
| 2017/0018768 A1* | 1/2017 | Yushin .................. H01M 4/582 |
| 2017/0018772 A1 | 1/2017 | Satow et al. |
| 2017/0040594 A1 | 2/2017 | Yamaki et al. |
| 2017/0062819 A1 | 3/2017 | Ikenuma |
| 2017/0069907 A1 | 3/2017 | Zhu et al. |
| 2017/0117589 A1 | 4/2017 | Tajima et al. |
| 2017/0149100 A1 | 5/2017 | Ishii |
| 2017/0187035 A1 | 6/2017 | Yanagihara et al. |
| 2017/0207444 A1 | 7/2017 | Yanagihara et al. |
| 2017/0229742 A1* | 8/2017 | Aykol .................. H01M 4/505 |
| 2017/0256817 A1 | 9/2017 | Kadoma et al. |
| 2017/0309910 A1 | 10/2017 | Jo et al. |
| 2017/0338471 A1* | 11/2017 | Zheng .................. H01M 4/505 |
| 2018/0013130 A1 | 1/2018 | Ochiai et al. |
| 2018/0019462 A1 | 1/2018 | Kadoma et al. |
| 2018/0019464 A1 | 1/2018 | Xia et al. |
| 2018/0034045 A1 | 2/2018 | Xia et al. |
| 2018/0040888 A1 | 2/2018 | Park et al. |
| 2018/0040897 A1 | 2/2018 | Park et al. |
| 2018/0048015 A1* | 2/2018 | Lee ..................... H01M 10/052 |
| 2018/0076489 A1 | 3/2018 | Mikami et al. |
| 2018/0102536 A1 | 4/2018 | Kawakami et al. |
| 2018/0108944 A1 | 4/2018 | Yamakaji |
| 2018/0145317 A1 | 5/2018 | Momma et al. |
| 2018/0145368 A1 | 5/2018 | Ochiai et al. |
| 2018/0190976 A1 | 7/2018 | Blangero et al. |
| 2018/0254477 A1 | 9/2018 | Horikawa et al. |
| 2018/0366729 A1 | 12/2018 | Yanagita et al. |
| 2019/0140276 A1* | 5/2019 | Pullen .................. H01M 4/525 |
| 2020/0028162 A1 | 1/2020 | Yamamoto et al. |
| 2020/0144601 A1 | 5/2020 | Takahashi et al. |
| 2020/0152961 A1 | 5/2020 | Momma et al. |
| 2020/0168908 A1* | 5/2020 | Kim ..................... C01G 53/50 |
| 2020/0176770 A1 | 6/2020 | Takahashi et al. |

FOREIGN PATENT DOCUMENTS

| | | |
|---|---|---|
| CN | 001685543 A | 10/2005 |
| CN | 001715193 A | 1/2006 |
| CN | 001773753 A | 5/2006 |
| CN | 001820385 A | 8/2006 |
| CN | 001981396 A | 6/2007 |
| CN | 101148263 A | 3/2008 |
| CN | 100426570 C | 10/2008 |
| CN | 101414680 A | 4/2009 |
| CN | 101950803 A | 1/2011 |
| CN | 102195027 A | 9/2011 |
| CN | 102210045 A | 10/2011 |
| CN | 102272985 A | 12/2011 |
| CN | 102339998 A | 2/2012 |
| CN | 102447107 A | 5/2012 |
| CN | 102569775 A | 7/2012 |
| CN | 102569877 A | 7/2012 |
| CN | 102610806 A | 7/2012 |
| CN | 102637866 A | 8/2012 |
| CN | 102694201 A | 9/2012 |
| CN | 102779976 A | 11/2012 |
| CN | 102918686 A | 2/2013 |
| CN | 103022502 A | 4/2013 |
| CN | 103456946 A | 12/2013 |
| CN | 103490060 A | 1/2014 |
| CN | 103563139 A | 2/2014 |
| CN | 103606674 A | 2/2014 |
| CN | 103633312 A | 3/2014 |
| CN | 103650219 A | 3/2014 |
| CN | 103733392 A | 4/2014 |
| CN | 103794776 A | 5/2014 |
| CN | 104134779 A | 11/2014 |
| CN | 104332627 A | 2/2015 |
| CN | 104471759 A | 3/2015 |
| CN | 104505500 A | 4/2015 |
| CN | 104701534 A | 6/2015 |
| CN | 104781964 A | 7/2015 |
| CN | 105024047 A | 11/2015 |
| CN | 105051946 A | 11/2015 |
| CN | 105070907 A | 11/2015 |
| CN | 105229829 A | 1/2016 |
| CN | 105280911 A | 1/2016 |
| CN | 105304936 A | 2/2016 |
| CN | 105917500 A | 8/2016 |
| CN | 106025212 A | 10/2016 |
| CN | 106030872 A | 10/2016 |
| CN | 106099098 A | 11/2016 |
| CN | 106104869 A | 11/2016 |
| CN | 102569775 B | 1/2017 |
| EP | 2352190 | 8/2011 |
| EP | 2879210 | 6/2015 |
| EP | 2882014 | 6/2015 |
| EP | 2897201 | 7/2015 |
| EP | 2999036 | 3/2016 |
| EP | 3101716 | 12/2016 |
| EP | 3203553 | 8/2017 |
| EP | 3203556 | 8/2017 |
| JP | 05-314965 A | 11/1993 |
| JP | 05-314995 A | 11/1993 |
| JP | 06-325795 A | 11/1994 |
| JP | 07-014582 A | 1/1995 |
| JP | 07-022009 A | 1/1995 |
| JP | 08-037007 A | 2/1996 |
| JP | 08-100107 A | 4/1996 |
| JP | 08-236114 A | 9/1996 |
| JP | 10-117443 A | 5/1998 |
| JP | 11-025983 A | 1/1999 |
| JP | 11-096993 A | 4/1999 |
| JP | 3031546 | 4/2000 |
| JP | 2000-203842 A | 7/2000 |
| JP | 3172388 | 6/2001 |
| JP | 2001-291518 A | 10/2001 |
| JP | 2001-319692 A | 11/2001 |
| JP | 2002-124262 A | 4/2002 |
| JP | 2002-216760 A | 8/2002 |
| JP | 2002-352802 A | 12/2002 |
| JP | 2002-358953 A | 12/2002 |
| JP | 2003-068306 A | 3/2003 |
| JP | 2003-217572 A | 7/2003 |
| JP | 2003-221235 A | 8/2003 |
| JP | 2003-331824 A | 11/2003 |
| JP | 2004-014381 A | 1/2004 |
| JP | 2004-103566 A | 4/2004 |
| JP | 2004-196604 A | 7/2004 |
| JP | 2004-288579 A | 10/2004 |
| JP | 2004-342554 A | 12/2004 |
| JP | 2005-158612 A | 6/2005 |
| JP | 2005-225734 A | 8/2005 |
| JP | 2005-302510 A | 10/2005 |
| JP | 2005-332629 A | 12/2005 |
| JP | 2006-164758 A | 6/2006 |
| JP | 2006-261132 A | 9/2006 |
| JP | 2006-318928 A | 11/2006 |
| JP | 2006-318929 A | 11/2006 |
| JP | 2007-128714 A | 5/2007 |
| JP | 2007-213866 A | 8/2007 |
| JP | 3959333 | 8/2007 |

(56) References Cited

FOREIGN PATENT DOCUMENTS

| | | |
|---|---|---|
| JP | 2007-258095 A | 10/2007 |
| JP | 2008-060033 A | 3/2008 |
| JP | 2008-166156 A | 7/2008 |
| JP | 2009-104805 A | 5/2009 |
| JP | 2009-179501 A | 8/2009 |
| JP | 2010-080407 A | 4/2010 |
| JP | 2010-102895 A | 5/2010 |
| JP | 2010-244847 A | 10/2010 |
| JP | 2010-272239 A | 12/2010 |
| JP | 2011-028976 A | 2/2011 |
| JP | 2011-082133 A | 4/2011 |
| JP | 2011-138718 A | 7/2011 |
| JP | 4739780 | 8/2011 |
| JP | 2011-210694 A | 10/2011 |
| JP | 2012-043794 A | 3/2012 |
| JP | 2012-066944 A | 4/2012 |
| JP | 2012-074366 A | 4/2012 |
| JP | 2012-084257 A | 4/2012 |
| JP | 2012-169217 A | 9/2012 |
| JP | 2012-209077 A | 10/2012 |
| JP | 2013-012410 A | 1/2013 |
| JP | 2013-503449 | 1/2013 |
| JP | 2013-062082 A | 4/2013 |
| JP | 2013-087040 A | 5/2013 |
| JP | 2013-091581 A | 5/2013 |
| JP | 2013-100197 A | 5/2013 |
| JP | 2013-516037 | 5/2013 |
| JP | 2013-246936 A | 12/2013 |
| JP | 2014-049239 A | 3/2014 |
| JP | 2014-063707 A | 4/2014 |
| JP | 2014-063708 A | 4/2014 |
| JP | 2014-063724 A | 4/2014 |
| JP | 2014-116111 A | 6/2014 |
| JP | 2014-241193 A | 12/2014 |
| JP | 5643996 | 12/2014 |
| JP | 2015-069958 A | 4/2015 |
| JP | 2015-082374 A | 4/2015 |
| JP | 2015-088450 A | 5/2015 |
| JP | 2015-099722 A | 5/2015 |
| JP | 2015-520109 | 7/2015 |
| JP | 2015-156363 A | 8/2015 |
| JP | 2015-191853 A | 11/2015 |
| JP | 2015-201432 A | 11/2015 |
| JP | 2016-025077 A | 2/2016 |
| JP | 2016-033902 A | 3/2016 |
| JP | 2016-072071 A | 5/2016 |
| JP | 2016-076454 A | 5/2016 |
| JP | 2016-143490 A | 8/2016 |
| JP | 2017-021942 A | 1/2017 |
| JP | 2014/156116 | 2/2017 |
| JP | 2017-033817 A | 2/2017 |
| JP | 2017-091777 A | 5/2017 |
| JP | 2017-213417 A | 12/2017 |
| JP | 2018-088400 A | 6/2018 |
| JP | 2018-092934 A | 6/2018 |
| JP | 2018-147726 A | 9/2018 |
| JP | 2020-202184 A | 12/2020 |
| KR | 10-0696619 | 3/2007 |
| KR | 2009-0111130 A | 10/2009 |
| KR | 2012-0099375 A | 9/2012 |
| KR | 2012-0114955 A | 10/2012 |
| KR | 2015-0063955 A | 6/2015 |
| KR | 2016-0092946 A | 8/2016 |
| KR | 2016-0128978 A | 11/2016 |
| WO | WO-2011/031544 | 3/2011 |
| WO | WO-2011/031546 | 3/2011 |
| WO | WO-2011/079238 | 6/2011 |
| WO | WO-2011/141486 | 11/2011 |
| WO | WO-2011/152183 | 12/2011 |
| WO | WO-2011/155781 | 12/2011 |
| WO | WO-2012/005180 | 1/2012 |
| WO | WO-2012/029729 | 3/2012 |
| WO | WO-2012/124242 | 9/2012 |
| WO | WO-2012/132387 | 10/2012 |
| WO | WO-2013/066593 | 5/2013 |
| WO | WO-2013/181994 | 12/2013 |
| WO | WO-2014/061653 | 4/2014 |
| WO | WO-2014/098238 | 6/2014 |
| WO | WO-2014/156116 | 10/2014 |
| WO | WO-2015/047024 | 4/2015 |
| WO | WO-2015/079372 | 6/2015 |
| WO | WO-2015/111710 | 7/2015 |
| WO | WO-2015/136881 | 9/2015 |
| WO | WO-2015/145235 | 10/2015 |
| WO | WO-2015/163356 | 10/2015 |
| WO | WO-2016/017077 | 2/2016 |
| WO | WO-2016/017079 | 2/2016 |
| WO | WO-2016/053051 | 4/2016 |
| WO | WO-2016/053053 | 4/2016 |
| WO | WO-2016/116862 | 7/2016 |
| WO | WO-2016/155314 | 10/2016 |
| WO | WO-2018/211375 | 11/2018 |

OTHER PUBLICATIONS

Antolini.E, "LiCoO2: formation, structure, lithium and oxygen nonstoichiometry, electrochemical behaviour and transport properties", Solid State Ionics, 2004, vol. 170, No. 3-4, pp. 159-171.

Ding.Y et al., "Preparation of nano-structured LiFePO4/graphene composites by co-precipitation method", Electrochemistry Communications, 2010, vol. 12, No. 1, pp. 10-13, Elsevier.

Ceder.G et al., "Identification of cathode materials for lithium batteries guided by first-principles calculations", Nature, Apr. 16, 1998, vol. 392, pp. 694-696.

Gopukumar.S et al., "Synthesis and electrochemical performance of tetravalent doped LICoO2 in lithium rechargeable cells", Solid State Ionics, 2003, vol. 159, pp. 223-232, Elsevier.

Katsuno.H et al., "Growth modes in two-dimensional heteroepitaxy on an elasticsubstrate", J. Cryst. Growth (Journal of Crystal Growth), Feb. 15, 2005, vol. 275, No. 1-2, pp. e283-e288, Elsevier.

Taguchi.N et al., "Characterization of MgO-coated-LiCoO2 particles by analytical transmission electron microscopy", Journal of Power Sources, 2016, vol. 328, pp. 161-166, Elsevier.

Thackeray.M et al., "Li2MnO3-stabilized LiMO2(M=Mn, Ni, Co) electrodes for lithium-ion batteries", J. Mater. Chem. (Journal of Materials Chemistry), 2007, vol. 17, pp. 3112-3125.

Berbenni.V et al., "Thermogravimetry and X-Ray Diffraction Study of the Thermal Decomposition Processes in LI2CO3—MNCO3 Mixtures", Journal of Analytical and Applied Pyrolysis, 2002, vol. 62, pp. 45-62.

Johnson.C et al., "Lithium-manganese oxide electrodes with layered-spinel composite structures xLi2MnO3 • (1-x)Li1+yMn2-yO4(0>x>1,0≤y≤0.33) for lithium batteries", Electrochemistry Communications, May 1, 2005, vol. 7, No. 5, pp. 528-536, Elsevier.

Khedr.A et al., "Synthesis, Structure, and Electrochemistry of Sm-Modified LiMn2O4 Cathode Materials for Lithium-Ion Batteries", J. Electron. Mater.(Journal of Electronic Materials), Apr. 23, 2013, vol. 42, No. 6, pp. 1275-1281.

Lee.S et al., "Antiferromagnetic ordering in Li2MnO3 single crystals with a two-dimensional honeycomb lattice", Journal of Physics: Condensed Matter, Nov. 14, 2012, vol. 24, No. 45, pp. 456004-1-456004-9.

Mukai.K et al., "Magnetic properties of the chemically delithiated LixMn2O4 with 0.07≤x≤1", Journal of Solid State Chemistry, May 1, 2011, vol. 184, No. 5, pp. 1096-1104.

Wang.Z et al., "EELS analysis of cation valence states and oxygen vacancies in magnetic oxides", MICRON, Oct. 1, 2000, vol. 31, No. 5, pp. 571-580, Elsevier.

Tan.H et al., "Oxidation state and chemical shift investigation in transition metal oxides by EELS", Ultramicroscopy, May 1, 2012, vol. 116, pp. 24-33, Elsevier.

McCalla.E et al., "The spinel and cubic rocksalt solid-solutions in the Li—Mn—Ni oxide pseudo-ternary system", Solid State Ionics, May 2, 2013, vol. 242, pp. 1-9, Elsevier.

Dreyer.D et al., "The Chemistry of Graphene Oxide", Chemical Society Reviews, Nov. 3, 2009, vol. 39, No. 1, pp. 228-240.

(56) References Cited

OTHER PUBLICATIONS

Zou.M et al., "Synthesis and Electrochemical Performance of High Voltage Cycling LiM0.05Co0.95O2 as Cathode Material for Lithium Rechargeable Cells", Electrochemical and Solid-State Letters, 2004, vol. 7, No. 7, pp. A176-A179.

Tukamoto.H et al., "Electronic Conductivity of LiCoO2 and its Enhancement by Magnesium Doping", J. Electrochem. Soc. (Journal of the Electrochemical Society), Sep. 1, 1997, vol. 144, No. 9, pp. 3164-3168.

Cho.Y et al., "High Performance LiCoO2 Cathode Materials at 60° C. for Lithium Secondary Batteries Prepared by the Facile Nanoscale Dry-Coating Method", J. Electrochem. Soc. (Journal of the Electrochemical Society), 2010, vol. 157, No. 5, pp. A617-A624.

Yano.A et al., "LiCoO2 Degradation Behavior in the High-Voltage Phase Transition Region and Improved Reversibility with Surface Coating", J. Electrochem. SOC. (Journal of the Electrochemical Society), 2017, vol. 164, No. 1, pp. A6116-A6122.

Liu.L et al., "Electrochemical and In Situ Synchrotron XRD Studies on Al2O3-Coated LiCoO2 Cathode Material", J. Electrochem. Soc. (Journal of the Electrochemical Society), 2004, vol. 151, No. 9, pp. A1344-A1351.

Cho.J et al., "Comparison of Al2O3- and AlPO4-coated LiCoO2 cathode materials for a Li-ion cell", Journal of Power Sources, 2005, vol. 146, pp. 58-64, Elsevier. cited by applicant Jin.Y et al., "Electrochemical Characterizations of Commercial LICoO2 Powders with Surface Modified by Li3PO4 Nanoparticles", Electrochemical and Solid-State Letters, Apr. 3, 2006, vol. 9, No. 6, pp. A273-A276.

Hong.W et al., "Modification of LiCoO2 by Surface Coating with MgO/TiO2/SiO2 for High-Performance Lithium-Ion Battery", Electrochemical and Solid-State Letters, Dec. 20, 2005, vol. 9, No. 2, pp. A82-A85.

Eom.J et al., "M3(PO4)2-Nanoparticie-Coated LiCoO2 vs LiCo0. 96M0.04O2(M=Mg and Zn) on Electrochemical and Storage Characteristics", J. Electrochem. Soc. (Journal of the Electrochemical Society), Jan. 8, 2008, vol. 155, No. 3, pp. A201-A205.

Kim.Y et al., "Suppression of Cobalt Dissolution from the LiCoO2 Cathodes with Various Metal-Oxide Coatings", J. Electrochem. Soc. (Journal of the Electrochemical Society), 2003, vol. 150, No. 12, pp. A1723-A1725.

Chung.K et al., "Structural Studies on the Effects of ZrO2 Coating on LiCoO2 during Cycling Using In Situ X-Ray Diffraction Technique", J. Electrochem. Soc. (Journal of the Electrochemical Society), 2006, vol. 153, No. 11, pp. A2152-A2157.

Fang.T et al., "Effect of calcination temperature on the electrochemical behavior of ZnO-coated LiCoO2 cathode", Surface & Coatings Technology, Apr. 19, 2006, vol. 201, No. 3-4. pp. 1886-1893, Elsevier.

International Search Report (Application No. PCT/IB2017/053896) dated Oct. 3, 2017.

Written Opinion (Application No. PCT/IB2017/053896) dated Oct. 3, 2017.

Yamamoto.K et al., "in situ Total-Reflection Fluorescence X-Ray Absorption Spectroscopic Study on Stability at LiFePO4 / Elecrtrolyte Interface", 224th ECS Meeting Abstract, Oct. 27, 2013, p. 923.

Yamamoto.K et al., "Stabilization of the Electronic Structure at the Cathode/Electrolyte Interface via MgO Ultra-thin Layer during Lithium-ions Insertion/Extraction", Electrochemistry, Oct. 5, 2014, vol. 82, No. 10, pp. 891-896.

Wang.Z et al., "Electrochemical Evaluation and Structural Characterization of Commercial LiCoO2 Surfaces Modified with MgO for Lithium-ion Batteries", J. Electrochem. Soc. (Journal of the Electrochemical Society), Mar. 4, 2002, vol. 149, No. 4, pp. A466-A471.

Lee.Y et al., "Phase Transitions of Bare and Coated LixCoO2 (x=0.4 and 0.24) at 300° C.", J. Electrochem. Soc. (Journal of the Electrochemical Society), Jul. 28, 2005, vol. 152, No. 9, pp. A1824-A1827.

Gabrisch.H et al., "Hexagonal to Cubic Spinel Transformation in Lithiated Cobalt Oxide TEM Investigation", J. Electrochem. Soc. (Journal of the Electrochemical Society), 2004, vol. 151, No. 6, pp. A891-A897.

Geder.J et al., "Impact of active material surface area on thermal stability of LiCoO2 cathode", Journal of Power Sources, Jul. 1, 2014, vol. 257, pp. 286-292, Shi.S et al., "Enhanced cycling stability of Li[Li 0.2Mn0.54Ni0. 13Co0.13]O2 by surface modification of MgO with melting impregnation method", Electrochimica Acta, Nov. 1, 2012, vol. 88, pp. 671-679.

Bensalah.N et al., "Review on Synthesis, Characterizations, and Electrochemical Properties of Cathode Materials for Lithium Ion Batteries", Journal of Material Science & Engineering, 2016, vol. 5, No. 4, pp. 1000258-1-1000258-21.

Lu.Y et al., "Recent progress on lithium-ion batteries with high electrochemical performance", Science China Chemistry, Feb. 25, 2019, vol. 62, No. 5, pp. 533-548.

Xiao.B, "Surface Modifification of Electrode Materials for Lithium-Ion Batteries", Graduate Program in Mechanical and Materials Engineering, 2006, pp. 1-235.

Ohnishi.M et al., "Investigation of the surface degradation of LiCoO2 particles in the cathode materials of Li-ion batteries using FIB-TOF-SIMS", Journal of Surface Analysis, 2013, vol. 20, No. 2, pp. 99-110.

Koyama.Y et al., "Co K-edge XANES of LiCoO2 and CoO2 with a variety of structures by supercell density functional calculations with a core hole", Phys. Rev. B (Physical Review. B), Feb. 27, 2012, vol. 85, No. 7, pp. 075129-1-075129-7.

Iwaya.K et al., "Impact of Lithium-Ion Ordering on Surface Electronic States of LixCoO2", Phys. Rev. Lett. (Physical Review Letters), Sep. 20, 2013, vol. 111, No. 12, pp. 126104-1-126104-5.

Zou.M et al., "Synthesis of High-Voltage (4.5 V) Cycling Doped LiCoO2 for Use in Lithium Rechargeable Cells", Chem. Mater. (Chemistry of Materials), Dec. 16, 2003, vol. 15, No. 25, pp. 4699-4702.

Park.S et al., "Novel Surface Modification Technique to Improve Electrochemical Performance of LiCoO2 at High Voltage", Electrochemical and Solid-State Letters, Apr. 21, 2005, vol. 8, No. 6, pp. A299-A302.

Mladenov.M et al., "Effect of Mg doping and MgO-surface modification on the cycling stability of LiCoO2 electrodes.", Electrochemistry Communications, Aug. 1, 2001, vol. 3, No. 8, pp. 410-416.

Liu.A et al., "Synthesis of Mg and Mn Doped LiCoO2 and Effects on High Voltage Cycling", J. Electrochem. SOC. (Journal of the Electrochemical Society), Jun. 2, 2017, vol. 164, No. 7, pp. A1655-A1664.

Quinlan.R et al., "XPS Investigation of the Electrolyte Induced Stabilization of LiCoO2 and "AlPO4"-Coated LiCoO2 Composite Electrodes", J. Electrochem. Soc. (Journal of the Electrochemical Society), Dec. 3, 2015, vol. 163, No. 2, pp. A300-A308.

Jo.C et al., "An effective method to reduce residual lithium compounds on Ni-rich Li[Ni0.6Co0.2Mn0.2]O2 active material using a phosphoric acid derived Li3PO4 nanolayer", Nano Research, Dec. 4, 2014, vol. 8, No. 5, pp. 1464-1479, Springer.

Tebbe.J et al., "Mechanisms of LiCoO2 Cathode Degradation by Reaction with HF and Protection by Thin Oxide Coatings", ACS Applied Materials & Interfaces, Oct. 12, 2015, vol. 7, No. 43, pp. 24265-24278.

Sun.Y et al., "High-energy cathode material for long-life and safe lithium batteries", Nature Materials, Mar. 22, 2009, vol. 8, pp. 320-324.

Joshi.T et al., "Effects of Dissolved Transition Metals on the Electrochemical Performance and SEI Growth in Lithium-Ion Batteries", J. Electrochem. SOC. (Journal of the Electrochemical Society), 2014, vol. 161, No. 12, pp. A1915-A1921.

Chen.Z et al., "Staging Phase Transitions in LixCoO2", J. Electrochem. Soc. (Journal of the Electrochemical Society), 2002, vol. 149, No. 12, pp. A1604-A1609.

Shim.J et al., "Characterization of Spinel LixCo2O4-Coated LiCoO2 Prepared with Post-Thermal Treatment as a Cathode Material for

(56) References Cited

OTHER PUBLICATIONS

Lithium Ion Batteries", Chem. Mater. (Chemistry of Materials), Apr. 10, 2015, vol. 27, No. 9, pp. 3273-3279.

Okumura.T et al., "Correlation of lithium ion distribution and X-ray absorption near-edge structure in O3- and O2-lithium cobalt oxides from first-principle calculation", Journal of Materials Chemistry, 2012, vol. 22, pp. 17340-17348.

Motohashi.T et al., "Electronic phase diagram of the layered cobalt oxide system LixCoO2 ($0.0 \leq x \leq 1.0$)", Phys. Rev. B (Physical Review. B), Oct. 9, 2009, vol. 80, No. 16, pp. 165114-1-155114-9.

Counts.W et al., "Fluoride Model Systems: II, The Binary Systems CaF2—BeF2, MgF2—BeF2, and LiF—MgF2", J. Am. Ceram. Soc. (Journal of the American Ceramic Society), 1953, vol. 36, No. 1, pp. 12-17.

Ohzuku.T et al., "Solid-State Redox Reactions of LiCoO2 (R-3m) for 4 Volt Secondary Lithium Cells", J. Electrochem. Soc. (Journal of the Electrochemical Society), Nov. 1, 1994, vol. 141, No. 11, pp. 2972-2977.

Amatucci.G et al., "CoO2, The End Member of the LixCoO2 Solid Solution", J. Electrochem. Soc. (Journal of the Electrochemical Society), Mar. 1, 1996, vol. 143, No. 3, pp. 1114-1123.

Wang.Z et al., "Structural and electrochemical characterizations of surface-modified LiCoO2 cathode materials for Li-ion batteries", Solid State Ionics, Jun. 2, 2002, vol. 148, No. 3-4, pp. 335-342, Elsevier.

Wang.Z et al., "Improving the cycling stability of LiCoO2 at 4.5 V through co-modification by Mg doping and zirconium oxyfluoride coating", Ceramics Internationa, 2015, vol. 41, No. 1, pp. 469-474.

Wang.Z et al., "Mg doping and zirconium oxyfluoride coating co-modification to enhance the high-voltage performance of LiCoO2 for lithium ion battery", Journal of Alloys and Compounds, Feb. 5, 2015, vol. 621, pp. 212-219.

Kweon.H et al., "Effects of metal oxide coatings on the thermal stability and electrical performance of LiCoCO2 in a Li-ion cell", Journal of Power Sources, Feb. 16, 2004, vol. 126, pp. 156-162, Elsevier.

Shim.J et al., "Effects of MgO Coating on the Structural and Electrochemical Characteristics of LiCoO2 as Cathode Materials for Lithium Ion Battery", Chem. Mater. (Chemistry of Materials), Mar. 24, 2014, vol. 26, No. 8, pp. 2537-2543.

Zhao.H et al., "Improvement of electrochemical stability of LiCoO2 cathode by a nano-crystalline coating", Journal of Power Sources, May 20, 2004, vol. 132, pp. 195-200, Elsevier.

Iriyama.Y et al., "Effects of surface modification by MgO on interfacial reaction of lithium cobalt oxide thin film electrode", Journal of Power Sources, Oct. 5, 2004, vol. 137, pp. 111-116, Elsevier.

Shim.J et al., "Effects of MgO Coating on the Structural and Electrochemical Characteristics of LiCoO2 as Cathode Materials for Lithium Ion Battery", Chem. Mater. (Chemistry of Materials), [e.g. ), Suppor] Supporting Information, Mar. 24, 2014, vol. 26, No. 8, pp. 31-33.

Orikasa.Y et al., "Origin of Surface Coating Effect for MgO on LiCoO2 to Improve the Interfacial Reaction between Electrode and Electrolyte", Adv. Mater.Interfaces (Advanced Materials Interfaces), Aug. 28, 2014, vol. 1, No. 9, pp. 1400195-1-1400195-8.

Shim. J et al., "Synergistic effects of coating and doping for lithium ion battery cathode materials: synthesis and characterization of lithium titanate-coated LiCoO2 with Mg doping", Electrochimica Acta, Dec. 20, 2015, vol. 186, pp. 201-208, Elesevier.

Benecke.M et al., "Effect of LiF on Hot-Pressing of MgO", J. Am. Ceram. Soc. (Journal of the American Ceramic Society), Jul. 1, 1967, vol. 50, No. 7, pp. 365-368.

Hart.P et al., "Densification Mechanisms in Hot-Pressing of Magnesia with a Fugitive Liquid", J. Am. Ceram. Soc. (Journal of the American Ceramic Society), Feb. 1, 1970, vol. 53, No. 2, pp. 83-86.

Belsky.A et al., "New developments in the Inorganic Crystal Structure Database (ICSD): Accessibility in support of materials research and design.", Acta. Cryst.(Acta Crystallographica Section B), Jun. 1, 2002, vol. B58, No. 3, pp. 364-369.

Alcantara.R et al., "SPES, 6Li MAS NMR, and Ni3+ EPR evidence for the formation of Co2+-containing spinel phases in LiCoO2 cycled electrode materials", Journal of Electroanalytical Chemistry, Aug. 28, 1998, vol. 454, No. 1-2, pp. 173-181.

Antaya.M et al., "Preparation and Characterization of LiCoO2 Thin Films by Laser Ablation Deposition", J. Electrochem. Soc. (Journal of the Electrochemical Society), Mar. 1, 1993, vol. 140, No. 3, pp. 575-578.

Schipper.F et al., "Study of Cathode Materials for Lithium-Ion Batteries: Recent Progress and New Challenges", Inorganics, Apr. 28, 2017, vol. 5, No. 2, pp. 1-29.

Xia.H et al., "Phase Transitions and High-Voltage Electrochemical Behavior of LiCoO2 Thin Films Grown by Pulsed Laser Deposition", J. Electrochem. Soc. (Journal of the Electrochemical Society), 2007, vol. 154, No. 4, pp. A337-A342.

Sun.Y et al., "Role of AlF3 Coating on LiCoO2 Particles during Cycling to Cutoff Voltage above 4.5 V", J. Electrochem. Soc. (Journal of the Electrochemical Society), 2009, vol. 156, No. 12, pp. A1005-A1010.

Araki.K et al., "Electrochemical properties of LiNi1/3Co1/3Mn1/3O2 cathode material modified by coating with Al2O3 nanoparticles", Journal of Power Sources, 2014, vol. 269, pp. 236-243.

Kim.H et al., "Capacity fading behavior of Ni-rich layered cathode materials in Li-ion full cells", Journal of Electroanalytical Chemistry, 2016, vol. 782, pp. 168-173.

Lin.F et al., "Surface reconstruction and chemical evolution of stoichiometric layered cathode materials for lithium-ion batteries", Nature Communications, Mar. 27, 2014, vol. 5, pp. 3529-1-3529-9.

Yano.A et al., "Surface Structure and High-Voltage Charge/Discharge Characteristics of Al-Oxide Coated LiNi1/3Co1/3Mn1/3O2 Cathodes", J. Electrochem. Soc. (Journal of the Electrochemical Society), 2015, vol. 162, No. 2, pp. A3137-A3144.

Yano.A et al., "Surface Structure and High-Voltage Charging/Discharging Performance of Low-Content Zr-Oxide-Coated LiNi1/3Co1/3Mn1/3O2", J. Electrochem. Soc. (Journal of the Electrochemical Society), 2016, vol. 163, No. 2, pp. A75-A82.

Chen et al., "Role of surface coating on cathode materials for lithium-ion batteries", Journal of Materials Chemistry, 2010, vol. 20, pp. 7606-7612.

Chinese Office Action (Application No. 201911351437.9) dated Sep. 15, 2020.

Chinese Office Action (Application No. 201911351432.6) dated Nov. 5, 2020.

Chinese Office Action (Application No. 202010628027.0) dated Dec. 2, 2020.

Lee.H et al., "Atomic structure and defect energetics of LiCoO2 grain boundary", Materials Research Bulletin, May 6, 2016, vol. 82, pp. 81-86.

Notice of Reasons for Revocation (Patent No. Japanese Patent No. 6736240) dated May 18, 2021.

Notice of Reasons for Revocation (Patent No. Japanese Patent No. 6736242) dated May 25, 2021.

Written Opposition to Grant of Patent (Patent number. Japanese Patent No. 6916262) dated Mar. 2, 2022.

Notice of Reasons for Revocation (Patent number. Japanese Patent No. 6916262) dated May 25, 2022.

Hashimoto et al., "Lateral Resolution of EDX Analysis with Low Acceleration Voltage SEM," Journal of Surface Analysis, Jan. 6, 2008, vol. 14, No. 4, pp. 428-432.

Chinese Office Action (Application No. 201711141051.6) dated Dec. 2, 2021.

Written Opposition to Grant of Patent (Patent number. Japanese Patent No. 6857272) dated Nov. 16, 2021.

Notice of Reasons for Revocation (Patent number. Japanese Patent No. 6857272) dated Jan. 25, 2022.

Chemical Power Source Battery Principle and Manufacturing Technology, Jun. 30, 2000, pp. 325-326.

Chinese Office Action (Application No. 201711141051.6) dated Jul. 6, 2022.

Some Frontier Research Topics in Materials Chemistry, 2013, pp. 120-129.

Chinese Office Action (Application No. 201911351436.4) dated Jul. 7, 2022.

(56) References Cited

OTHER PUBLICATIONS

Chinese Office Action (Application No. 202010788736.5) dated Apr. 6, 2021.
Chinese Office Action (Application No. 201911351437.9) dated Apr. 22, 2021.
Written Opposition to Grant of Patent (Patent Number. Japanese Patent No. 6736240) dated Feb. 4, 2021.
Written Opposition to Grant of Patent (Patent number. Japanese Patent No. 6736242) dated Feb. 4, 2021.
Typical element, https://ko.wikipedia.org/wiki/%EC%A0%84%ED%98%95_%EC%9B%90%EC%86%8C.
Petition for Patent Cancellation for KR10-2319774-0000.

* cited by examiner

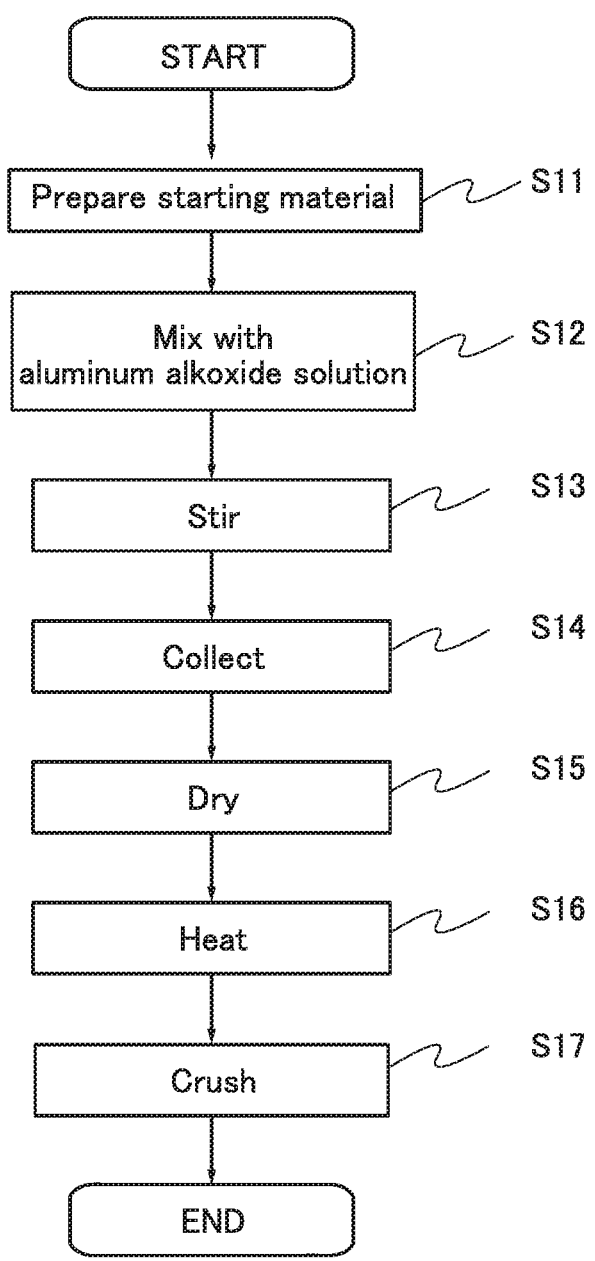

FIG. 24A-1    FIG. 24A-2  FIG. 24A-3
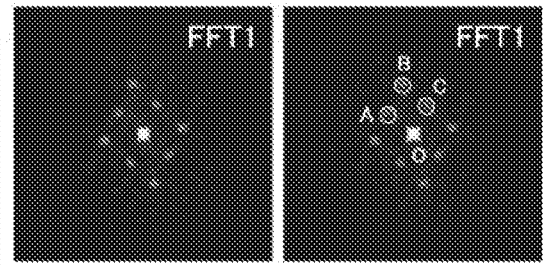
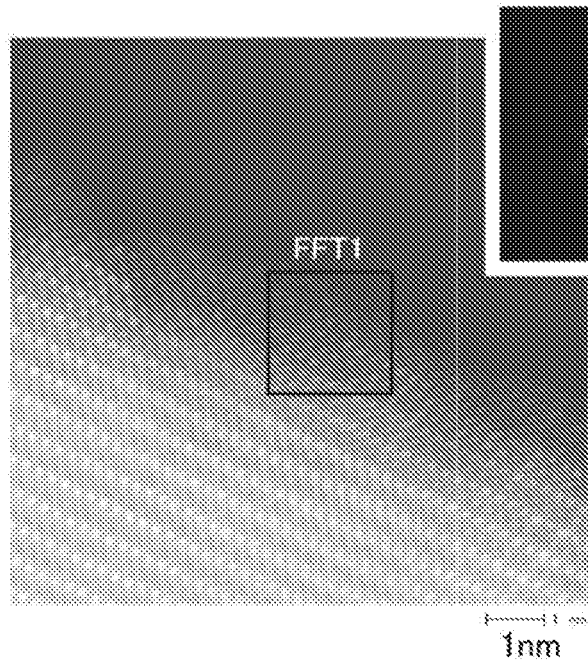
1nm
FIG. 24B-1    FIG. 24B-2  FIG. 24B-3
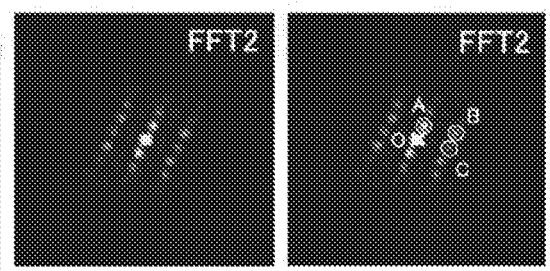
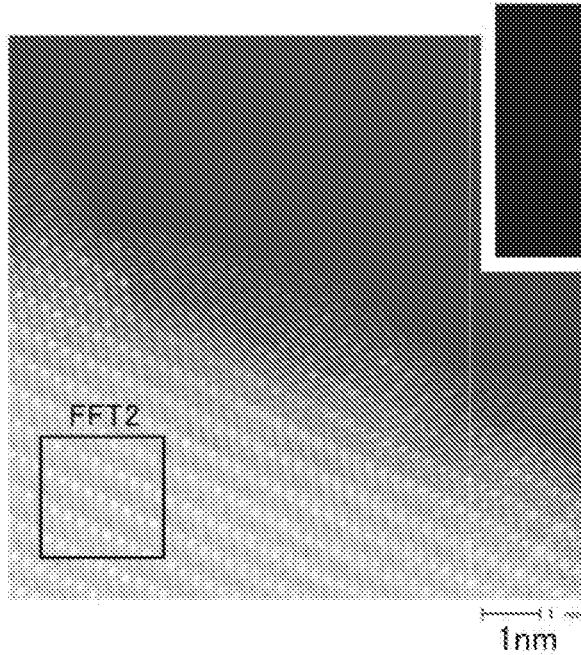
1nm

POSITIVE ELECTRODE ACTIVE MATERIAL INCLUDING IMPURITY ELEMENTS IN A CRYSTAL DEFECT OR A CAVITY

CROSS-REFERENCE TO RELATED APPLICATIONS

This application is a continuation of U.S. application Ser. No. 16/900,108, filed Jun. 12, 2020, now pending, which is a continuation of U.S. application Ser. No. 15/800,184, filed Nov. 1, 2017, now pending, which claims the benefit of a foreign priority application filed in Japan as Serial No. 2016-225046 on Nov. 18, 2016, all of which are incorporated by reference.

BACKGROUND OF THE INVENTION

1. Field of the Invention

One embodiment of the present invention relates to an object, a method, or a manufacturing method. The present invention relates to a process, a machine, manufacture, or a composition of matter. One embodiment of the present invention relates to a semiconductor device, a display device, a light-emitting device, a power storage device, a lighting device, an electronic device, or a manufacturing method thereof. In particular, one embodiment of the present invention relates to an electronic device and its operating system.

In this specification, the power storage device is a collective term describing units and devices having a power storage function. For example, a storage battery such as a lithium-ion secondary battery (also referred to as secondary battery), a lithium-ion capacitor, and an electric double layer capacitor are included in the category of the power storage device.

Electronic devices in this specification mean all devices including power storage devices, and electro-optical devices including power storage devices, information terminal devices including power storage devices, and the like are all electronic devices.

2. Description of the Related Art

In recent years, a variety of power storage devices such as lithium-ion secondary batteries, lithium-ion capacitors, and air batteries have been actively developed. In particular, demand for lithium-ion secondary batteries with high output and high capacity has rapidly grown with the development of the semiconductor industry, for portable information terminals such as mobile phones, smartphones, and laptop computers, portable music players, and digital cameras; medical equipment; next-generation clean energy vehicles such as hybrid electric vehicles (HEV), electric vehicles (EV), and plug-in hybrid electric vehicles (PHEV); and the like. The lithium-ion secondary batteries are essential as rechargeable energy supply sources for today's information society.

The performance required for lithium-ion secondary batteries today includes higher capacity, improved cycle performance, safe operation under a variety of environments, and longer-term reliability.

Thus, improvement of a positive electrode active material has been studied to increase the cycle performance and the capacity of the lithium ion secondary battery (Patent Documents 1, 2, and 3).

REFERENCE

Patent Document

[Patent Document 1] Japanese Published Patent Application No. H8-236114
[Patent Document 2] Japanese Published Patent Application No. 2002-124262
[Patent Document 3] Japanese Published Patent Application No. 2002-358953

SUMMARY OF THE INVENTION

However, development of lithium ion secondary batteries and positive electrode active materials used therein is susceptible to improvement in terms of cycle characteristics, capacity, charge and discharge characteristics, reliability, safety, cost, and the like.

An object of one embodiment of the present invention is to provide a positive electrode active material which suppresses a reduction in capacity due to charge and discharge cycles when used in a lithium ion secondary battery. Another object of one embodiment of the present invention is to provide a high-capacity secondary battery. Another object of one embodiment of the present invention is to provide a secondary battery with excellent charge and discharge characteristics. Another object of one embodiment of the present invention is to provide a highly safe or reliable secondary battery.

Another object of one embodiment of the present invention is to provide a novel material, active material, or storage device or a manufacturing method thereof.

Note that the descriptions of these objects do not disturb the existence of other objects. In one embodiment of the present invention, there is no need to achieve all the objects. Other objects can be derived from the description of the specification, the drawings, and the claims.

In order to achieve the above object, one embodiment of the present invention is characterized in including a covering layer containing aluminum and a covering layer containing magnesium in a superficial portion of a positive electrode active material.

One embodiment of the present invention is a positive electrode active material comprising a first region, a second region, and a third region. The first region exists in an inner portion of the positive electrode active material. The second region covers at least part of the first region. The third region covers at least part of the second region. The first region includes lithium, a transition metal, and oxygen. The second region includes lithium, aluminum, the transition metal, and oxygen. The third region includes magnesium and oxygen.

In the above embodiment, the third region may contain fluorine.

In the above embodiment, the third region may contain a transition metal.

In the above embodiment, the first region and the second region may each have a layered rock-salt crystal structure. The third region may have a rock-salt crystal structure.

In the above embodiment, the transition metal can be cobalt.

One embodiment of the present invention is a positive electrode active material comprising lithium, aluminum, a transition metal, magnesium, oxygen, and fluorine. A concentration of the aluminum is more than or equal to 0.1 atomic % and less than or equal to 10 atomic %. A concentration of the magnesium is more than or equal to 5 atomic % and less than or equal to 20 atomic %. A concentration of the fluorine is more than or equal to 3.5 atomic % and less than or equal to 14 atomic %. Each of the concentrations is measured with X-ray photoelectron spectroscopy by taking the total amount of the lithium, the aluminum, the transition metal, the magnesium, the oxygen, and the fluorine which are present in the superficial portion of the positive electrode active material as 100 atomic %.

One embodiment of the present invention is a secondary battery comprising a positive electrode including the positive electrode active material described above, a negative electrode, an electrolyte, and an exterior body.

One embodiment of the present invention is a manufacturing method of a positive electrode active material, comprising steps of dissolving an aluminum alkoxide in alcohol, mixing a particle containing lithium, a transition metal, magnesium, oxygen, and fluorine into an alcohol solution of an aluminum alkoxide in which the aluminum alkoxide is dissolved in the alcohol, stirring a mixed solution in which the particle containing the lithium, the transition metal, the magnesium, the oxygen, and the fluorine is mixed into the alcohol solution of the aluminum alkoxide in an atmosphere containing water vapor, collecting a precipitate from the mixed solution, and heating the collected precipitate in an oxygen-containing atmosphere at 500° C. or higher and 1200° C. or lower for a retention time of 50 hours or less.

According to one embodiment of the present invention, a positive electrode active material which suppresses a reduction in capacity due to charge and discharge cycles when used in a lithium ion secondary battery can be provided. A secondary battery with high capacity can be provided. A secondary battery with excellent charge and discharge characteristics can be provided. A highly safe or highly reliable secondary battery can be provided. A novel material, active material, or storage device or a manufacturing method thereof can be provided.

BRIEF DESCRIPTION OF THE DRAWINGS

FIGS. 7A1 to 7B2 illustrate an example of a secondary battery.
FIGS. 24A1 to 24B3 are STEM-FET images of a positive electrode active material in Example 2.
FIGS. 25A1 to 25C are an STEM image and EDX element mappings of a positive electrode active material in Example 2.

DETAILED DESCRIPTION OF THE INVENTION

Figure 1A:
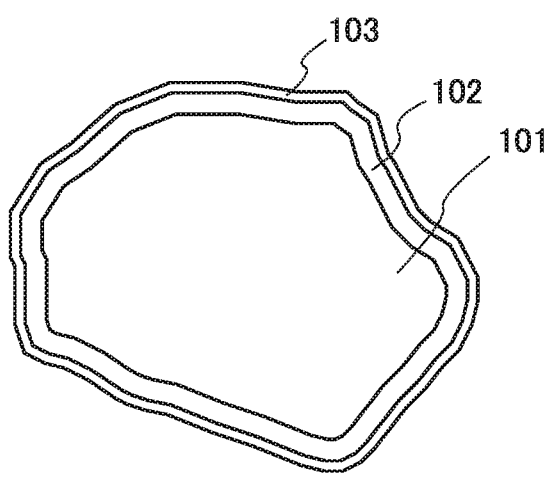
FIGS. 1A to 1C show examples of a positive electrode active material.

Hereinafter, embodiments of the present invention will be described in detail with reference to the accompanying drawings. Note that one embodiment of the present invention is not limited to the description below, and it is easily understood by those skilled in the art that modes and details of the present invention can be modified in various ways. In addition, the present invention should not be construed as being limited to the description in the embodiments given below.

In this specification and the like, crystal planes and orientations are indicated by the Miller index. In the crystallography, a superscript bar is placed over a number in the expression of crystal planes and orientations; however, in this specification and the like, crystal planes and orientations are expressed by placing a minus sign (−) at the front of a number instead of placing the bar over a number because of patent expression limitations. Furthermore, an individual direction which shows an orientation in crystal is denoted by "[ ]", a set direction which shows all of the equivalent orientations is denoted by "< >", an individual direction which shows a crystal plane is denoted by "( )", and a set plane having equivalent symmetry is denoted by "{ }".

In this specification and the like, segregation refers to a phenomenon in which, in a solid made of a plurality of elements (e.g., A, B, and C), a certain element (for example, B) is non-uniformly distributed.

In this specification and the like, a layered rock-salt crystal structure included in a composite oxide containing lithium and a transition metal refers to a crystal structure in which a rock-salt ion arrangement where cations and anions are alternately arranged is included and the lithium and the transition metal are regularly arranged to form a two-dimensional plane, so that lithium can be two-dimensionally diffused. Note that a defect such as a cation or anion vacancy can exist. In the layered rock-salt crystal structure, strictly, a lattice of a rock-salt crystal is distorted in some cases.

In this specification and the like, a rock-salt crystal structure refers to a structure in which cations and anions are alternately arranged. Note that a cation or anion vacancy may exist.

Anions of a layered rock-salt crystal and anions of a rock-salt crystal each form a cubic closest packed structure (face-centered cubic lattice structure). When a layered rock-salt crystal and a rock-salt crystal are in contact with each other, there is a crystal plane at which orientations of cubic closest packed structures formed of anions are aligned with each other. A space group of the layered rock-salt crystal is R-3m, which is different from a space group Fm-3m of a general rock-salt crystal and a space group Fd-3m of a rock-salt crystal having the simplest symmetry; thus, the Miller index of the crystal plane satisfying the above conditions in the layered rock-salt crystal is different from that in the rock-salt crystal. In this specification, in the layered rock-salt crystal and the rock-salt crystal, a state where the orientations of the cubic closest packed structures formed of anions are aligned with each other is referred to as a state where crystal orientations are substantially aligned with each other.

Whether the crystal orientations in two regions are aligned with each other or not can be judged by a transmission electron microscope (TEM) image, a scanning transmission electron microscope (STEM) image, a high-angle annular dark field scanning transmission electron microscopy (HAADF-STEM) image, an annular bright-field scan transmission electron microscopy (ABF-STEM) image, and the like. X-ray diffraction, electron diffraction, neutron diffraction, and the like can be used for judging. In the TEM image and the like, alignment of cations and anions can be observed as repetition of bright lines and dark lines. When the orientations of cubic closest packed structures of the layered rock-salt crystal and the rock-salt crystal are aligned with each other, a state where an angle between the repetition of bright lines and dark lines in the layered rock-salt crystal and the repetition of bright lines and dark lines in the rock-salt crystal is less than or equal to 5°, preferably less than or equal to 2.5° is observed. Note that, in the TEM image and the like, a light element such as oxygen or fluorine is not clearly observed in some cases; however, in such a case, alignment of orientations can be judged by arrangement of metal elements.

Embodiment 1

[Structure of Positive Electrode Active Material]

Figure 1B:
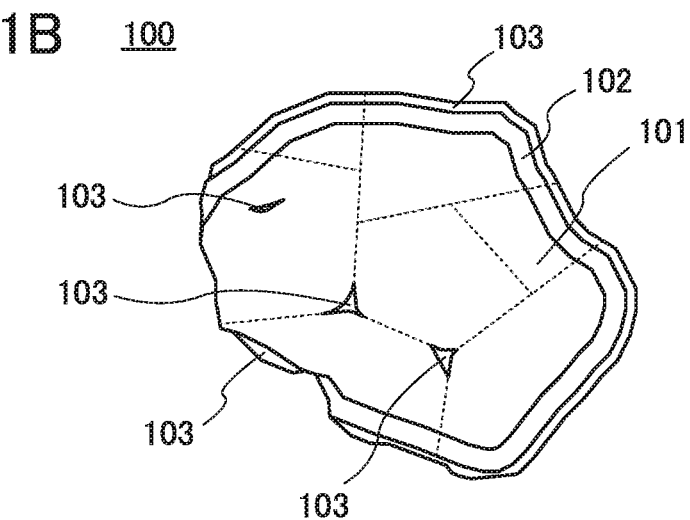
Figure 1C:
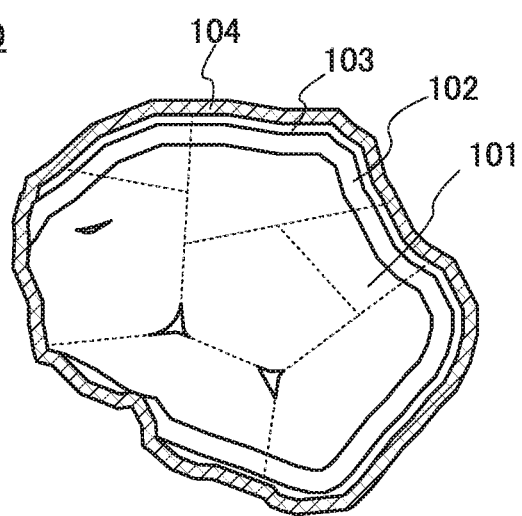

First, a positive electrode active material 100, which is one embodiment of the present invention, is described with reference to FIGS. 1A to 1C. As shown in FIGS. 1A and 1B, the positive electrode active material 100 includes a first region 101, a second region 102, and a third region 103. The first region 101 exists in the inner portion of the positive electrode active material 100. The second region 102 covers at least part of the first region 101. The third region 103 covers at least part of the second region 102.

As illustrated in FIG. 1B, the third region 103 may exist in the inner portion of the positive electrode active material 100. For example, in the case where the first region 101 is a polycrystal, the third region 103 may exist in the vicinity of a grain boundary. Furthermore, the third region 103 may exist in a crystal defect portion in the positive electrode active material 100 or in the vicinity of the crystal defect portion. In FIG. 1B, parts of grain boundaries are shown by dotted lines. Note that in this specification and the like, crystal defects refer to defects which can be observed from a TEM image and the like, that is, a structure in which another element enters crystal, a cavity, and the like.

Although not shown in drawings, the second region 102 may exist in the inner portion of the positive electrode active material 100. For example, in the case where the first region 101 is a polycrystal, the second region 102 may exist in the vicinity of a grain boundary. Furthermore, the second region 102 may exist in a crystal defect portion in the positive electrode active material 100 or in the vicinity of the crystal defect portion.

The second region 102 does not necessarily cover the entire first region 101. Similarly, the third region 103 does not necessarily cover the entire second region 102. In addition, the third region 103 may exist in contact with the first region 101.

In other words, the first region 101 exists in the inner portion of the positive electrode active material 100, and the second region 102 and the third region 103 exist in the superficial portion of the positive electrode active material 100. The second region 102 and the third region 103 in the superficial portion serve as covering layers of the positive electrode active material. Moreover, the third region 103 and the second region 102 may exist in the inner portion of a particle of the positive electrode active material 100.

When the particle size of the positive electrode active material 100 is too large, problems occur such as difficulty in lithium diffusion and surface roughness of the active material layer when the material is applied to a current collector. In contrast, when the particle size is too small, problems occur such as difficulty in applying the material to the current collector and over-reaction with an electrolyte. Thus, D50 (also referred to as a median diameter) is preferably 0.1 μm or more and 100 μm or less, and further preferably 1 μm or more and 40 μm or less.

To increase the density of the positive electrode active material layer, it is effective to mix a large particle (the longest portion is approximately 20 μm or more and 40 μm or less) and a small particle (the longest portion is approximately 1 μm) and embed a space between the large particles with the small particle. Thus, there may be two peaks of particle size distribution.

<First Region 101>

The first region 101 includes lithium, a transition metal, and oxygen. In other words, the first region 101 includes composite oxide containing lithium and a transition metal.

As the transition metal included in the first region 101, a metal that can form layered rock-salt composite oxide together with lithium is preferably used. For example, one or a plurality of manganese, cobalt, and nickel can be used. That is, as the transition metal included in the first region 101, only cobalt may be used, cobalt and manganese may be used, or cobalt, manganese, and nickel may be used. In addition to the transition metal, the first region 101 may include a metal other than the transition metal, such as aluminum.

In other words, the first region 101 can include composite oxide of lithium and the transition metal, such as lithium cobaltate, lithium nickel oxide, lithium cobaltate in which manganese is substituted for part of cobalt, lithium nickel-manganese-cobalt oxide, or lithium nickel-cobalt-aluminum oxide.

The first region 101 is a region which contributes particularly to a charge and discharge reaction in the positive electrode active material 100. To increase capacity of a secondary battery containing the positive electrode active material 100, the volume of the first region 101 is preferably larger than those of the second region 102 and the third region 103.

Note that the first region 101 may be a single crystal or a polycrystal. For example, the first region 101 may be a polycrystal in which an average crystallite size is greater than or equal to 280 nm and less than or equal to 630 nm. In the case of a polycrystal, a grain boundary can be observed from the TEM or the like in some cases. In addition, the average of crystal grain sizes can be calculated from the half width of XRD.

A polycrystal has a clear crystal structure; thus, a two-dimensional diffusion path of lithium ions can be sufficiently ensured. In addition, a polycrystal is easily produced as compared with a single crystal; thus, a polycrystal is preferably used for the first region 101.

A layered rock-salt crystal structure is preferable for the first region 101 because lithium is likely to be diffused two-dimensionally. In addition, in the case where the first region 101 has a layered rock-salt crystal structure, magnesium segregation, which is described later, is likely to occur unexpectedly. Note that the entire first region 101 does not necessarily have a layered rock-salt crystal structure. For example, part of the first region 101 may include crystal defects, may be amorphous, or may have another crystal structure.

<Second Region 102>

The second region 102 includes lithium, aluminum, a transition metal, and oxygen. In other words, aluminum is substituted for part of a transition metal site of a composite oxide of lithium and the transition metal. The transition metal of the second region 102 is preferably the same element as a transition metal of the first region 101. Note that the site in this specification and the like means a position where an element should occupy in the crystal.

The second region 102 may include fluorine.

Since the second region 102 includes aluminum, cycle characteristics of the positive electrode active material 100 can be improved. Note that aluminum in the second region 102 may have a concentration gradient. In addition, the aluminum preferably exists in part of the transition metal site of the composite oxide of lithium and the transition metal, but may exist in other states. For example, the aluminum may exist as aluminum oxide ($Al_2O_3$).

In general, as charging and discharging are repeated, a side reaction occurs, for example, a transition metal such as cobalt or manganese, is dissolved in an electrolyte solution, oxygen is released, and a crystal structure becomes unstable, so that the positive electrode active material deteriorates. However, since the positive electrode active material 100, which is one embodiment of the present invention, includes the second region 102 including aluminum in the superficial portion, the crystal structure of the composite oxide of lithium and the transition metal included in the first region 101 can be more stable. As a result, the cycle characteristics of the secondary battery including the positive electrode active material 100 can be significantly improved.

The second region 102 preferably has a layered rock-salt crystal structure. When the second region 102 has a layered rock-salt crystal structure, crystal orientations are likely to be aligned with those of the first region 101 and the third region 103. Orientations of the crystal in the first region 101, the crystal in the second region 102, and the crystal in the third region 103 are substantially aligned with each other, whereby the second region 102 and the third region 103 can serve as a more stable covering layer.

When the thickness of the second region 102 is too small, the function as the covering layer is degraded; however, when the thickness of the second region 102 is too large, the capacity might be decreased. Thus, the second region 102 is preferably provided in a range from the surface of the positive electrode active material 100 to a depth of 30 nm, preferably a depth of 15 nm, in a depth direction.

<Third Region 103>

The third region 103 includes magnesium and oxygen. In other word, the third region 103 includes magnesium oxide.

The third region 103 may include the same transition metal as that in the first region 101 and the second region 102. The third region 103 may include fluorine. In the case where the third region 103 includes fluorine, fluorine may be substituted for part of oxygen of the magnesium oxide.

Since magnesium oxide included in the third region 103 is an electrochemically stable material, degradation hardly occurs even when charging and discharging are repeated, so that it is suitable as a covering layer. That is, the positive electrode active material 100 has the third region 103 in the superficial portion in addition to the second region 102, whereby the crystal structure of the composite oxide containing lithium and the transition metal in the first region 101 can be further stabilized. As a result, the cycle characteristics of the secondary battery including the positive electrode active material 100 can be improved. In addition, when charging and discharging are carried out at a voltage exceeding 4.3 V (vs. Li/Li$^+$), especially 4.5 V (vs. Li/Li$^+$) or more, the constitution of one embodiment of the present invention exerts its significant effect.

When the third region 103 has a rock-salt type crystal structure, orientation of crystals easily is aligned with those of the second region 102, which is preferable because the third region 103 easily serves as a stable covering layer. However, the entire third region 103 does not necessarily have a rock-salt crystal structure. For example, part of the third region 103 may be amorphous or have another crystal structure.

When the thickness of the third region 103 is too small, the function as the covering layer is degraded; however, when the thickness is too large, the capacity is decreased. Therefore, the third region 103 preferably exists from the surface of the positive electrode active material 100 in the range of 0.5 nm or more to 50 nm or less in the depth direction, more preferably 0.5 nm or more and 5 nm or less.

Since it is important for the third region 103 to have an electrochemically stable material, the contained element is not necessarily magnesium. For example, instead of magnesium, or together with magnesium, a typical element such as calcium and beryllium may be contained. Instead of fluorine, or together with fluorine, chlorine may be contained.

<Boundaries Between Regions>

The first region 101, the second region 102, and the third region 103 have different compositions. The element contained in each region has a concentration gradient in some cases. For example, aluminum contained in the second region 102 may have a concentration gradient. The third region 103 may have a concentration gradient of magnesium because the third region 103 is preferably a region where magnesium is segregated as described later. Thus, the boundaries between the regions are not clear in some cases.

The difference of compositions of the first region 101, the second region 102, and the third region 103 can be observed using a TEM image, a STEM image, fast Fourier transform (FFT) analysis, energy dispersive X-ray spectrometry (EDX), analysis in the depth direction by time-of-flight secondary ion mass spectrometry (ToF-SIMS), X-ray photoelectron spectroscopy (XPS), Auger electron spectroscopy, thermal desorption spectroscopy (TDS), or the like. Note that in the EDX measurement, measurement while scanning within the region and evaluating the region two-dimensionally may be referred to as EDX surface analysis. From the EDX surface analysis, evaluation while extracting data of a linear region and evaluating the distribution inside the positive electrode active material particle with respect to atomic concentration may be referred to as line analysis.

For example, in the TEM image and the STEM image, difference of constituent elements is observed as difference of brightness; thus, difference of constituent elements of the first region 101, the second region 102, and the third region 103 can be observed. Also in plane analysis of EDX (e.g., element mapping), it can be observed that the first region 101, the second region 102, and the third region 103 contain different elements.

By line analysis of EDX and analysis in the depth direction using ToF-SIMS, a peak of concentration of each element contained in the first region 101, the second region 102, and the third region 103 can be detected.

However, clear boundaries between the first region 101, the second region 102, and the third region 103 are not necessarily observed by the analyses.

In this specification and the like, the third region 103 that is present in a superficial portion of the positive electrode active material 100 refers to a region from the surface of the positive electrode active material 100 to a region where a concentration of a representative element such as magnesium which is detected by analysis in the depth direction is ⅕ of a peak. As the analysis method, the line analysis of EDX, analysis in the depth direction using ToF-SIMS, or the like, which is described above, can be used.

A peak of the magnesium concentration is preferably present in a region from the surface of the positive electrode active material 100 to a depth of 3 nm toward the center, further preferably to a depth of 1 nm, and still further preferably to a depth of 0.5 nm.

Although the depth at which the magnesium concentration becomes ⅕ of the peak is different depending on the manufacturing method, in the case of a manufacturing method described later, the depth is approximately 2 nm to 5 nm from the surface of the positive electrode active material.

The third region 103 that is present inside the first region 101 in the vicinity of a grain boundary, a crystal defect, or the like also refers to a region where a concentration of a representative element which is detected by analysis in the depth direction is higher than or equal to ⅕ of a peak.

A distribution of fluorine in the positive electrode active material 100 preferably overlaps with a magnesium distribution. Thus, fluorine also has a concentration gradient, and a peak of a concentration of fluorine is preferably present in a region from the surface of the positive electrode active material 100 to a depth of 3 nm toward the center, further preferably to a depth of 1 nm, and still further preferably to a depth of 0.5 nm.

In this specification and the like, the second region 102 that is present in a superficial portion of the positive electrode active material 100 refers to a region where the aluminum concentration detected by analysis in the depth direction is higher than or equal to ½ of a peak. The second region 102 that is present inside the first region 101 in the vicinity of a grain boundary, a crystal defect, or the like also refers to a region where the aluminum concentration which is detected by analysis in the depth direction is higher than or equal to ½ of a peak. As the analysis method, the line analysis of EDX, analysis in the depth direction using ToF-SIMS, or the like, which is described above, can be used.

Thus, the third region 103 and the second region 102 overlap with each other in some cases. Note that the third region 103 is preferably present in a region closer to the surface of the positive electrode active material particle than the second region 102 is. The peak of the magnesium concentration is preferably present in a region closer to the surface of the positive electrode active material particle than the peak of the aluminum concentration is.

The peak of the aluminum concentration is preferably present at a depth of 0.5 nm or more and 20 nm or less from the surface of the positive electrode active material 100 toward the center, more preferably at a depth of 1 nm or more and 5 nm or less.

The concentrations of aluminum, magnesium, and fluorine can be analyzed by ToF-SIMS, EDX (planar analysis and line analysis), XPS, Auger electron spectroscopy, TDS, or the like.

Note that the measurement range by the XPS is from the surface of the positive electrode active material 100 to a region at a depth of approximately 5 nm. Thus, the element concentration at a depth of approximately 5 nm from the surface can be analyzed quantitatively. For this reason, when the thickness of the third region 103 is less than 5 nm from the surface, the element concentration of the sum of the third region 103 and part of the second region 102 can be quantitatively analyzed. When the thickness of the third region 103 is 5 nm or more from the surface, the element concentration of the third region 103 can be quantitatively analyzed.

In the XPS measurement from the surface of the positive electrode active material 100, the aluminum concentration is preferably 0.1 atomic % or more and 10 atomic % or less, more preferably 0.1 atomic % or more and 2 atomic % or less when the total amount of lithium, aluminum, the transition metal of the first region 101, magnesium, oxygen, and fluorine is taken as 100 atomic %. The magnesium concentration is preferably 5 atomic % or more and 20 atomic % or less. The fluorine concentration is preferably 3.5 atomic % or more and 14 atomic % or less.

Note that, as described above, elements contained in the first region 101, the second region 102, and the third region 103 may each have a concentration gradient; thus, the first region 101 may contain the element contained in the second region 102 or the third region 103. Similarly, the third region 103 may contain the element contained in the first region 101 or the second region 102. In addition, the first region 101, the second region 102, and the third region 103 may each contain another element, such as carbon, sulfur, silicon, sodium, calcium, chlorine, or zirconium.

[Covering of Second Region]

The second region 102 can be formed by covering a particle of the composite oxide of lithium and the transition metal with a material containing aluminum.

As the covering method with the material containing aluminum, a liquid phase method such as a sol-gel method, a solid phase method, a sputtering method, an evaporation method, a chemical vapor deposition (CVD) method, a pulsed laser deposition (PLD) method, or the like can be used. In this embodiment, the sol-gel method is used, by which uniform coverage is achieved under an atmospheric pressure.

In the case of using the sol-gel method, aluminum alkoxide is first dissolved in alcohol, the particle of the composite oxide containing lithium and a transition metal is mixed in the solution, and the mixture is stirred in an atmosphere containing water vapor. By placing it in an atmosphere containing $H_2O$, hydrolysis and polycondensation reaction of water and aluminum alkoxide occur on the surface of the composite oxide particle containing lithium and a transition metal to form a gel-like layer containing aluminum on the particle surface. Then, the particle is collected and dried. The details of the formation method are described later.

Note that one embodiment of the present invention is not limited to the example shown in this embodiment in which the particle of the composite oxide containing lithium and the transition metal is covered with the material containing aluminum before the particle is applied to a positive electrode current collector. For another example, after the positive electrode active material layer including the particle of the composite oxide of lithium and the transition metal is formed on the positive electrode current collector, the positive electrode current collector and the positive electrode active material layer may be both soaked into an alkoxide solution.

[Segregation of Third Region]

The third region 103 can be formed also by a sputtering method, a solid phase method, a liquid phase method such as a sol-gel method, or the like. However, the present inventors found that when a source of magnesium and a source of fluorine are mixed with a material of the first region 101 and then the mixture is heated, the magnesium is segregated on a superficial portion of the positive electrode active material particle to form the third region 103. In addition, they found that the third region 103 formed in this manner contributes to excellent cycle characteristics of the positive electrode active material 100.

When the third region 103 is formed by segregation of magnesium in the superficial portion of the positive electrode active material particle by heating as described above, the heating is performed preferably after the particle of the composite oxide containing lithium, the transition metal, magnesium, and fluorine is covered with the material containing aluminum. This is because magnesium is surprisingly segregated in the superficial portion of the positive electrode active material particle even after the particle is covered with the material containing aluminum. The details of the formation method are described later.

Note that when the composite oxide containing lithium and the transition metal included in the first region 101 is a polycrystal or has crystal defects, magnesium can be segregated not only in the superficial portion but also in the vicinity of a grain boundary of the composite oxide containing lithium and the transition metal or in the vicinity of crystal defects thereof. The magnesium segregated in the vicinity of a grain boundary or in the vicinity of crystal defects can contribute to further improvement in stability of the crystal structure of the composite oxide containing lithium and the transition metal included in the first region 101.

When the ratio between magnesium and fluorine as raw materials is in the range of Mg:F=1:x ($1.5 \leq x \leq 4$) (atomic ratio), segregation of magnesium occurs effectively, which is preferable. The ratio is further preferably Mg:F=about 1:2 (atomic ratio).

Since the third region 103 formed by segregation is formed by epitaxial growth, orientations of crystals in the second region 102 and the third region 103 are partly and substantially aligned with each other in some cases. That is, the second region 102 and the third region 103 become topotaxy in some cases. When the orientations of crystals in the second region 102 and the third region 103 are substantially aligned with each other, these regions can serve as a more favorable covering layer.

Note that in this specification, a state where three-dimensional structures have similarity or orientations are crystallographically the same is referred to as "topotaxy". Thus, in the case of topotaxy, when part of a cross section is observed, orientations of crystals in two regions (e.g., a region serving as a base and a region formed through growth) are substantially aligned with each other.

<Fourth Region 104>

It is to be noted that although the example in which the positive electrode active material 100 includes the first region 101, the second region 102, and the third region 103 has been described so far, one embodiment of the present invention is not limited thereto. For example, as illustrated in FIG. 1C, the positive electrode active material 100 may include a fourth region 104. The fourth region 104 can be provided, for example, so as to be in contact with at least part of the third region 103. The fourth region 104 may be a covering film containing carbon such as a graphene compound or may be a covering film containing lithium or an electrolyte decomposition product. When the fourth region 104 is a covering film containing carbon, it is possible to increase the conductivity between the positive electrode active materials 100 and between the positive electrode active material 100 and the current collector. In the case where the fourth region 104 is a covering film containing lithium or an electrolyte decomposition product, excessive reaction with the electrolytic solution can be suppressed, and cycle characteristics can be improved when used for a secondary battery.

[Formation Method]

An example of a formation method of the positive electrode active material 100 including the first region 101, the second region 102, and the third region 103 is described with reference to FIG. 2. In this formation example, the first region contains cobalt as a transition metal, and the second region is formed by a sol-gel method using aluminum alkoxide. Then, heating is performed to form the third region 103 by segregating magnesium on the surface.

First, a starting material is prepared (S11). As the starting material, a particle of composite oxide containing lithium, cobalt, fluorine, and magnesium is used.

First, to form the particle of the composite oxide containing lithium, cobalt, fluorine, and magnesium, a lithium source, a cobalt source, a magnesium source, and a fluorine source are individually weighed. As the lithium source, for example, lithium carbonate, lithium fluoride, or lithium hydroxide can be used. As the cobalt source, for example, cobalt oxide, cobalt hydroxide, cobalt oxyhydroxide, cobalt carbonate, cobalt oxalate, cobalt sulfate, or the like can be used. As a magnesium source, for example, magnesium oxide, magnesium fluoride, or the like can be used. As the fluorine source, for example, lithium fluoride, magnesium fluoride, or the like can be used. That is, lithium fluoride can be used as both a lithium source and a fluorine source. Magnesium fluoride can be used as a magnesium source or as a fluorine source.

The atomic ratio of magnesium to fluorine as raw materials is preferably Mg:F=1:x ($1.5 \leq 4$), more preferably Mg:F=about 1:2 (atomic ratio). With the atomic ratio, magnesium segregation easily occurs in the heating process performed later.

Next, the weighed starting material is mixed. For example, a ball mill, a bead mill, or the like can be used for the mixing.

Then, the mixed starting material is baked. The baking is preferably performed at higher than or equal to 800° C. and lower than or equal to 1050° C., further preferably at higher than or equal to 900° C. and lower than or equal to 1000° C. The baking time is preferably greater than or equal to 2 hours and less than or equal to 20 hours. The baking is preferably performed in a dried atmosphere such as dry air.

In the dried atmosphere, for example, the dew point is preferably lower than or equal to −50° C., further preferably lower than or equal to −100° C. In this embodiment, the heating is performed at 1000° C. for 10 hours, the temperature rising rate is 200° C./h, and dry air whose dew point is −109° C. flows at 10 L/min. After that, the heated materials are cooled to room temperature.

Through the above process, particles of a composite oxide containing lithium, cobalt, fluorine, and magnesium can be synthesized.

As the starting material, a particle of a composite oxide containing lithium and cobalt which are synthesized in advance may be used. For example, a lithium cobaltate particle (C-20F, produced by NIPPON CHEMICAL INDUSTRIAL CO., LTD.) can be used as one of the starting material. The lithium cobaltate particle has a diameter of approximately 20 μm and contains fluorine, magnesium, calcium, sodium, silicon, sulfur, and phosphorus in a region which can be analyzed by XPS from the surface. In this embodiment, a lithium cobaltate particle (product name: C-20F) produced by NIPPON CHEMICAL INDUSTRIAL CO., LTD.) is used as the starting material.

Then, the aluminum alkoxide is dissolved in alcohol, and a particle of the starting material is mixed into the solution (S12).

Examples of the aluminum alkoxide include trimethoxy aluminum, triethoxy aluminum, tri-n-propoxy aluminum, tri-i-propoxy aluminum, tri-n-butoxy aluminum, tri-i-butoxy aluminum, tri-sec-butoxy aluminum, tri-t-butoxy aluminum. As a solvent in which the aluminum alkoxide is dissolved, methanol, ethanol, propanol, 2-propanol, butanol, or 2-butanol is preferably used.

Note that the alkoxide group of the aluminum alkoxide and the alcohol used for the solvent may be of different types, but are particularly preferably of the same type.

Next, the mixed solution is stirred in an atmosphere containing water vapor (S13). By this treatment, $H_2O$ and aluminum isopropoxide in the atmosphere undergo hydrolysis and polycondensation reaction. Then, on the surface of a lithium cobaltate particle containing magnesium and fluorine, a gel-like layer containing aluminum is formed.

A magnetic stirrer can be used for the stirring, for example. The stirring time is not limited as long as water and aluminum isopropoxide in the atmosphere cause hydrolysis and polycondensation reaction. For example, the stirring can be performed at 25° C. and a humidity of 90% RH (Relative Humidity) for 4 hours.

By the reaction of aluminum alkoxide with water at room temperature as described above, a covering layer containing aluminum can have higher uniformity and quality than by heating at a temperature higher than the boiling point of alcohol as a solvent (e.g., 100° C. or higher).

After the above process, precipitate is collected from the mixed solution (S14). As the collection method, filtration, centrifugation, evaporation and drying, or the like can be used. In this embodiment, filtration is used. For the filtration, a paper filter is used, and the residue is washed by alcohol which is the same as the solvent in which aluminum alkoxide is dissolved.

Then, the collected residue is dried (S15). In this embodiment, vacuum drying is performed at 70° C. for one hour.

Next, the dried powder is heated (S16). By the heating, magnesium and fluorine contained in the starting material are segregated on the surface to form the third region 103.

In the heating, the retention time within a specified temperature range is preferably shorter than or equal to 50 hours, further preferably longer than or equal to 1 hour and shorter than or equal to 10 hours. The specified temperatures are temperatures for the retention. The specified temperature is preferably higher than or equal to 500° C. and lower than or equal to 1200° C., further preferably higher than or equal to 700° C. and lower than or equal to 1000° C., still further preferably about 800° C. The heating is preferably performed in an oxygen-containing atmosphere. In this embodiment, the specified temperature is 800° C. and kept for 2 hours, the temperature rising rate is 200° C./h, and the flow rate of dry air is 10 L/min. The cooing is performed for the same time as the time of increasing temperature, or longer.

Then, the heated powders are preferably cooled and subjected to crushing treatment (S17). For example, a sieve can be used for the crushing treatment.

Through the above process, the positive electrode active material 100 of one embodiment of the present invention can be formed.

Embodiment 2

In this embodiment, examples of materials which can be used for a secondary battery containing the positive electrode active material 100 described in the above embodiment are described. In this embodiment, a secondary battery in which a positive electrode, a negative electrode, and an electrolyte solution are wrapped in an exterior body is described as an example.

[Positive Electrode]

The positive electrode includes a positive electrode active material layer and a positive electrode current collector.

<Positive Electrode Active Material Layer>

The positive electrode active material layer contains a positive electrode active material. The positive electrode active material layer may contain a conductive additive and a binder.

As the positive electrode active material, the positive electrode active material 100 described in the above embodiment can be used. When the above-described positive electrode active material 100 is used, a secondary battery with high capacity and excellent cycle characteristics can be obtained.

Examples of the conductive additive include a carbon material, a metal material, and a conductive ceramic material. Alternatively, a fiber material may be used as the conductive additive. The content of the conductive additive with respect to the total amount of the active material layer is preferably greater than or equal to 1 wt % and less than or equal to 10 wt %, more preferably greater than or equal to 1 wt % and less than or equal to 5 wt %.

A network for electric conduction can be formed in the electrode by the conductive additive. The conductive additive also allows maintaining of a path for electric conduction between the positive electrode active material particles. The addition of the conductive additive to the active material layer increases the electric conductivity of the active material layer.

Examples of the conductive additive include natural graphite, artificial graphite such as mesocarbon microbeads, and carbon fiber. Examples of carbon fiber include mesophase pitch-based carbon fiber, isotropic pitch-based carbon fiber, carbon nanofiber, and carbon nanotube. Carbon nanotube can be formed by, for example, a vapor deposition method. Other examples of the conductive additive include carbon materials such as carbon black (e.g., acetylene black (AB)), graphite (black lead) particles, graphene, and fullerene. Alternatively, metal powder or metal fibers of copper, nickel, aluminum, silver, gold, or the like, a conductive ceramic material, or the like can be used.

Alternatively, a graphene compound may be used as the conductive additive.

A graphene compound has excellent electrical characteristics of high conductivity and excellent physical properties of high flexibility and high mechanical strength. Furthermore, a graphene compound has a planar shape. A graphene compound enables low-resistance surface contact. Furthermore, a graphene compound has extremely high conductivity even with a small thickness in some cases and thus allows a conductive path to be formed in an active material layer efficiently even with a small amount. For this reason, it is preferable to use a graphene compound as the conductive additive because the area where the active material and the conductive additive are in contact with each other can be increased. Here, it is particularly preferable to use, for example, graphene, multilayer graphene, or reduced graphene oxide (hereinafter "RGO") as a graphene compound. Note that RGO refers to a compound obtained by reducing graphene oxide (GO), for example.

In the case where an active material with a small particle diameter (e.g., 1 μm or less) is used, the specific surface area of the active material is large and thus more conductive paths for the active material particles are needed. Thus, the amount of conductive additive tends to increase and the supported amount of active material tends to decrease relatively. When the supported amount of active material decreases, the capacity of the secondary battery also decreases. In such a case, a graphene compound that can efficiently form a conductive path even in a small amount is particularly preferably used as the conductive additive because the supported amount of active material does not decrease.

A cross-sectional structure example of an active material layer 200 containing a graphene compound as a conductive additive is described below.

Figure 3A:
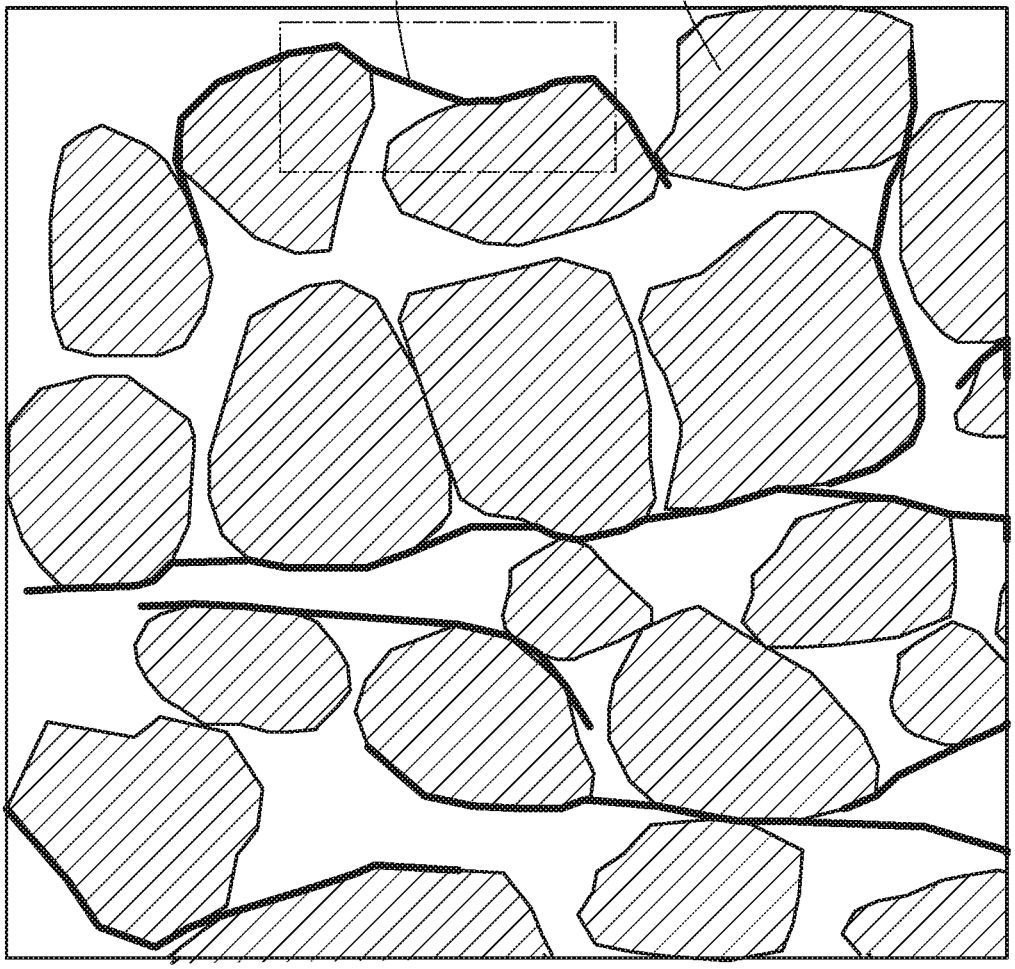
FIGS. 3A and 3B are cross-sectional views of an active material layer containing a graphene compound as a conductive additive.

FIG. 3A shows a longitudinal cross-sectional view of the active material layer 200. The active material layer 200 includes particles of the positive electrode active material 100, a graphene compound 201 serving as a conductive additive, and a binder (not illustrated). Here, graphene or multilayer graphene may be used as the graphene compound 201, for example. The graphene compound 201 preferably has a sheet-like shape. The graphene compound 201 may have a sheet-like shape formed of a plurality of sheets of multilayer graphene and/or a plurality of sheets of graphene that partly overlap with each other.

The longitudinal cross section of the active material layer 200 in FIG. 3A shows substantially uniform dispersion of the sheet-like graphene compounds 201 in the active material layer 200. The graphene compounds 201 are schematically shown by thick lines in FIG. 3A but are actually thin films each having a thickness corresponding to the thickness of a single layer or a multi-layer of carbon molecules. The plurality of graphene compounds 201 are formed in such a way as to partly coat or adhere to the surfaces of the plurality of positive electrode active material particles 100, so that the graphene compounds 201 make surface contact with the positive electrode active material particles 100.

Here, the plurality of graphene compounds are bonded to each other to form a net-like graphene compound sheet (hereinafter referred to as a graphene compound net or a graphene net). The graphene net covering the active material can function as a binder for bonding active materials. The amount of a binder can thus be reduced, or the binder does not have to be used. This can increase the proportion of the active material in the electrode volume or weight. That is to say, the capacity of the storage device can be increased.

Here, it is preferable to perform reduction after a layer to be the active material layer 200 is formed in such a manner that graphene oxide is used as the graphene compound 201 and mixed with an active material. When graphene oxide with extremely high dispersibility in a polar solvent is used for the formation of the graphene compounds 201, the graphene compounds 201 can be substantially uniformly dispersed in the active material layer 200. The solvent is removed by volatilization from a dispersion medium in which graphene oxide is uniformly dispersed, and the graphene oxide is reduced; hence, the graphene compounds 201 remaining in the active material layer 200 partly overlap with each other and are dispersed such that surface contact is made, thereby forming a three-dimensional conduction path. Note that graphene oxide can be reduced either by heat treatment or with the use of a reducing agent, for example.

Unlike a conductive additive in the form of particles, such as acetylene black, which makes point contact with an active material, the graphene compound 201 is capable of making low-resistance surface contact; accordingly, the electrical conduction between the positive electrode active material particles 100 and the graphene compounds 201 can be improved with a smaller amount of the graphene compound 201 than that of a normal conductive additive. This increases the proportion of the positive electrode active material 100 in the active material layer 200, resulting in increased discharge capacity of the storage device.

As the binder, a rubber material such as styrene-butadiene rubber (SBR), styrene-isoprene-styrene rubber, acrylonitrile-butadiene rubber, butadiene rubber, or ethylene-propylene-diene copolymer can be used, for example. Alternatively, fluororubber can be used as the binder.

For the binder, for example, water-soluble polymers are preferably used. As the water-soluble polymers, a polysaccharide and the like can be used. As the polysaccharide, a cellulose derivative such as carboxymethyl cellulose (CMC), methyl cellulose, ethyl cellulose, hydroxypropyl cellulose, diacetyl cellulose, or regenerated cellulose, starch, or the like can be used. It is more preferred that such water-soluble polymers be used in combination with any of the above rubber materials.

Alternatively, as the binder, a material such as polystyrene, poly(methyl acrylate), poly(methyl methacrylate) (PMMA), sodium polyacrylate, polyvinyl alcohol (PVA), polyethylene oxide (PEO), polypropylene oxide, polyimide, polyvinyl chloride, polytetrafluoroethylene, polyethylene, polypropylene, polyisobutylene, polyethylene terephthalate, nylon, polyvinylidene fluoride (PVdF), polyacrylonitrile (PAN), ethylene-propylene-diene polymer, polyvinyl acetate, or nitrocellulose is preferably used.

A plurality of the above materials may be used in combination for the binder.

For example, a material having a significant viscosity modifying effect and another material may be used in combination. For example, a rubber material or the like has high adhesion or high elasticity but may have difficulty in viscosity modification when mixed in a solvent. In such a case, a rubber material or the like is preferably mixed with a material having a significant viscosity modifying effect, for example. As a material having a significant viscosity modifying effect, for example, a water-soluble polymer is preferably used. An example of a water-soluble polymer having an especially significant viscosity modifying effect is the above-mentioned polysaccharide; for example, a cellulose derivative such as carboxymethyl cellulose (CMC), methyl cellulose, ethyl cellulose, hydroxypropyl cellulose, diacetyl cellulose, or regenerated cellulose, or starch can be used.

Note that a cellulose derivative such as carboxymethyl cellulose obtains a higher solubility when converted into a salt such as a sodium salt or an ammonium salt of carboxymethyl cellulose, and accordingly, easily exerts an effect as a viscosity modifier. The high solubility can also increase the dispersibility of an active material and other components in the formation of shiny for an electrode. In this specification, cellulose and a cellulose derivative used as a binder of an electrode include salts thereof.

The water-soluble polymers stabilize viscosity by being dissolved in water and allow stable dispersion of the active material and another material combined as a binder such as styrene-butadiene rubber in an aqueous solution. Furthermore, a water-soluble polymer is expected to be easily and stably adsorbed to an active material surface because it has a functional group. Many cellulose derivatives such as carboxymethyl cellulose have functional groups such as a hydroxyl group and a carboxyl group. Because of functional groups, polymers are expected to interact with each other and cover an active material surface in a large area.

In the case where the binder covering or being in contact with the active material surface forms a film, the film is expected to serve as a passivation film to suppress the decomposition of the electrolyte solution. Here, the passivation film refers to a film without electric conductivity or a film with extremely low electric conductivity, and can inhibit the decomposition of an electrolyte solution at a potential at which a battery reaction occurs in the case where the passivation film is formed on the active material surface, for example. It is preferred that the passivation film can conduct lithium ions while suppressing electric conduction.

<Positive Electrode Current Collector>

The positive electrode current collector can be formed using a material that has high conductivity, such as a metal like stainless steel, gold, platinum, aluminum, or titanium, or an alloy thereof. It is preferred that a material used for the positive electrode current collector not dissolve at the potential of the positive electrode. Alternatively, the positive electrode current collector can be formed using an aluminum alloy to which an element that improves heat resistance, such as silicon, titanium, neodymium, scandium, or molybdenum, is added. Still alternatively, a metal element that forms silicide by reacting with silicon can be used. Examples of the metal element that forms silicide by reacting with silicon include zirconium, titanium, hafnium, vanadium, niobium, tantalum, chromium, molybdenum, tungsten, cobalt, and nickel. The current collector can have any of various shapes including a foil-like shape, a plate-like shape (sheet-like shape), a net-like shape, a punching-metal shape, and an expanded-metal shape. The current collector preferably has a thickness of 5 μm to 30 μm.

[Negative Electrode]

The negative electrode includes a negative electrode active material layer and a negative electrode current collector. The negative electrode active material layer may contain a conductive additive and a binder.

<Negative Electrode Active Material>

As a negative electrode active material, for example, an alloy-based material or a carbon-based material can be used.

For the negative electrode active material, an element which enables charge-discharge reactions by an alloying reaction and a dealloying reaction with lithium can be used. For example, a material containing at least one of silicon, tin, gallium, aluminum, germanium, lead, antimony, bismuth, silver, zinc, cadmium, indium, and the like can be used. Such elements have higher capacity than carbon. In particular, silicon has a significantly high theoretical capacity of 4200 mAh/g. For this reason, silicon is preferably used as the negative electrode active material. Alternatively, a compound containing any of the above elements may be used. Examples of the compound include SiO, $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, and SbSn. Here, an element that enables charge-discharge reactions by an alloying reaction and a dealloying reaction with lithium, a compound containing the element, and the like may be referred to as an alloy-based material.

In this specification and the like, SiO refers, for example, to silicon monoxide. SiO can alternatively be expressed as $SiO_x$. Here, x preferably has an approximate value of 1. For example, x is preferably 0.2 or more and 1.5 or less, more preferably 0.3 or more and 1.2 or less.

As the carbon-based material, graphite, graphitizing carbon (soft carbon), non-graphitizing carbon (hard carbon), a carbon nanotube, graphene, carbon black, and the like can be used.

Examples of graphite include artificial graphite and natural graphite. Examples of artificial graphite include mesocarbon microbeads (MCMB), coke-based artificial graphite, and pitch-based artificial graphite. As artificial graphite, spherical graphite having a spherical shape can be used. For example, MCMB is preferably used because it may have a spherical shape. Moreover, MCMB may preferably be used because it can relatively easily have a small surface area. Examples of natural graphite include flake graphite and spherical natural graphite.

Graphite has a low potential substantially equal to that of a lithium metal (higher than or equal to 0.05 V and lower than or equal to 0.3 V vs. Li/Li$^+$) when lithium ions are intercalated into the graphite (while a lithium-graphite intercalation compound is formed). For this reason, a lithium-ion secondary battery can have a high operating voltage. In addition, graphite is preferred because of its advantages such as a relatively high capacity per unit volume, relatively small volume expansion, low cost, and higher level of safety than that of a lithium metal.

Alternatively, for the negative electrode active material, an oxide such as titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used.

Still alternatively, for the negative electrode active material, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

A nitride containing lithium and a transition metal is preferably used, in which case lithium ions are contained in the negative electrode active material and thus the negative electrode active material can be used in combination with a material for a positive electrode active material which does not contain lithium ions, such as $V_2O_5$ or $Cr_3O_8$. In the case of using a material containing lithium ions as a positive electrode active material, the nitride containing lithium and a transition metal can be used for the negative electrode active material by extracting the lithium ions contained in the positive electrode active material in advance.

Alternatively, a material which causes a conversion reaction can be used for the negative electrode active material; for example, a transition metal oxide which does not form an alloy with lithium, such as cobalt oxide (CoO), nickel oxide (NiO), and iron oxide (FeO), may be used. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$.

For the conductive additive and the binder that can be included in the negative electrode active material layer, materials similar to those of the conductive additive and the binder that can be included in the positive electrode active material layer can be used.

<Negative Electrode Current Collector>

For the negative electrode current collector, a material similar to that of the positive electrode current collector can be used. Note that a material which is not alloyed with a carrier ion such as lithium is preferably used for the negative electrode current collector.

[Electrolyte Solution]

The electrolyte solution contains a solvent and an electrolyte. As a solvent of the electrolyte solution, an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, ethyl acetate, methyl propionate, ethyl propionate, propyl propionate, methyl butyrate, 1,3-dioxane, 1,4-dioxane, dimethoxyethane (DME), dim ethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

When a gelled high-molecular material is used as the solvent of the electrolytic solution, safety against liquid leakage and the like is improved. Furthermore, a secondary battery can be thinner and more lightweight. Typical examples of gelled high-molecular materials include a silicone gel, an acrylic gel, an acrylonitrile gel, a polyethylene oxide-based gel, a polypropylene oxide-based gel, a gel of a fluorine-based polymer, and the like.

Alternatively, when one or more kinds of ionic liquids (room temperature molten salts) which have features of non-flammability and non-volatility is used as a solvent of the electrolyte solution, a secondary battery can be prevented from exploding or catching fire even when the secondary battery internally shorts out or the internal temperature increases owing to overcharging or the like. An ionic liquid contains a cation and an anion. The ionic liquid contains an organic cation and an anion. Examples of the organic cation used for the electrolyte solution include aliphatic onium cations such as a quaternary ammonium cation, a tertiary sulfonium cation, and a quaternary phosphonium cation, and aromatic cations such as an imidazolium cation and a pyridinium cation. Examples of the anion used for the electrolyte solution include a monovalent amide-based anion, a monovalent methide-based anion, a fluorosulfonate anion, a perfluoroalkylsulfonate anion, a tetrafluoroborate anion, a perfluoroalkylborate anion, a hexafluorophosphate anion, and a perfluoroalkylphosphate anion.

As an electrolyte dissolved in the above-described solvent, one of lithium salts such as $LiPF_6$, $LiClO_4$, $LiAsF_6$, $LiBF_4$, $LiAlCl_4$, Li SCN, LiBr, LiI, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, and $LiN(C_2F_5SO_2)_2$ can be used, or two or more of these lithium salts can be used in an appropriate combination in an appropriate ratio.

The electrolyte solution used for a storage device is preferably highly purified and contains a small amount of dust particles and elements other than the constituent elements of the electrolyte solution (hereinafter also simply referred to as impurities). Specifically, the weight ratio of impurities to the electrolyte solution is less than or equal to 1%, preferably less than or equal to 0.1%, and further preferably less than or equal to 0.01%.

Furthermore, an additive agent such as vinylene carbonate, propane sultone (PS), tert-butylbenzene (TBB), fluoroethylene carbonate (FEC), LiBOB, or a dinitrile compound such as succinonitrile or adiponitrile may be added to the electrolyte solution. The concentration of a material to be added with respect to the whole solvent is, for example, higher than or equal to 0.1 wt % and lower than or equal to 5 wt %.

Alternatively, a gelled electrolyte obtained in such a manner that a polymer is swelled with an electrolyte solution may be used.

Examples of the polymer include a polymer having a polyalkylene oxide structure, such as polyethylene oxide (PEO); PVDF; polyacrylonitrile; and a copolymer containing any of them. For example, PVDF-HFP, which is a copolymer of PVDF and hexafluoropropylene (HFP) can be used. The formed polymer may be porous.

Instead of the electrolyte solution, a solid electrolyte including an inorganic material such as a sulfide-based inorganic material or an oxide-based inorganic material, or a solid electrolyte including a high-molecular material such as a polyethylene oxide (PEO)-based high-molecular material may alternatively be used. When the solid electrolyte is used, a separator and a spacer are not necessary. Furthermore, since the battery can be entirely solidified, there is no possibility of liquid leakage to increase the safety of the battery dramatically.

[Separator]

The secondary battery preferably includes a separator. As the separator, for example, fiber containing cellulose such as paper; nonwoven fabric; glass fiber; ceramics; or synthetic fiber using nylon (polyamide), vinylon (polyvinyl alcohol-based fiber), polyester, acrylic, polyolefin, or polyurethane can be used. The separator is preferably formed to have an envelope-like shape to wrap one of the positive electrode and the negative electrode.

The separator may have a multilayer structure. For example, an organic material film such as polypropylene or polyethylene can be coated with a ceramic-based material, a fluorine-based material, a polyamide-based material, a mixture thereof, or the like. Examples of the ceramic-based material include aluminum oxide particles and silicon oxide particles. Examples of the fluorine-based material include PVDF and a polytetrafluoroethylene. Examples of the polyamide-based material include nylon and aramid (meta-based aramid and para-based aramid).

Deterioration of the separator in charging and discharging at high voltage can be suppressed and thus the reliability of the secondary battery can be improved because oxidation resistance is improved when the separator is coated with the ceramic-based material. In addition, when the separator is coated with the fluorine-based material, the separator is easily brought into close contact with an electrode, resulting in high output characteristics. When the separator is coated with the polyamide-based material, in particular, aramid, the safety of the secondary battery is improved because heat resistance is improved.

For example, both surfaces of a polypropylene film may be coated with a mixed material of aluminum oxide and aramid. Alternatively, a surface of the polypropylene film in contact with the positive electrode may be coated with the mixed material of aluminum oxide and aramid, and a surface of the polypropylene film in contact with the negative electrode may be coated with the fluorine-based material.

With the use of a separator having a multilayer structure, the capacity of the secondary battery per volume can be increased because the safety of the secondary battery can be maintained even when the total thickness of the separator is small.

Embodiment 3

In this embodiment, examples of a shape of a secondary battery containing the positive electrode active material 100 described in the above embodiment are described. For the materials used for the secondary battery described in this embodiment, the description of the above embodiment can be referred to.

[Coin-Type Secondary Battery]

Figure 4A:
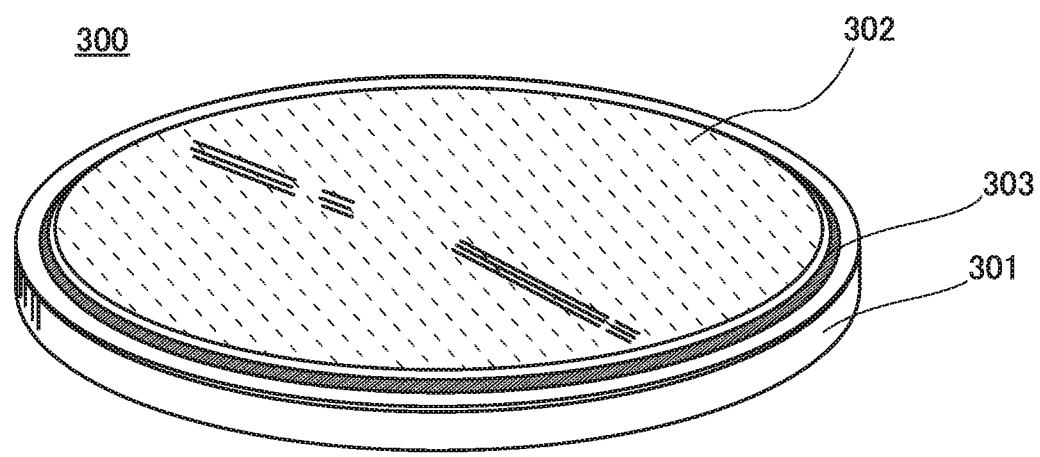
FIGS. 4A and 4B illustrate a coin-type secondary battery.
Figure 4B:
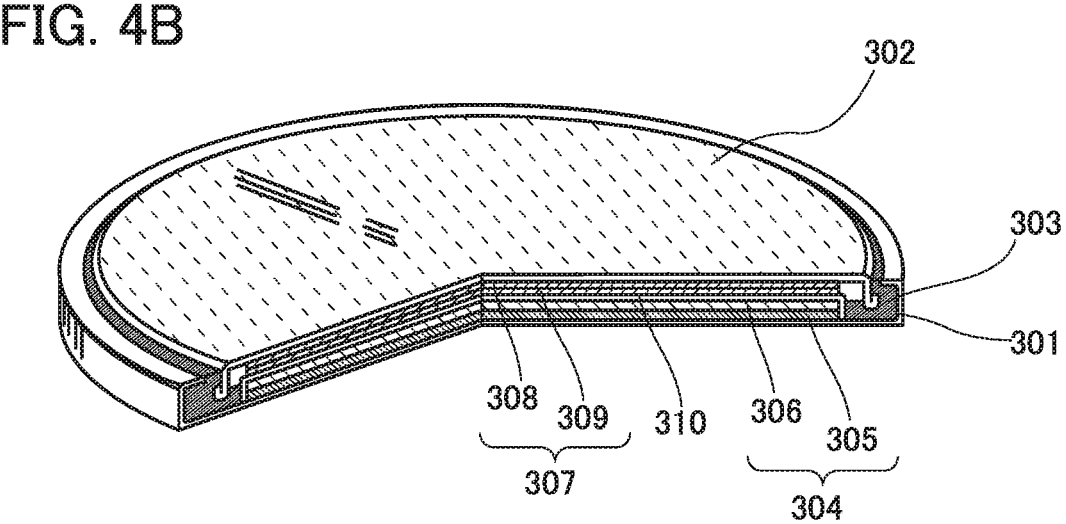

First, an example of a coin-type secondary battery is described. FIG. 4A is an external view of a coin-type (single-layer flat type) secondary battery, and FIG. 4B is a cross-sectional view thereof.

In a coin-type secondary battery 300, a positive electrode can 301 doubling as a positive electrode terminal and a negative electrode can 302 doubling as a negative electrode terminal are insulated from each other and sealed by a gasket 303 made of polypropylene or the like. A positive electrode 304 includes a positive electrode current collector 305 and a positive electrode active material layer 306 provided in contact with the positive electrode current collector 305. A negative electrode 307 includes a negative electrode current collector 308 and a negative electrode active material layer 309 provided in contact with the negative electrode current collector 308.

Note that only one surface of each of the positive electrode 304 and the negative electrode 307 used for the coin-type secondary battery 300 is provided with an active material layer.

For the positive electrode can 301 and the negative electrode can 302, a metal having a corrosion-resistant property to an electrolyte solution, such as nickel, aluminum, or titanium, an alloy of such a metal, or an alloy of such a metal and another metal (e.g., stainless steel) can be used. Alternatively, the positive electrode can 301 and the negative electrode can 302 are preferably covered with nickel, aluminum, or the like in order to prevent corrosion due to the electrolyte solution. The positive electrode can 301 and the negative electrode can 302 are electrically connected to the positive electrode 304 and the negative electrode 307, respectively.

The negative electrode 307, the positive electrode 304, and the separator 310 are immersed in the electrolyte solution. Then, as illustrated in FIG. 4B, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 located therebetween. In such a manner, the coin-type secondary battery 300 can be manufactured.

When the positive electrode active material described in the above embodiment is used in the positive electrode 304, the coin-type secondary battery 300 with high capacity and excellent cycle characteristics can be obtained.

[Cylindrical Secondary Battery]

Figure 5A:
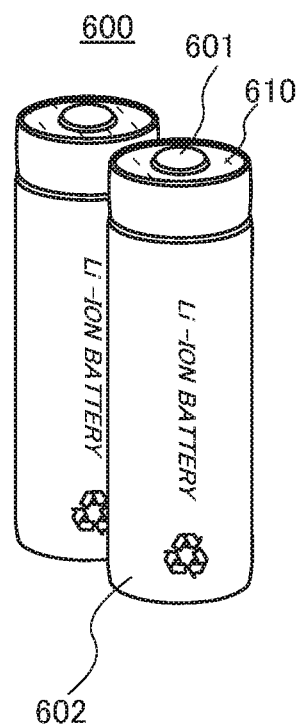
FIGS. 5A and 5B illustrate a cylindrical secondary battery.

Next, an example of a cylindrical secondary battery will be described with reference to FIGS. 5A and 5B. A cylindrical secondary battery 600 includes, as illustrated in FIG. 5A, a positive electrode cap (battery lid) 601 on the top surface and a battery can (outer can) 602 on the side and bottom surfaces. The positive electrode cap 601 and the battery can 602 are insulated from each other by a gasket (insulating gasket) 610.

Figure 5B:
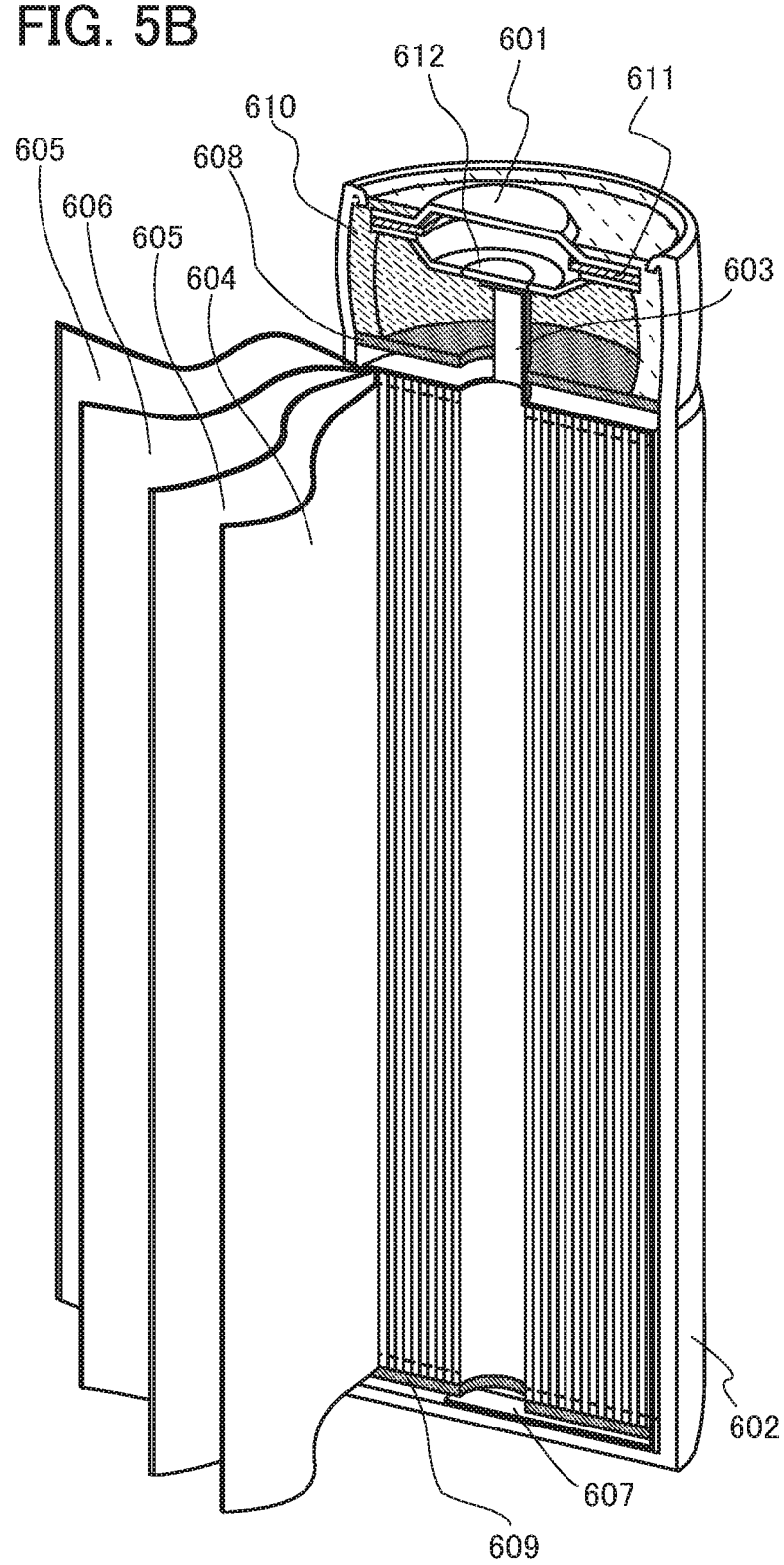

FIG. 5B is a diagram schematically illustrating a cross-section of the cylindrical secondary battery. Inside the battery can 602 having a hollow cylindrical shape, a battery element in which a strip-like positive electrode 604 and a strip-like negative electrode 606 are wound with a strip-like separator 605 interposed therebetween is provided. Although not illustrated, the battery element is wound around a center pin. One end of the battery can 602 is close and the other end thereof is open. For the battery can 602, a metal having a corrosion-resistant property to an electrolytic solution, such as nickel, aluminum, or titanium, an alloy of such a metal, or an alloy of such a metal and another metal (e.g., stainless steel or the like) can be used. The battery can 602 is preferably covered with nickel, aluminum, or the like in order to prevent corrosion caused by the electrolytic solution. Inside the battery can 602, the battery element in which the positive electrode, the negative electrode, and the separator are wound is provided between a pair of insulating plates 608 and 609 which face each other. Furthermore, a nonaqueous electrolyte solution (not illustrated) is injected inside the battery can 602 provided with the battery element. As the nonaqueous electrolyte solution, a nonaqueous electrolyte solution that is similar to that of the coin-type secondary battery can be used.

Since the positive electrode and the negative electrode of the cylindrical secondary battery are wound, active materials are preferably formed on both sides of the current collectors. A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed using a metal material such as aluminum. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a positive temperature coefficient (PTC) element 611. The safety valve mechanism 612 cuts off electrical connection between the positive electrode cap 601 and the positive electrode 604 when the internal pressure of the battery exceeds a predetermined threshold value. The PTC element 611, which serves as a thermally sensitive resistor whose resistance increases as temperature rises, limits the amount of current by increasing the resistance, in order to prevent abnormal heat generation. Barium titanate ($BaTiO_3$)-based semiconductor ceramic can be used for the PTC element.

When the positive electrode active material described in the above embodiment is used in the positive electrode 604, the cylindrical secondary battery 600 with high capacity and excellent cycle characteristics can be obtained.

[Structural Example of Power Storage Device]

Other structural examples of power storage devices will be described with reference to FIGS. 6A and 6B, FIGS. 7A1 to 7B2, FIGS. 8A and 8B, FIGS. 9A and 9B, and FIG. 10.

Figure 6A:
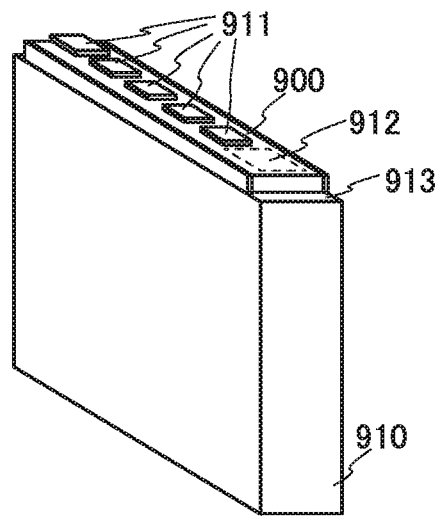
FIGS. 6A and 6B illustrate an example of a manufacturing method of a secondary battery.
Figure 6B:
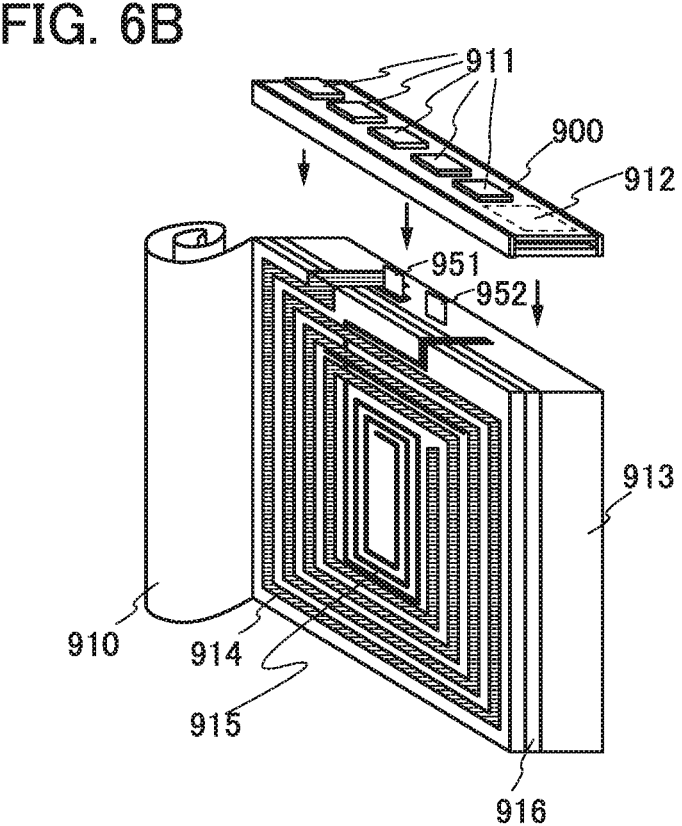

FIGS. 6A and 6B are external views of a power storage device. The power storage device includes a circuit board 900 and a secondary battery 913. A label 910 is attached to the secondary battery 913. As shown in FIG. 6B, the power storage device further includes a terminal 951, a terminal 952, an antenna 914, and an antenna 915.

The circuit board 900 includes terminals 911 and a circuit 912. The terminals 911 are connected to the terminals 951 and 952, the antennas 914 and 915, and the circuit 912. Note that a plurality of terminals 911 serving as a control signal input terminal, a power supply terminal, and the like may be provided.

The circuit 912 may be provided on the rear surface of the circuit board 900. The shape of each of the antennas 914 and 915 is not limited to a coil shape and may be a linear shape or a plate shape. Further, a planar antenna, an aperture antenna, a traveling-wave antenna, an EH antenna, a magnetic-field antenna, or a dielectric antenna may be used. Alternatively, the antenna 914 or the antenna 915 may be a flat-plate conductor. The flat-plate conductor can serve as one of conductors for electric field coupling. That is, the antenna 914 or the antenna 915 can serve as one of two conductors of a capacitor. Thus, electric power can be transmitted and received not only by an electromagnetic field or a magnetic field but also by an electric field.

The line width of the antenna 914 is preferably larger than that of the antenna 915. This makes it possible to increase the amount of electric power received by the antenna 914.

The power storage device includes a layer 916 between the secondary battery 913 and the antennas 914 and 915. The layer 916 has a function of blocking an electromagnetic field from the secondary battery 913, for example. As the layer 916, for example, a magnetic body can be used.

Note that the structure of the power storage device is not limited to that shown in FIGS. 6A and 6B.

Figures 1, 7A:
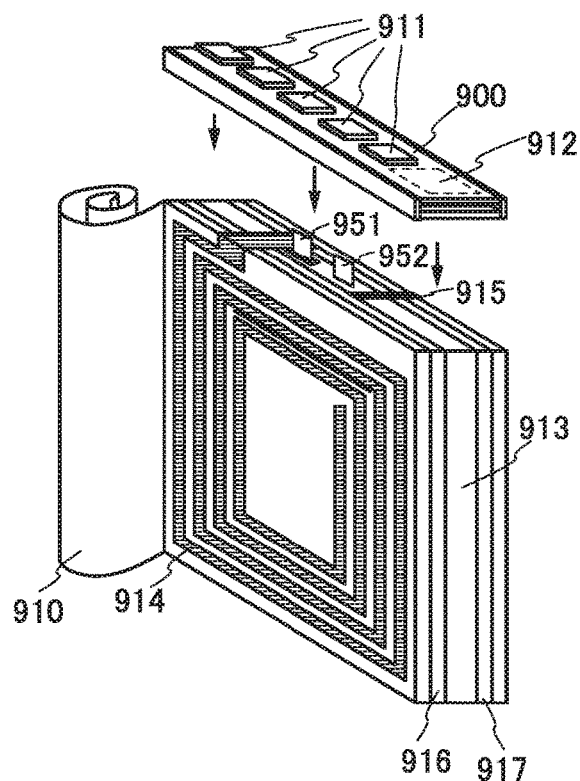
Figures 2, 7A:
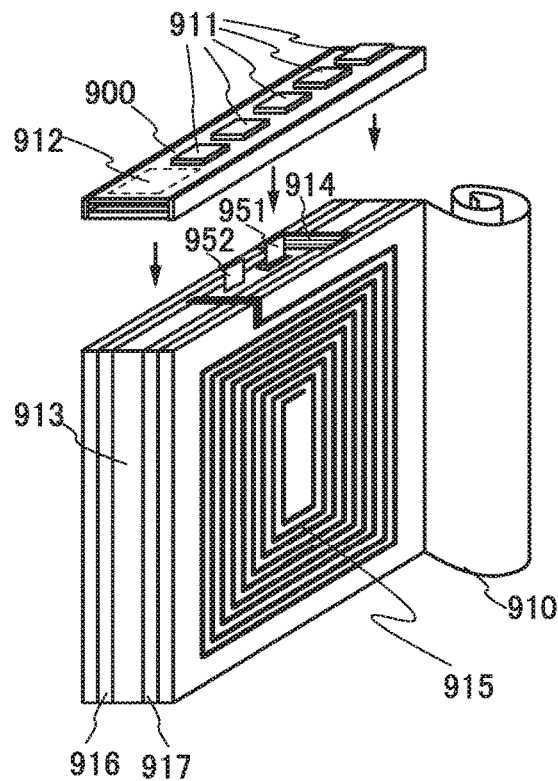

For example, as shown in FIGS. 7A1 and 7A2, two opposite surfaces of the secondary battery 913 in FIGS. 6A and 6B may be provided with respective antennas. FIG. 7A1 is an external view showing one side of the opposite surfaces, and FIG. 7A2 is an external view showing the other side of the opposite surfaces. For portions similar to those in FIGS. 6A and 6B, a description of the power storage device illustrated in FIGS. 6A and 6B can be referred to as appropriate.

As illustrated in FIG. 7A1, the antenna 914 is provided on one of the opposing surfaces of the secondary battery 913 with the layer 916 provided therebetween. As illustrated in FIG. 7A2, the antenna 915 is provided on the other of the opposing surfaces of the secondary battery 913 with the layer 917 provided therebetween. The layer 917 may have a function of preventing an adverse effect on an electromagnetic field by the secondary battery 913, for example. As the layer 917, for example, a magnetic body can be used.

With the above structure, both of the antennas 914 and 915 can be increased in size.

Figures 1, 7B:
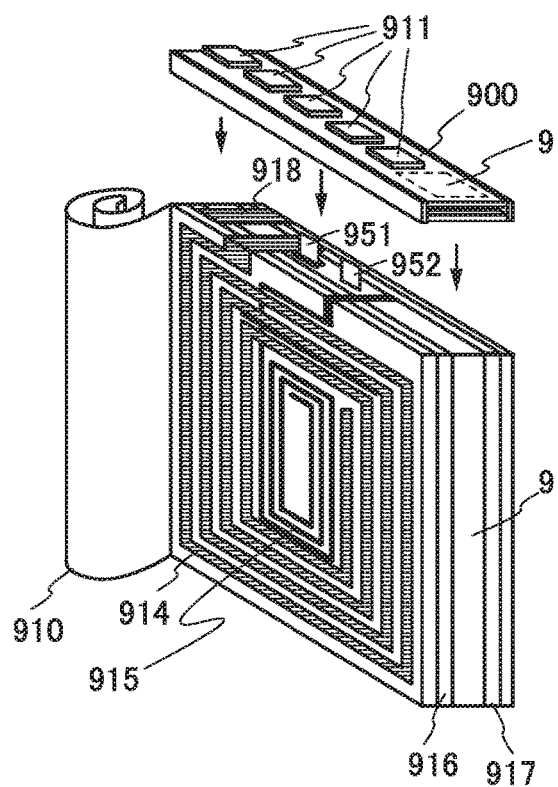
Figures 2, 7B:
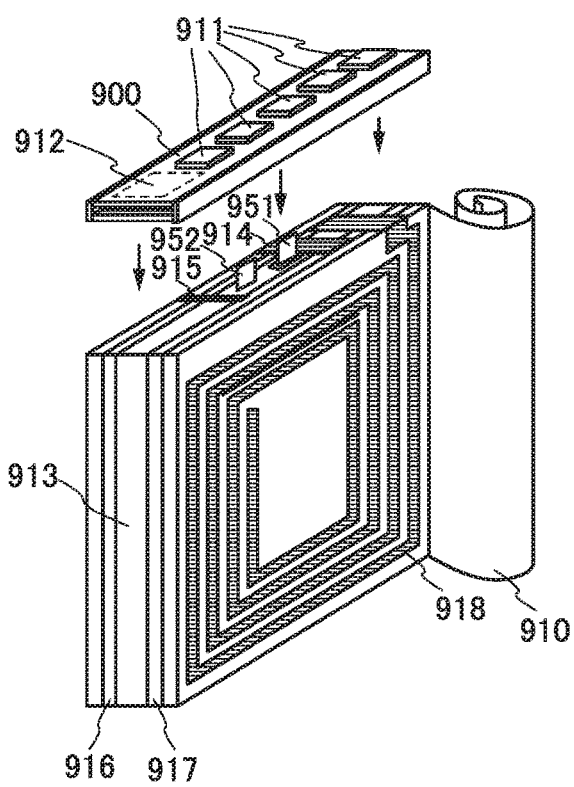

Alternatively, as illustrated in FIG. 7B2, the secondary battery 913 illustrated in FIGS. 6A and 6B may be provided with a sensor 921. The sensor 921 is electrically connected to the terminal 911 via a terminal 922 and the circuit board 900. For portions similar to those in FIGS. 6A and 6B, a description of the storage device illustrated in FIGS. 6A and 6B can be referred to as appropriate.

As illustrated in FIG. 7B1, the antennas 914 and 915 are provided on one of the opposite surfaces of the secondary battery 913 with the layer 916 interposed therebetween. As illustrated in FIG. 7B2, an antenna 918 is provided on the other of the opposite surfaces of the secondary battery 913 with the layer 917 interposed therebetween. The antenna 918 has a function of communicating data with an external device, for example. An antenna with a shape that can be applied to the antennas 914 and 915, for example, can be used as the antenna 918. As a system for communication using the antenna 918 between the power storage device and another device, a response method that can be used between the power storage device and another device, such as NFC, can be employed.

Figure 8A:
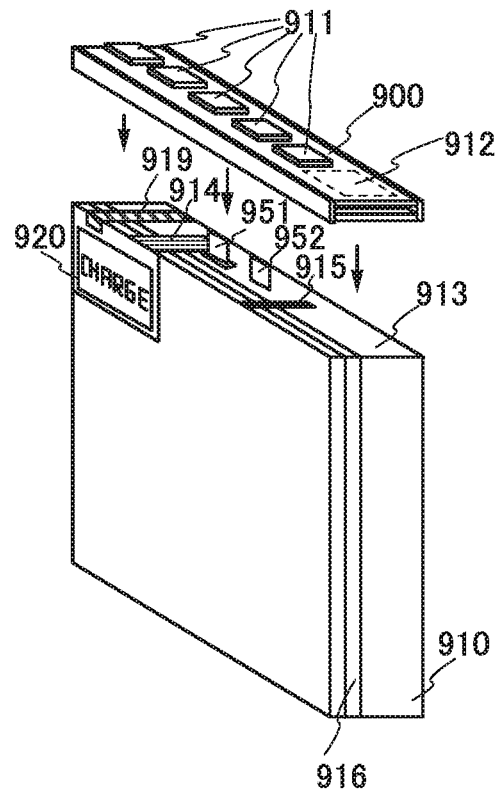
FIGS. 8A and 8B illustrate an example of a secondary battery.

Alternatively, as illustrated in FIG. 8A, the secondary battery 913 in FIGS. 6A and 6B may be provided with a display device 920. The display device 920 is electrically connected to the terminal 911 via a terminal 919. It is possible that the label 910 is not provided in a portion where the display device 920 is provided. For portions similar to those in FIGS. 6A and 6B, a description of the power storage device illustrated in FIGS. 6A and 6B can be referred to as appropriate.

The display device 920 can display, for example, an image showing whether charging is being carried out, an image showing the amount of stored power, or the like. As the display device 920, electronic paper, a liquid crystal display device, an electroluminescent (EL) display device, or the like can be used. For example, the use of electronic paper can reduce power consumption of the display device 920.

Figure 8B:
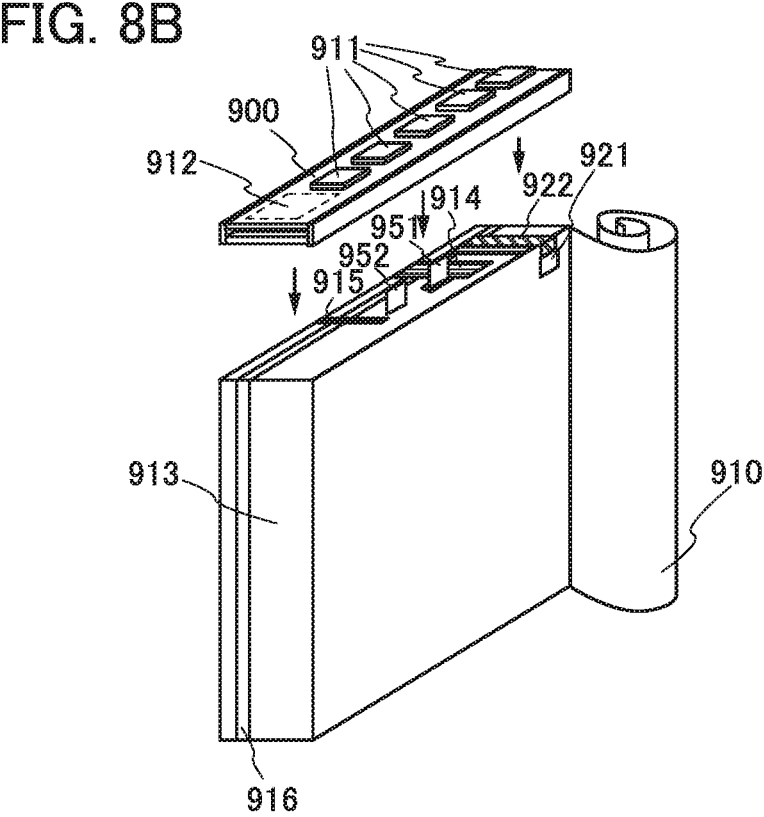

Alternatively, as illustrated in FIG. 8B, the secondary battery 913 illustrated in FIGS. 6A and 6B may be provided with a sensor 921. The sensor 921 is electrically connected to the terminal 911 via a terminal 922. For portions similar to those in FIGS. 6A and 6B, a description of the power storage device illustrated in FIGS. 6A and 6B can be referred to as appropriate.

The sensor 921 has a function of measuring, for example, displacement, position, speed, acceleration, angular velocity, rotational frequency, distance, light, liquid, magnetism, temperature, chemical substance, sound, time, hardness, electric field, electric current, voltage, electric power, radiation, flow rate, humidity, gradient, oscillation, odor, or infrared rays. With the sensor 921, for example, data on an environment (e.g., temperature) where the storage device is placed can be determined and stored in a memory inside the circuit 912.

Furthermore, structural examples of the secondary battery 913 will be described with reference to FIGS. 9A and 9B and FIG. 10.

Figure 9A:
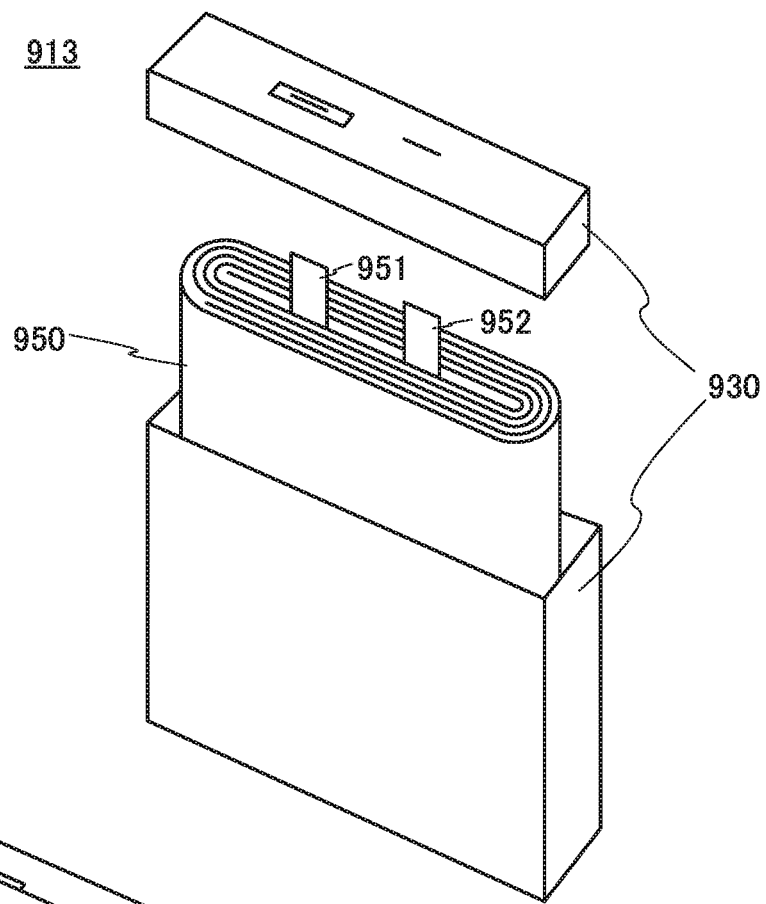
FIGS. 9A and 9B illustrate an example of a secondary battery.

The secondary battery 913 illustrated in FIG. 9A includes a wound body 950 provided with the terminals 951 and 952 inside a housing 930. The wound body 950 is soaked in an electrolyte solution inside the housing 930. The terminal 952 is in contact with the housing 930. An insulator or the like inhibits contact between the terminal 951 and the housing 930. Note that in FIG. 9A, the housing 930 divided into two pieces is illustrated for convenience; however, in the actual structure, the wound body 950 is covered with the housing 930 and the terminals 951 and 952 extend to the outside of the housing 930. For the housing 930, a metal material (such as aluminum) or a resin material can be used.

Figure 9B:
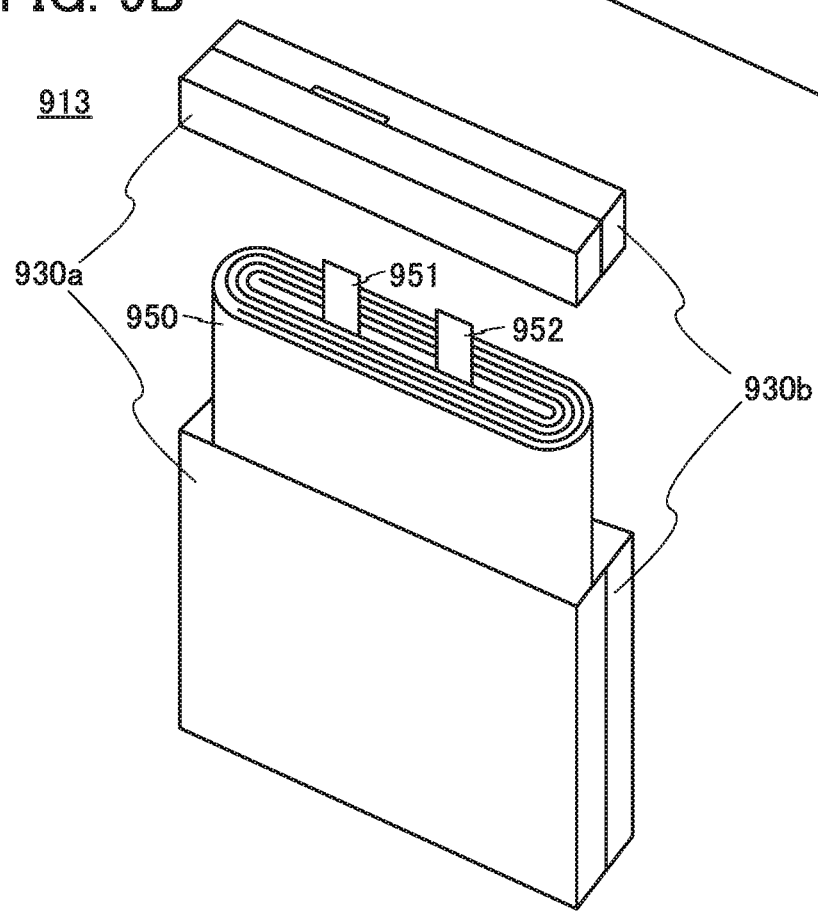

Note that as illustrated in FIG. 9B, the housing 930 in FIG. 9A may be formed using a plurality of materials. For example, in the secondary battery 913 in FIG. 9B, a housing 930a and a housing 930b are bonded to each other, and the wound body 950 is provided in a region surrounded by the housing 930*a* and the housing 930*b*.

For the housing 930*a*, an insulating material such as an organic resin can be used. In particular, when a material such as an organic resin is used for the side on which an antenna is formed, blocking of an electric field from the secondary battery 913 can be inhibited. When an electric field is not significantly blocked by the housing 930*a*, an antenna such as the antennas 914 and 915 may be provided inside the housing 930*a*. For the housing 930*b*, a metal material can be used, for example.

Figure 10:
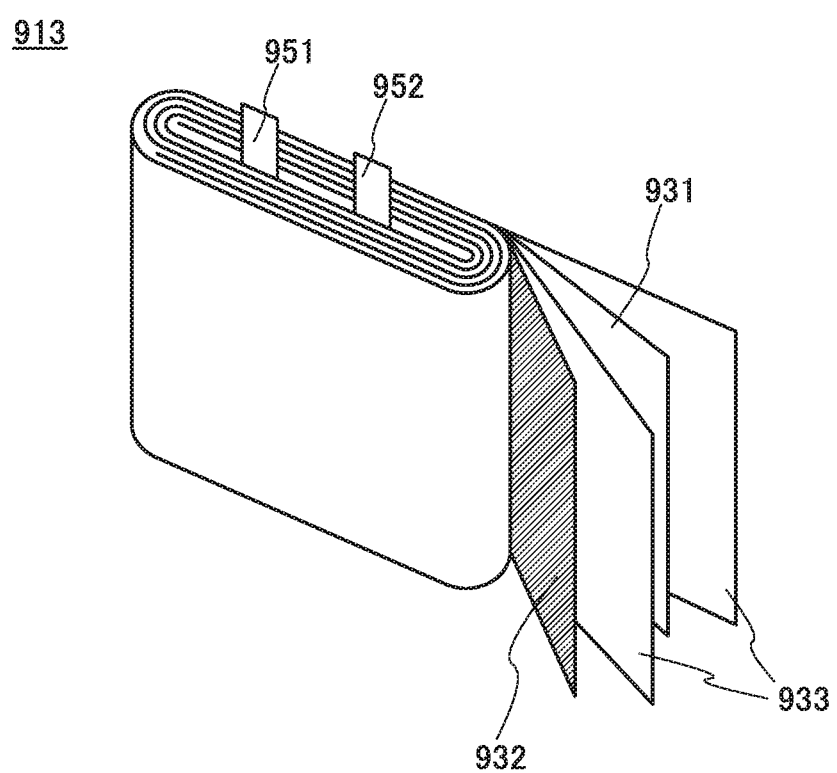
FIG. 10 illustrates an example of a secondary battery.

FIG. 10 illustrates the structure of the wound body 950. The wound body 950 includes a negative electrode 931, a positive electrode 932, and separators 933. The wound body 950 is obtained by winding a sheet of a stack in which the negative electrode 931 overlaps with the positive electrode 932 with the separator 933 provided therebetween. Note that a plurality of stacks each including the negative electrode 931, the positive electrode 932, and the separator 933 may be stacked.

The negative electrode 931 is connected to the terminal 911 in FIGS. 6A and 6B via one of the terminals 951 and 952. The positive electrode 932 is connected to the terminal 911 in FIGS. 6A and 6B via the other of the terminals 951 and 952.

When the positive electrode active material described in the above embodiment is used in the positive electrode 932, the secondary battery 913 with high capacity and excellent cycle characteristics can be obtained.

[Laminated Secondary Battery]

Next, an example of a laminated secondary battery will be described with reference to FIGS. 11A to 11C, FIGS. 12A and 12B, FIG. 13, FIG. 14, FIGS. 15A to 15C, FIGS. 16A, 16B1, 16B2, 16C, and 16D, and FIGS. 17A and 17B. When the laminated secondary battery has flexibility and is used in an electronic device at least part of which is flexible, the secondary battery can be bent as the electronic device is bent.

A laminated secondary battery 980 is described with reference to FIGS. 11A to 11C. The laminated secondary battery 980 includes a wound body 993 illustrated in FIG. 11A. The wound body 993 includes a negative electrode 994, a positive electrode 995, and a separator 996. The wound body 993 is, like the wound body 950 illustrated in FIG. 11, obtained by winding a sheet of a stack in which the negative electrode 994 overlaps with the positive electrode 995 with the separator 996 therebetween.

Note that the number of stacks each including the negative electrode 994, the positive electrode 995, and the separator 996 may be determined as appropriate depending on capacity and an element volume which are required. The negative electrode 994 is connected to a negative electrode current collector (not illustrated) via one of a lead electrode 997 and a lead electrode 998. The positive electrode 995 is connected to a positive electrode current collector (not illustrated) via the other of the lead electrode 997 and the lead electrode 998.

Figure 11A:
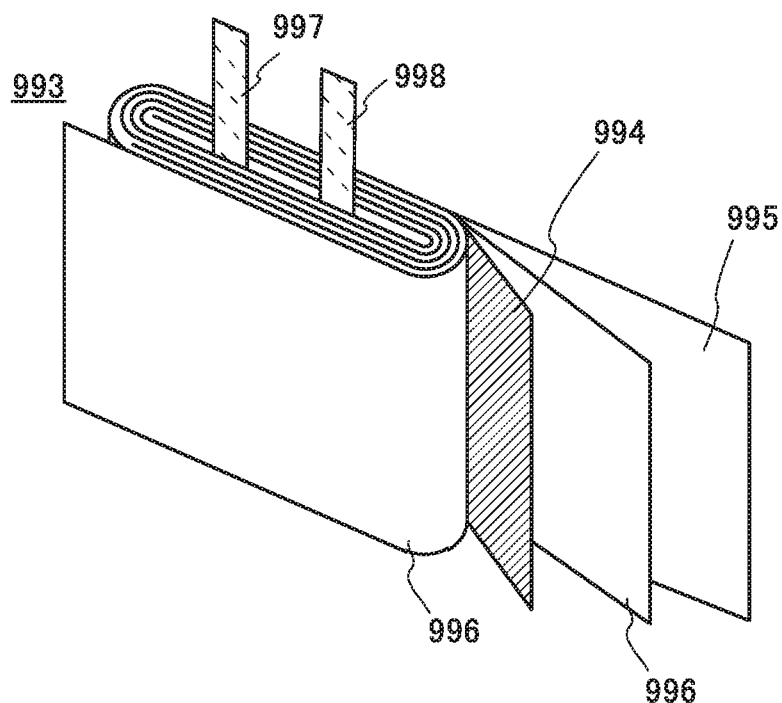
FIGS. 11A to 11C illustrate a laminated secondary battery.
Figure 11B:
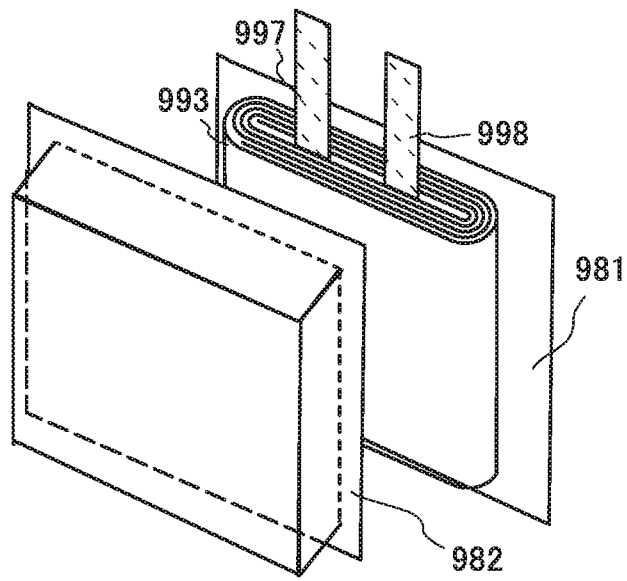
Figure 11C:
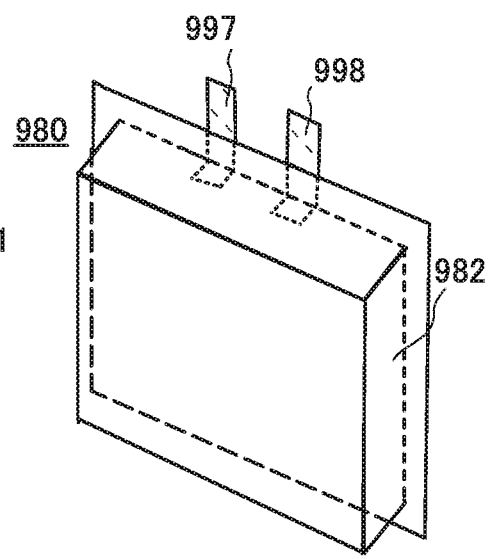

As illustrated in FIG. 11B, the wound body 993 is packed in a space formed by bonding a film 981 and a film 982 having a depressed portion that serve as exterior bodies by thermocompression bonding or the like, whereby the secondary battery 980 can be formed as illustrated in FIG. 11C. The wound body 993 includes the lead electrode 997 and the lead electrode 998, and is soaked in an electrolyte solution inside a space surrounded by the film 981 and the film 982 having a depressed portion.

For the film 981 and the film 982 having a depressed portion, a metal material such as aluminum or a resin material can be used, for example. With the use of a resin material for the film 981 and the film 982 having a depressed portion, the film 981 and the film 982 having a depressed portion can be changed in their forms when external force is applied; thus, a flexible secondary battery can be fabricated.

Although FIGS. 11B and 11C illustrate an example where a space is formed by two films, the wound body 993 may be placed in a space formed by bending one film.

When the positive electrode active material described in the above embodiment is used in the positive electrode 995, the secondary battery 980 with high capacity and excellent cycle characteristics can be obtained.

Figure 12A:
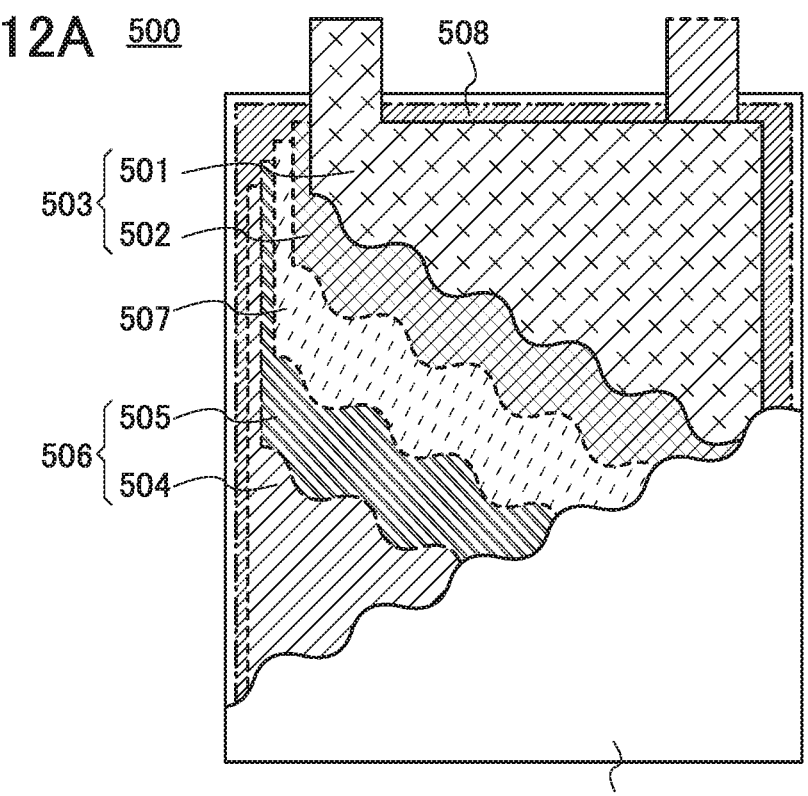
FIGS. 12A and 12B illustrate a laminated secondary battery.
Figure 12B:
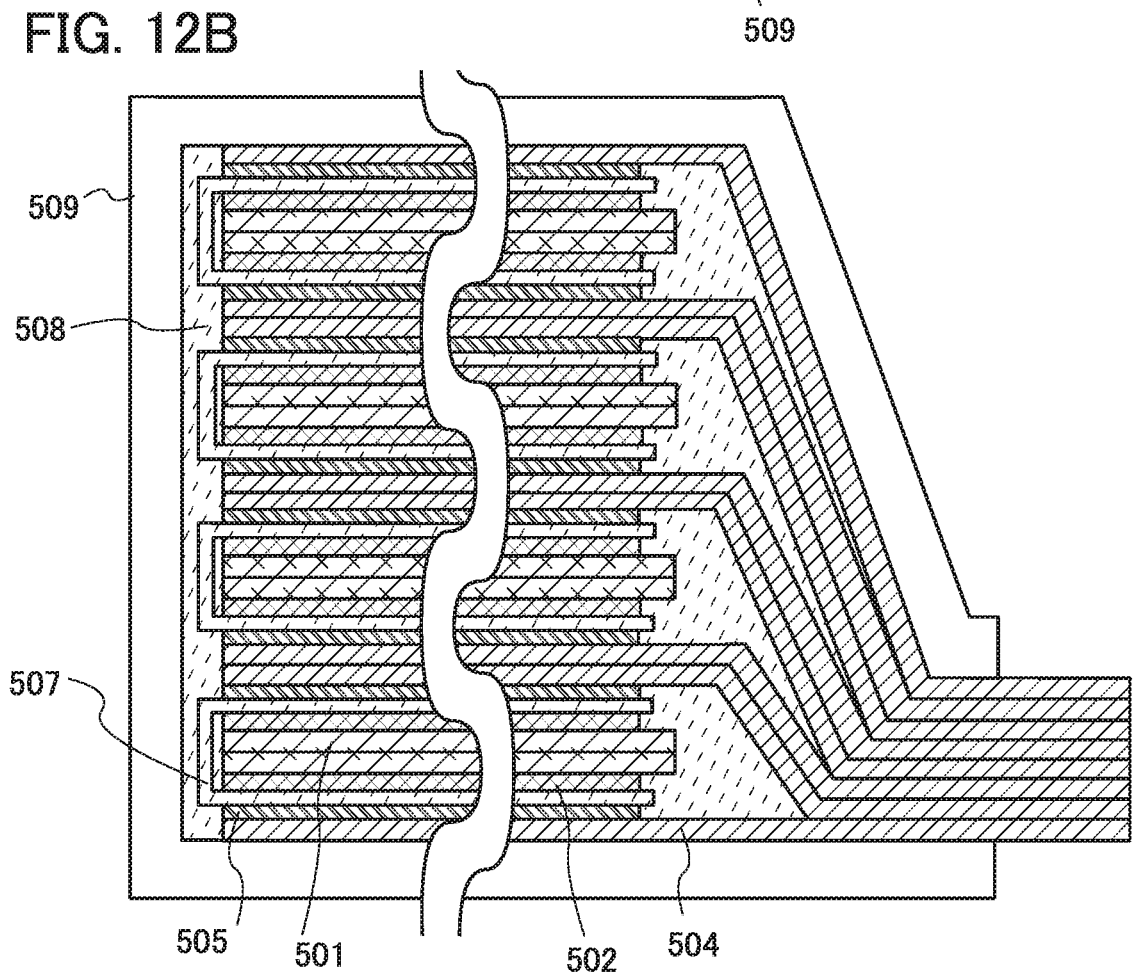

In FIGS. 11A to 11C, an example in which the secondary battery 980 includes a wound body in a space formed by films serving as exterior bodies is described; however, as illustrated in FIGS. 12A and 12B, a secondary battery may include a plurality of strip-shaped positive electrodes, a plurality of strip-shaped separators, and a plurality of strip-shaped negative electrodes in a space formed by films serving as exterior bodies, for example.

A laminated secondary battery 500 illustrated in FIG. 12A includes a positive electrode 503 including a positive electrode current collector 501 and a positive electrode active material layer 502, a negative electrode 506 including a negative electrode current collector 504 and a negative electrode active material layer 505, a separator 507, an electrolyte solution 508, and an exterior body 509. The separator 507 is provided between the positive electrode 503 and the negative electrode 506 in the exterior body 509. The exterior body 509 is filled with the electrolyte solution 508. The electrolyte solution described in Embodiment 2 can be used for the electrolyte solution 508.

In the laminated secondary battery 500 illustrated in FIG. 12A, the positive electrode current collector 501 and the negative electrode current collector 504 also serve as terminals for an electrical contact with an external portion. For this reason, the positive electrode current collector 501 and the negative electrode current collector 504 may be arranged so as to be partly exposed to the outside of the exterior body 509. Alternatively, a lead electrode and the positive electrode current collector 501 or the negative electrode current collector 504 may be bonded to each other by ultrasonic welding, and instead of the positive electrode current collector 501 and the negative electrode current collector 504, the lead electrode may be exposed to the outside of the exterior body 509.

As the exterior body 509 of the laminated secondary battery 500, for example, a laminate film having a three-layer structure can be employed in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided over the metal thin film as the outer surface of the exterior body.

FIG. 12B illustrates an example of a cross-sectional structure of the laminated secondary battery 500. Although FIG. 12A illustrates an example including only two current collectors for simplicity, an actual battery includes a plurality of electrode layers.

The example in FIG. 12B includes 16 electrode layers. The laminated secondary battery 500 has flexibility even though including 16 electrode layers. FIG. 12B illustrates a structure including 8 layers of negative electrode current collectors 504 and 8 layers of positive electrode current collectors 501, i.e., 16 layers in total. Note that FIG. 12B illustrates a cross section of the lead portion of the negative electrode, and the 8 negative electrode current collectors 504 are bonded to each other by ultrasonic welding. It is needless to say that the number of electrode layers is not limited to 16, and may be more than 16 or less than 16. With a large number of electrode layers, the secondary battery can have high capacity. In contrast, with a small number of electrode layers, the secondary battery can have small thickness and high flexibility.

Figure 13:
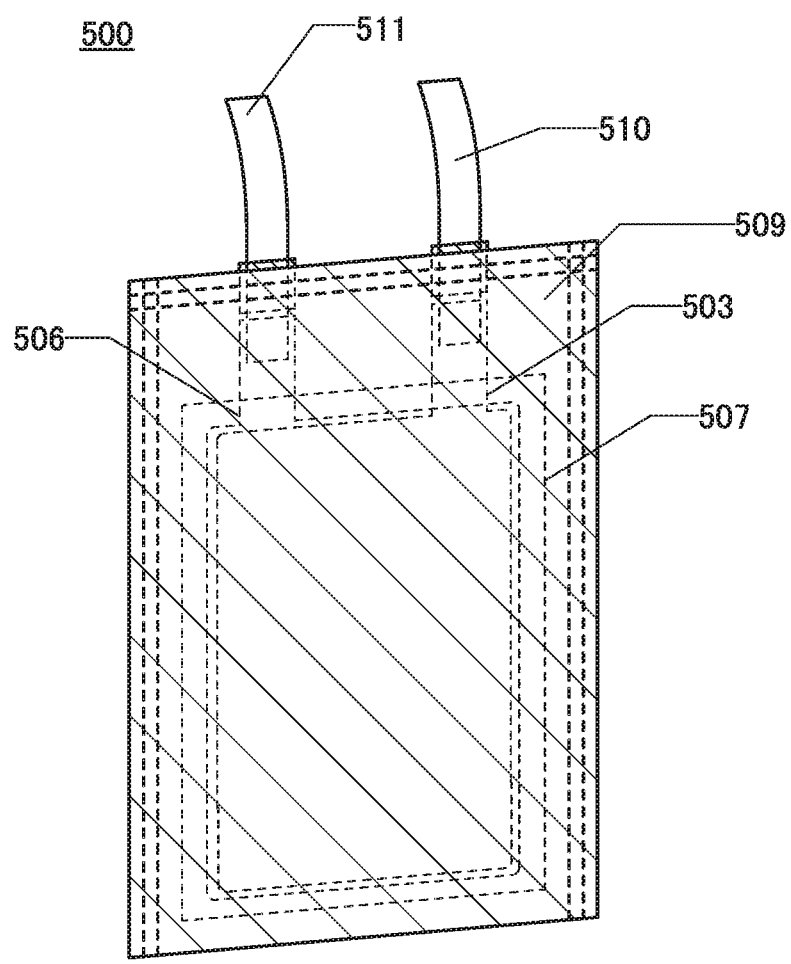
FIG. 13 is an external view of a secondary battery.
Figure 14:
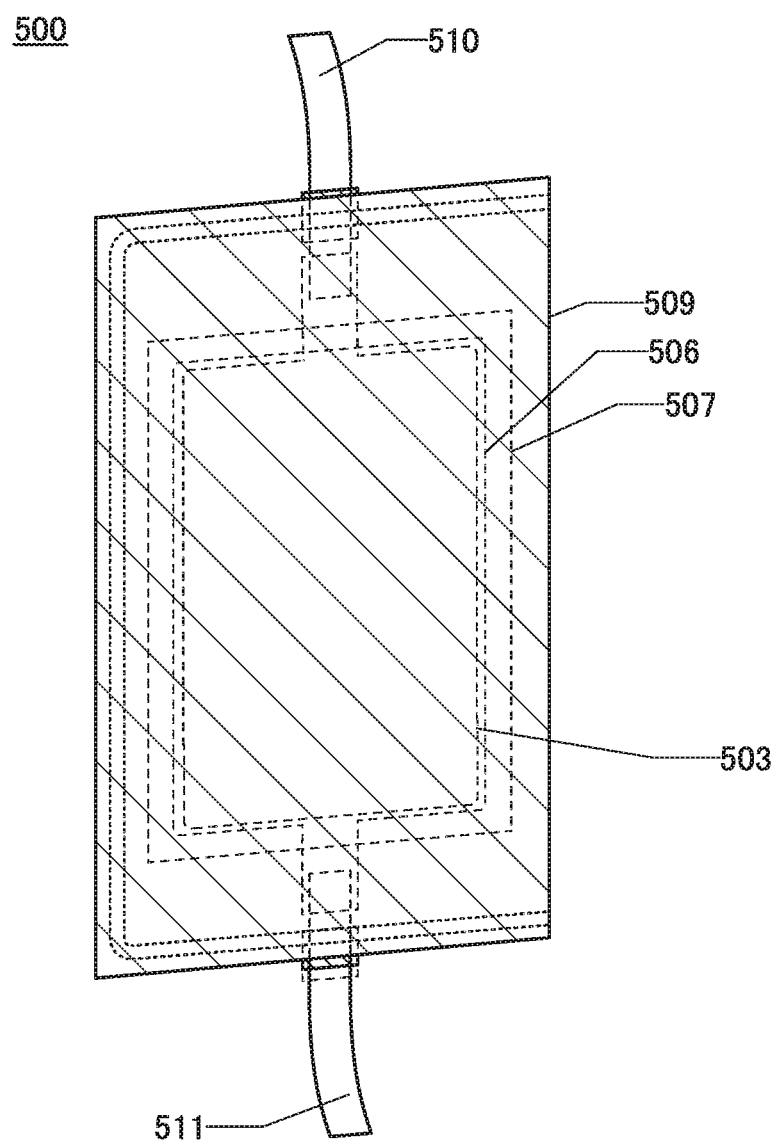
FIG. 14 is an external view of a secondary battery.

FIGS. 13 and 14 each illustrate an example of the external view of the laminated secondary battery 500. In FIGS. 13 and 14, the positive electrode 503, the negative electrode 506, the separator 507, the exterior body 509, a positive electrode lead electrode 510, and a negative electrode lead electrode 511 are included.

Figure 15A:
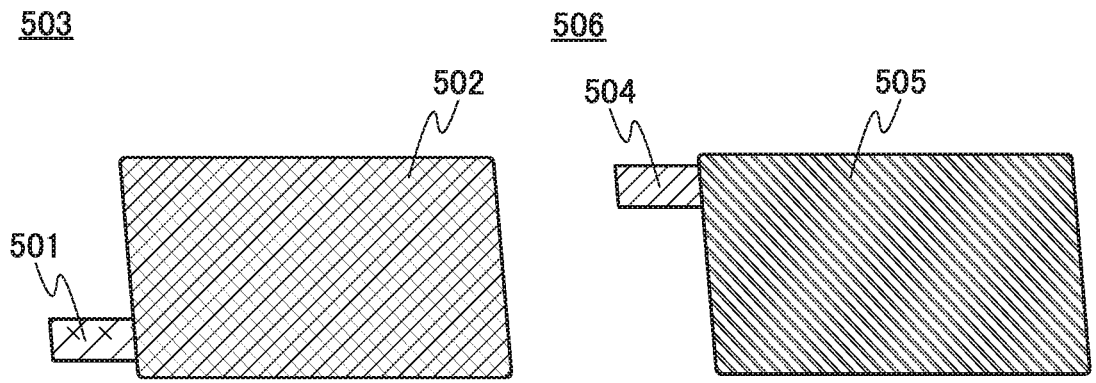
FIGS. 15A to 15C illustrate a manufacturing method of a secondary battery.

FIG. 15A illustrates external views of the positive electrode 503 and the negative electrode 506. The positive electrode 503 includes the positive electrode current collector 501, and the positive electrode active material layer 502 is formed on a surface of the positive electrode current collector 501. The positive electrode 503 also includes a region where the positive electrode current collector 501 is partly exposed (hereinafter referred to as a tab region). The negative electrode 506 includes the negative electrode current collector 504, and the negative electrode active material layer 505 is formed on a surface of the negative electrode current collector 504. The negative electrode 506 also includes a region where the negative electrode current collector 504 is partly exposed, that is, a tab region. The areas and the shapes of the tab regions included in the positive electrode and the negative electrode are not limited to those illustrated in FIG. 15A.

[Method for Manufacturing Laminated Secondary Battery]

Figure 15B:
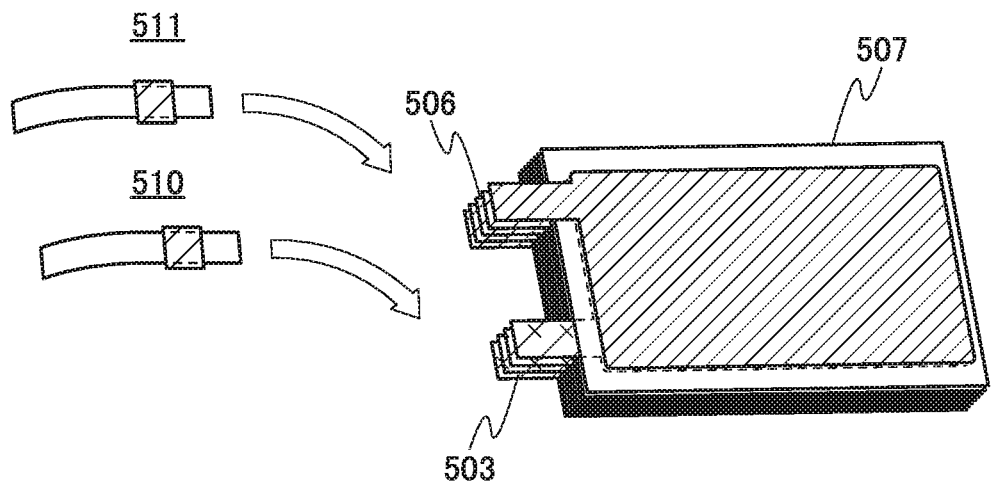

Here, an example of a method for manufacturing the laminated secondary battery whose external view is illustrated in FIG. 12 will be described with reference to FIGS. 15B and 15C.

First, the negative electrode 506, the separator 507, and the positive electrode 503 are stacked. FIG. 15B illustrates a stack including the negative electrode 506, the separator 507, and the positive electrode 503. An example described here includes 5 negative electrodes and 4 positive electrodes. Next, the tab regions of the positive electrodes 503 are bonded to each other, and the tab region of the positive electrode on the outermost surface and the positive electrode lead electrode 510 are bonded to each other. The bonding can be performed by ultrasonic welding, for example. In a similar manner, the tab regions of the negative electrodes 506 are bonded to each other, and the negative electrode lead electrode 511 is bonded to the tab region of the negative electrode on the outermost surface.

After that, the negative electrode 506, the separator 507, and the positive electrode 503 are placed over the exterior body 509.

Figure 15C:
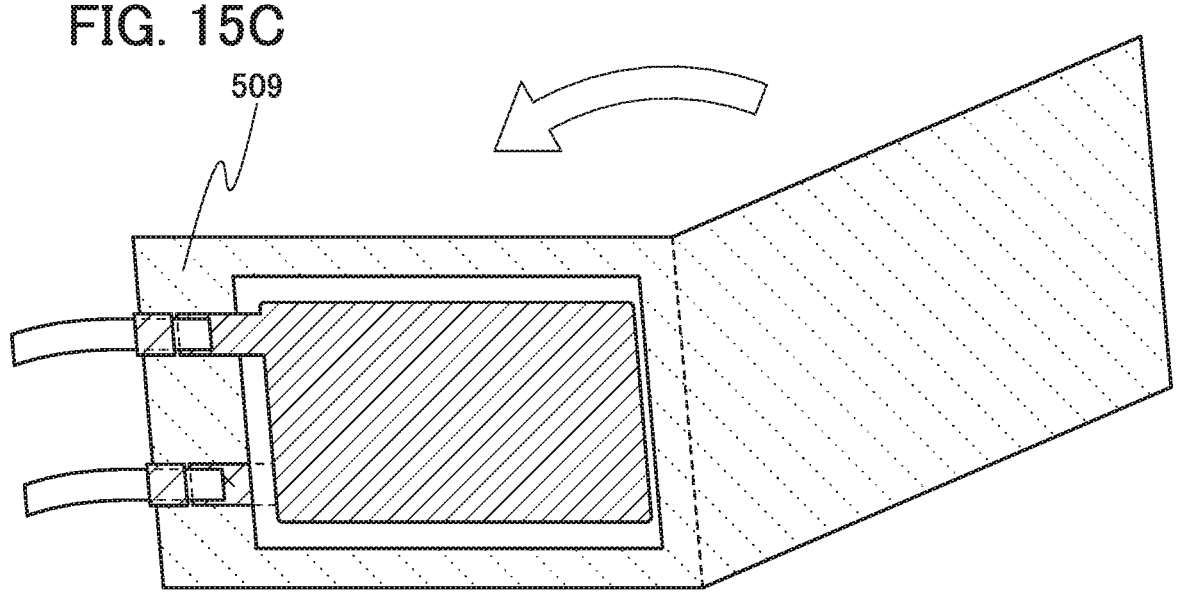

Subsequently, the exterior body 509 is folded along a dashed line as illustrated in FIG. 15C. Then, the outer edge of the exterior body 509 is bonded. The bonding can be performed by thermocompression bonding, for example. At this time, a part (or one side) of the exterior body 509 is left unbonded (to provide an inlet) so that the electrolyte solution 508 can be introduced later.

Next, the electrolyte solution 508 is introduced into the exterior body 509 from the inlet of the exterior body 509. The electrolyte solution 508 is preferably introduced in a reduced pressure atmosphere or in an inert gas atmosphere. Lastly, the inlet is bonded. In the above manner, the laminated secondary battery 500 can be manufactured.

When the positive electrode active material described in the above embodiment is used in the positive electrode 503, the secondary battery 500 with high capacity and excellent cycle characteristics can be obtained.

[Bendable Secondary Battery]

Next, an example of a bendable secondary battery is described with reference to FIGS. 16A, 16B1, 16B2, 16C and 16D and FIGS. 17A and 17B.

Figure 16A:
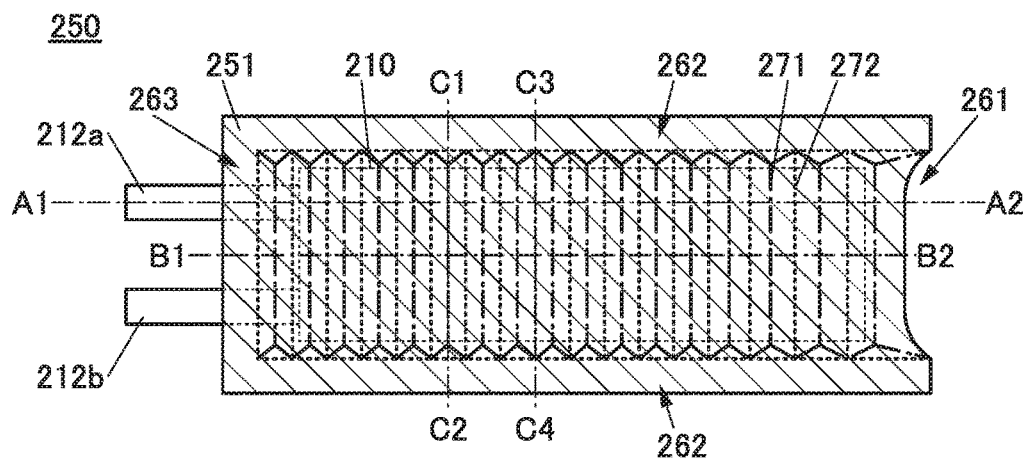
FIGS. 16A and 16D illustrate a bendable secondary battery.
Figure 16A:
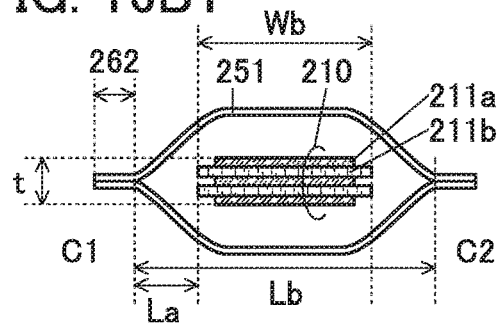
Figure 16A:
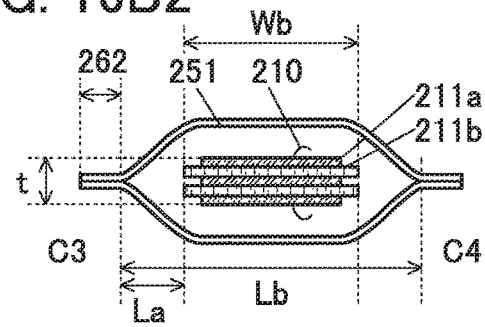

FIG. 16A is a schematic top view of a bendable secondary battery 250. FIGS. 16B1, 16 B2, and 16C are schematic cross-sectional views taken along cutting line C1-C2, cutting line C3-C4, and cutting line A1-A2, respectively, in FIG. 16A. The battery 250 includes an exterior body 251 and a positive electrode 211a, and a negative electrode 211b held in the exterior body 251. A lead 212a electrically connected to the positive electrode 211a and a lead 212b electrically connected to the negative electrode 211b are extended to the outside of the exterior body 251. In addition to the positive electrode 211a and the negative electrode 211b, an electrolyte solution (not illustrated) is enclosed in a region surrounded by the exterior body 251.

FIGS. 16A and 16B illustrate the positive electrode 211a and the negative electrode 211b included in the battery 250. FIG. 16A is a perspective view illustrating the stacking order of the positive electrode 211a, the negative electrode 211b, and the separator 214. FIG. 16B is a perspective view illustrating the lead 212a and the lead 212b in addition to the positive electrode 211a and the negative electrode 211b.

Figure 17A:
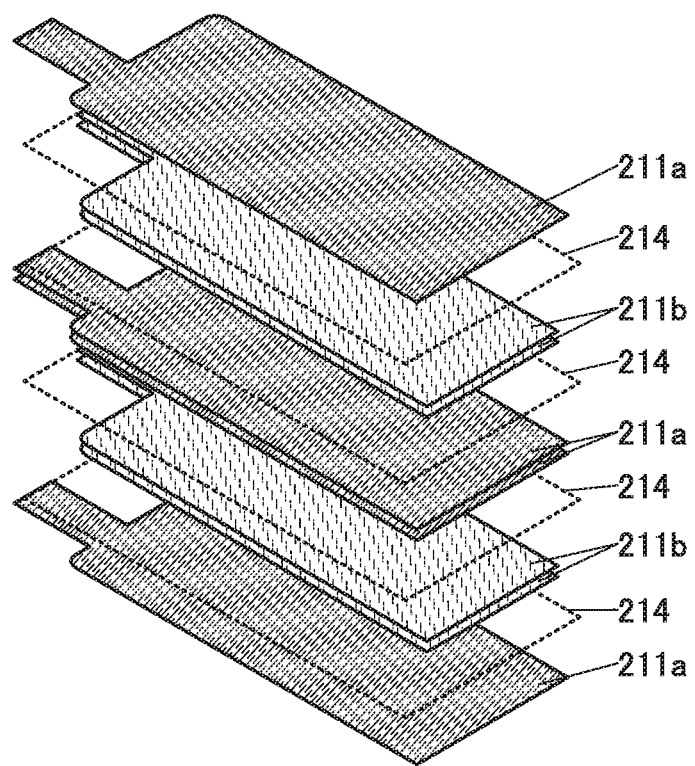
FIGS. 17A and 17B illustrate a bendable secondary battery.

As illustrated in FIG. 17A, the battery 250 includes a plurality of strip-shaped positive electrodes 211a, a plurality of strip-shaped negative electrodes 211b, and a plurality of separators 214. The positive electrode 211a and the negative electrode 211b each include a projected tab portion and a portion other than the tab. A positive electrode active material layer is formed on one surface of the positive electrode 211a other than the tab portion, and a negative electrode active material layer is formed on one surface of the negative electrode 211b other than the tab portion.

The positive electrodes 211a and the negative electrodes 211b are stacked so that surfaces of the positive electrodes 211a on each of which the positive electrode active material layer is not formed are in contact with each other and that surfaces of the negative electrodes 211b on each of which the negative electrode active material layer is not formed are in contact with each other.

Furthermore, the separator 214 is provided between the surface of the positive electrode 211a on which the positive electrode active material is formed and the surface of the negative electrode 211b on which the negative electrode active material is formed. In FIG. 17A, the separator 214 is shown by a dotted line for easy viewing.

Figure 17B:
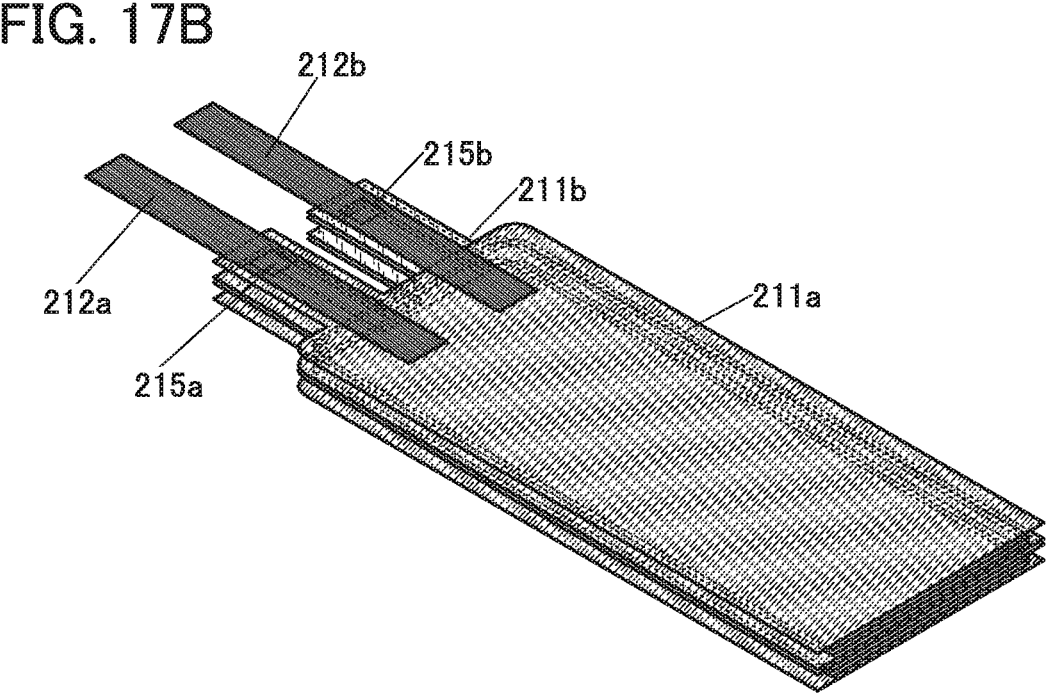

In addition, as illustrated in FIG. 17B, the plurality of positive electrodes 211a are electrically connected to the lead 212a in a bonding portion 215a. The plurality of negative electrodes 211b are electrically connected to the lead 212b in a bonding portion 215b.

Next, the exterior body 251 is described with reference to FIGS. 16B1, 16B2, 16C, and 16D.

The exterior body 251 has a film-like shape and is folded in half with the positive electrodes 211a and the negative electrodes 211b between facing portions of the exterior body 251. The exterior body 251 includes a folded portion 261, a pair of seal portions 262, and a seal portion 263. The pair of seal portions 262 is provided with the positive electrodes 211a and the negative electrodes 211b positioned therebetween and thus can also be referred to as side seals. The seal portion 263 has portions overlapping with the lead 212a and the lead 212b and can also be referred to as a top seal.

Part of the exterior body 251 that overlaps with the positive electrodes 211a and the negative electrodes 211b preferably has a wave shape in which crest lines 271 and trough lines 272 are alternately arranged. The seal portions 262 and the seal portion 263 of the exterior body 251 are preferably flat.

FIG. 16B1 shows a cross section cut along the part overlapping with the crest line 271. FIG. 16B2 shows a cross section cut along the part overlapping with the trough line 272. FIGS. 16B1 and 16B2 correspond to cross sections of the battery 250, the positive electrodes 211a, and the negative electrodes 211b in the width direction.

The distance between an end portion of the negative electrode 211b in the width direction and the seal portion 262 is referred to as a distance La. When the battery 250 changes in shape, for example, is bent, the positive electrode 211a and the negative electrode 211b change in shape such that the positions thereof are shifted from each other in the length direction as described later. At the time, if the distance La is too short, the exterior body 251 and the positive electrode 211a and the negative electrode 211b are rubbed hard against each other, so that the exterior body 251 is damaged in some cases. In particular, when a metal film of the exterior body 251 is exposed, there is concern that the metal film is corroded by the electrolyte solution. Thus, the distance La is preferably set as long as possible. However, if the distance La is too long, the volume of the battery 250 is increased.

The distance La between the end portion of the negative electrode 211b and the seal portion 262 is preferably increased as the total thickness of the stacked positive electrodes 211a and negative electrodes 211b is increased.

Specifically, when the total thickness of the stacked positive electrodes 211a and negative electrodes 211b and the separators 214 (not illustrated) is referred to as a thickness t, the distance La is preferably 0.8 times or more and 3.0 times or less, further preferably 0.9 times or more and 2.5 times or less, still further preferably 1.0 times or more and 2.0 times or less as large as the thickness t. When the distance La is in the above-described range, a compact battery which is highly reliable for bending can be obtained.

Furthermore, when a distance between the pair of seal portions 262 is referred to as a distance Lb, it is preferable that the distance Lb be sufficiently longer than a width Wb of the negative electrode 211b. In this case, even when the positive electrode 211a and the negative electrode 211b come into contact with the exterior body 251 by change in the shape of the battery 250 such as repeated bending, the position of part of the positive electrode 211a and the negative electrode 211b can be shifted in the width direction; thus, the positive and negative electrodes 211a and 211b and the exterior body 251 can be effectively prevented from being rubbed against each other.

For example, the difference between the distance Lb (i.e., the distance between the pair of seal portions 262) and the width Wb of the negative electrode 211b is preferably 1.6 times or more and 6.0 times or less, further preferably 1.8 times or more and 5.0 times or less, still further preferably 2.0 times or more and 4.0 times or less as large as the total thickness t of the positive electrode 211a and the negative electrode 211b.

In other words, the distance Lb, the width Wb, and the thickness t preferably satisfy the relation of the following Formula 1.

$$\frac{Lb - Wb}{2t} \geq a \quad \text{(Formula 1)}$$

In the formula, a is 0.8 or more and 3.0 or less, preferably 0.9 or more and 2.5 or less, further preferably 1.0 or more and 2.0 or less.

Figure 16C:
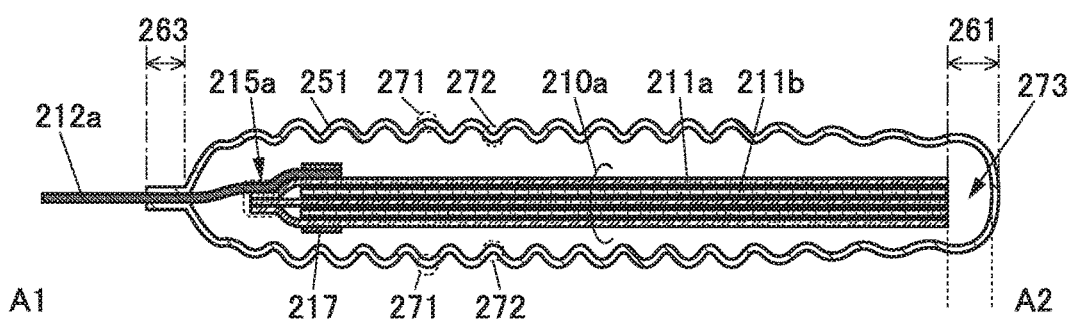

FIG. 16C illustrates a cross section including the lead 212a and corresponds to a cross section of the battery 250, the positive electrode 211a, and the negative electrode 211b in the length direction. As illustrated in FIG. 16C, a space 273 is preferably provided between end portions of the positive electrode 211a and the negative electrode 211b in the length direction and the exterior body 251 in the folded portion 261.

Figure 16D:
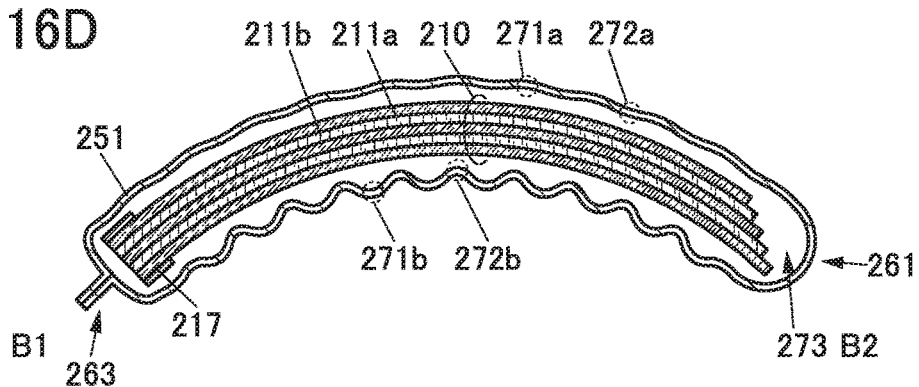

FIG. 16D is a schematic cross-sectional view of the battery 250 in a state of being bent. FIG. 16D corresponds to a cross section along cutting line B1-B2 in FIG. 16A.

When the battery 250 is bent, a part of the exterior body 251 positioned on the outer side in bending is unbent and the other part positioned on the inner side changes its shape as it shrinks. More specifically, the part of the exterior body 251 positioned on the outer side in bending changes its shape such that the wave amplitude becomes smaller and the length of the wave period becomes larger. In contrast, the part of the exterior body 251 positioned on the inner side in bending changes its shape such that the wave amplitude becomes larger and the length of the wave period becomes smaller. When the exterior body 251 changes its shape in this manner, stress applied to the exterior body 251 due to bending is relieved, so that a material itself that forms the exterior body 251 does not need to expand and contract. As a result, the battery 250 can be bent with weak force without damage to the exterior body 251.

Furthermore, as illustrated in FIG. 16D, when the battery 250 is bent, the positions of the positive electrode 211a and the negative electrode 211b are shifted relatively. At this time, ends of the stacked positive electrodes 211a and negative electrodes 211b on the seal portion 263 side are fixed by the fixing member 217. Thus, the plurality of positive electrodes 211a and the plurality of negative electrodes 211b are more shifted at a position closer to the folded portion 261. Therefore, stress applied to the positive electrode 211a and the negative electrode 211b is relieved, and the positive electrode 211a and the negative electrode 211b themselves do not need to expand and contract. As a result, the battery 250 can be bent without damage to the positive electrode 211a and the negative electrode 211b.

Furthermore, the space 273 is provided between the end portions of the positive and negative electrodes 211a and 211b and the exterior body 251, whereby the relative positions of the positive electrode 211a and the negative electrode 211b can be shifted while the end portions of the positive electrode 211a and the negative electrode 211b located on an inner side when the battery 250 is bent do not contact the exterior body 251.

In the battery 250 illustrated in FIGS. 16A, 16B1, 16B2, 16C and 16D and FIGS. 17A and 17B, the exterior body, the positive electrode 211a, and the negative electrode 211b are less likely to be damaged and the battery characteristics are less likely to deteriorate even when the battery 250 is repeatedly bent and unbent. When the positive electrode active material described in the above embodiment is used for the positive electrode 211a included in the battery 250, a battery with more excellent cycle characteristics can be obtained.

Embodiment 4

In this embodiment, examples of electronic devices including the secondary battery of one embodiment of the present invention are described.

First, FIGS. 18A to 18G show examples of electronic devices including the bendable secondary battery described in Embodiment 3. Examples of an electronic device including a flexible secondary battery include television sets (also referred to as televisions or television receivers), monitors of computers or the like, digital cameras or digital video cameras, digital photo frames, mobile phones (also referred to as cellular phones or mobile phone devices), portable game machines, portable information terminals, audio reproducing devices, and large game machines such as pachinko machines.

In addition, a flexible secondary battery can be incorporated along a curved inside/outside wall surface of a house or a building or a curved interior/exterior surface of an automobile.

Figure 18A:
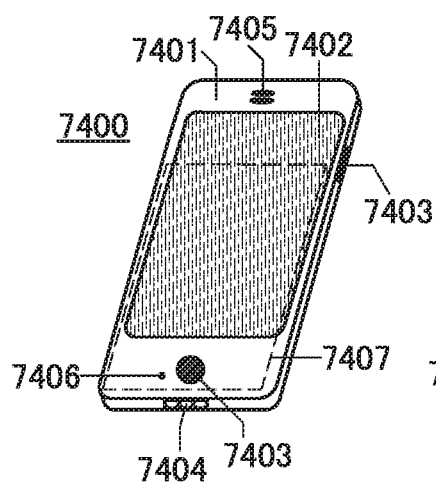
FIGS. 18A to 18H illustrate an example of an electronic device.

FIG. 18A illustrates an example of a mobile phone. A mobile phone 7400 is provided with a display portion 7402 incorporated in a housing 7401, an operation button 7403, an external connection port 7404, a speaker 7405, a microphone 7406, and the like. Note that the mobile phone 7400 includes a secondary battery 7407. When the secondary battery of one embodiment of the present invention is used as the secondary battery 7407, a lightweight mobile phone with a long lifetime can be provided.

Figure 18B:
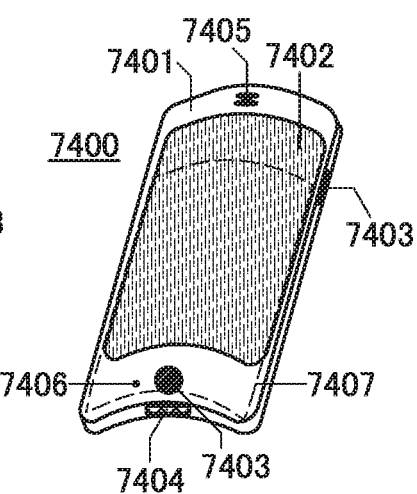
Figure 18C:
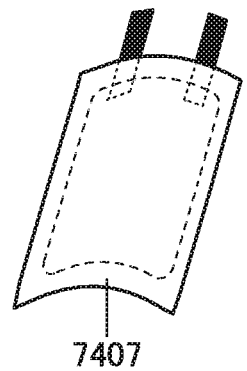

FIG. 18B illustrates the mobile phone 7400 that is bent. When the whole mobile phone 7400 is curved by external force, the secondary battery 7407 included in the mobile phone 7400 is also curved. FIG. 18C illustrates the curved secondary battery 7407. The secondary battery 7407 is a thin storage battery. The secondary battery 7407 is curved and fixed. Note that the secondary battery 7407 includes a lead electrode electrically connected to a current collector 7409.

Figure 18D:
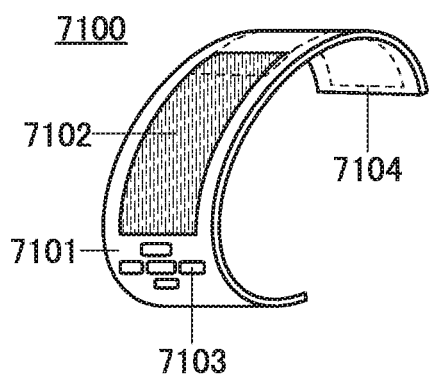
Figure 18E:

FIG. 18D illustrates an example of a bangle display device. A portable display device 7100 includes a housing 7101, a display portion 7102, an operation button 7103, and a secondary battery 7104. FIG. 18E illustrates the bent secondary battery 7104. When the curved secondary battery 7104 is on a user's arm, the housing changes its form and the curvature of a part or the whole of the secondary battery 7104 is changed. Note that the radius of curvature of a curve at a point refers to the radius of the circular arc that best approximates the curve at that point. The reciprocal of the radius of curvature is curvature. Specifically, part or the whole of the housing or the main surface of the secondary battery 7104 is changed in the range of radius of curvature from 40 mm to 150 mm. When the radius of curvature at the main surface of the secondary battery 7104 is greater than or equal to 40 mm and less than or equal to 150 mm, the reliability can be kept high. When the secondary battery of one embodiment of the present invention is used as the secondary battery 7104, a lightweight portable display device with a long lifetime can be provided.

Figure 18F:
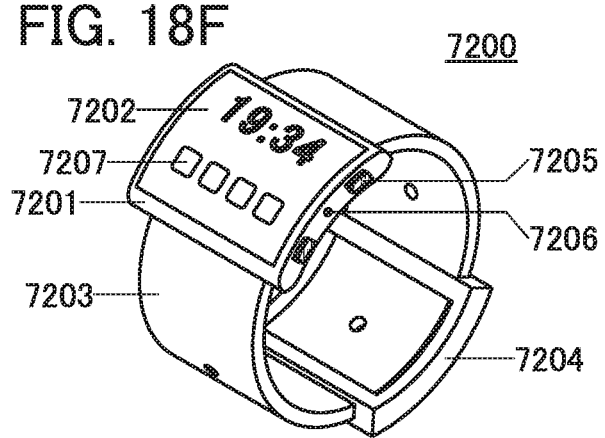

FIG. 18F illustrates an example of a watch-type portable information terminal. A portable information terminal 7200 includes a housing 7201, a display portion 7202, a band 7203, a buckle 7204, an operation button 7205, an input output terminal 7206, and the like.

The portable information terminal 7200 is capable of executing a variety of applications such as mobile phone calls, e-mailing, viewing and editing texts, music reproduction, Internet communication, and a computer game.

The display surface of the display portion 7202 is curved, and images can be displayed on the curved display surface. In addition, the display portion 7202 includes a touch sensor, and operation can be performed by touching the screen with a finger, a stylus, or the like. For example, by touching an icon 7207 displayed on the display portion 7202, application can be started.

With the operation button 7205, a variety of functions such as time setting, power on/off, on/off of wireless communication, setting and cancellation of a silent mode, and setting and cancellation of a power saving mode can be performed. For example, the functions of the operation button 7205 can be set freely by setting the operation system incorporated in the portable information terminal 7200.

The portable information terminal 7200 can employ near field communication that is a communication method based on an existing communication standard. For example, mutual communication between the portable information terminal 7200 and a headset capable of wireless communication can be performed, and thus hands-free calling is possible.

Moreover, the portable information terminal 7200 includes the input output terminal 7206, and data can be directly transmitted to and received from another information terminal via a connector. In addition, charging via the input output terminal 7206 is possible. Note that the charging operation may be performed by wireless power feeding without using the input output terminal 7206.

The display portion 7202 of the portable information terminal 7200 includes the secondary battery of one embodiment of the present invention. When the secondary battery of one embodiment of the present invention is used, a lightweight portable information terminal with a long lifetime can be provided. For example, the secondary battery 7104 illustrated in FIG. 18E that is in the state of being curved can be provided in the housing 7201. Alternatively, the secondary battery 7104 illustrated in FIG. 18E can be provided in the band 7203 such that it can be curved.

A portable information terminal 7200 preferably includes a sensor. As the sensor, for example a human body sensor such as a fingerprint sensor, a pulse sensor, or a temperature sensor, a touch sensor, a pressure sensitive sensor, an acceleration sensor, or the like is preferably mounted.

Figure 18G:
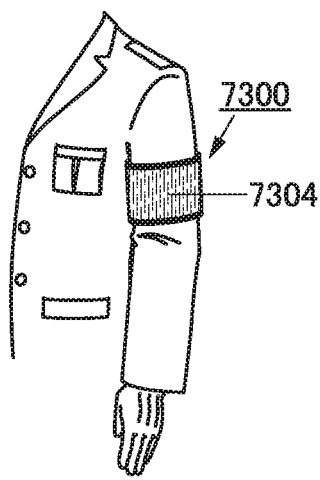

FIG. 18G illustrates an example of an armband display device. A display device 7300 includes a display portion 7304 and the secondary battery of one embodiment of the present invention. The display device 7300 can include a touch sensor in the display portion 7304 and can serve as a portable information terminal.

The display surface of the display portion 7304 is bent, and images can be displayed on the bent display surface. A display state of the display device 7300 can be changed by, for example, near field communication, which is a communication method based on an existing communication standard.

The display device 7300 includes an input output terminal, and data can be directly transmitted to and received from another information terminal via a connector. In addition, charging via the input output terminal is possible. Note that the charging operation may be performed by wireless power feeding without using the input output terminal.

When the secondary battery of one embodiment of the present invention is used as the secondary battery included in the display device 7300, a lightweight display device with a long lifetime can be provided.

In addition, FIG. 18H, FIGS. 19A to 19C, and FIG. 20 show examples of electronic devices including the secondary battery with excellent cycle characteristics described in the above embodiment.

When the secondary battery of one embodiment of the present invention is used as a secondary battery of a daily electronic device, a lightweight product with a long lifetime can be provided. As the daily electronic devices, an electric toothbrush, an electric shaver, electric beauty equipment, and the like are given. As secondary batteries of these products, in consideration of handling ease for users, small and lightweight stick type secondary batteries with high capacity are desired.

Figure 18H:
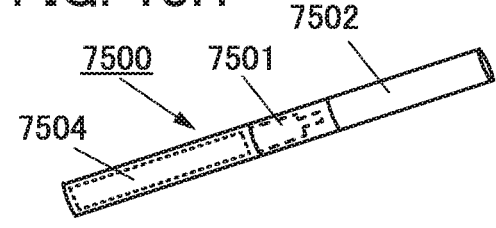

FIG. 18H is a perspective view of a device which is called a vaporizer. In FIG. 18H, a vaporizer 7500 includes an atomizer 7501 including a heating element, a secondary battery 7504 supplying power to the atomizer, and a cartridge 7502 including a liquid supply bottle, a sensor, and the like. To improve safety, a protection circuit which prevents overcharge and overdischarge of the secondary battery 7504 may be electrically connected to the secondary battery 7504. The secondary battery 7504 in FIG. 18H includes an output terminal for connecting to a charger. When the vaporizer 7500 is held by a user, the secondary battery 7504 becomes a tip portion; thus, it is preferable that the secondary battery 7504 have a short total length and be lightweight. With the secondary battery of one embodiment of the present invention which has high capacity and excellent cycle characteristics, the small and lightweight vaporizer 7500 which can be used for a long time for a long period can be provided.

Figure 19A:
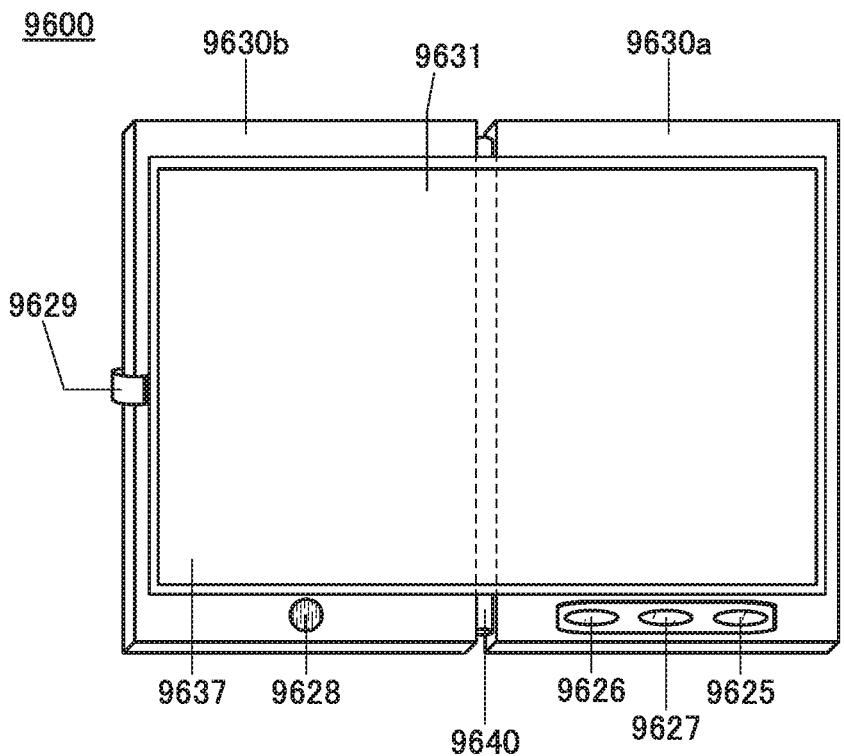
FIGS. 19A to 19C illustrate an example of an electronic device.
Figure 19B:
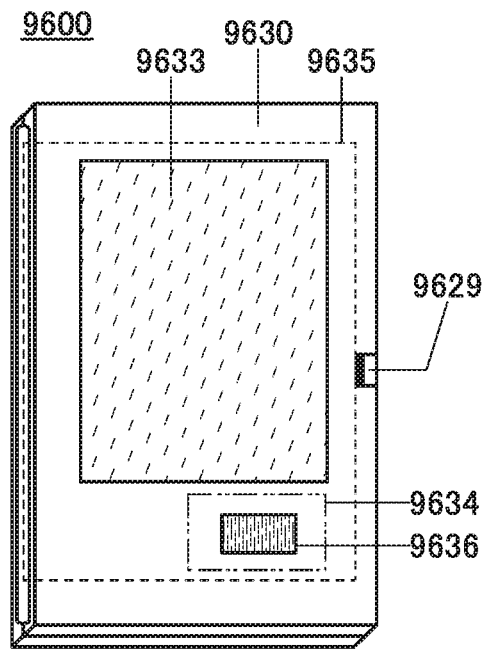

Next, FIGS. 19A and 19B illustrate an example of a foldable tablet terminal. A tablet terminal 9600 illustrated in FIGS. 19A and 19B includes a housing 9630a, a housing 9630b, a movable portion 9640 connecting the housings 9630a and 9630b, a display portion 9631, a display mode changing switch 9626, a power switch 9627, a power saving mode changing switch 9625, a fastener 9629, and an operation switch 9628. A flexible panel is used for the display portion 9631, whereby a tablet terminal with a larger display portion can be provided. FIG. 19A illustrates the tablet terminal 9600 that is opened, and FIG. 19B illustrates the tablet terminal 9600 that is closed.

The tablet terminal 9600 includes a power storage unit 9635 inside the housings 9630a and 9630b. The power storage unit 9635 is provided across the housings 9630a and 9630b, passing through the movable portion 9640.

Part of the display portion 9631 can be a touch panel region and data can be input when a displayed operation key is touched. A switching button for showing/hiding a keyboard of the touch panel is touched with a finger, a stylus, or the like, so that keyboard buttons can be displayed on the display portion 9631.

The display mode switch 9626 can switch the display between a portrait mode and a landscape mode, and between monochrome display and color display, for example. The power saving mode changing switch 9625 can control display luminance in accordance with the amount of external light in use of the tablet terminal 9600, which is measured with an optical sensor incorporated in the tablet terminal 9600. Another detection device including a sensor for detecting inclination, such as a gyroscope sensor or an acceleration sensor, may be incorporated in the tablet terminal, in addition to the optical sensor.

The tablet terminal is closed in FIG. 19B. The tablet terminal includes the housing 9630, a solar cell 9633, and a charge and discharge control circuit 9634 including a DC-DC converter 9636. The secondary battery of one embodiment of the present invention is used as the power storage unit 9635.

The tablet terminal 9600 can be folded such that the housings 9630a and 9630b overlap with each other when not in use. Thus, the display portion 9631 can be protected, which increases the durability of the tablet terminal 9600. With the power storage unit 9635 including the secondary battery of one embodiment of the present invention which has high capacity and excellent cycle characteristics, the tablet terminal 9600 which can be used for a long time for a long period can be provided.

The tablet terminal illustrated in FIGS. 19A and 19B can also have a function of displaying various kinds of data (e.g., a still image, a moving image, and a text image), a function of displaying a calendar, a date, or the time on the display portion, a touch-input function of operating or editing data displayed on the display portion by touch input, a function of controlling processing by various kinds of software (programs), and the like.

The solar cell 9633, which is attached on the surface of the tablet terminal, supplies electric power to a touch panel, a display portion, an image signal processor, and the like. Note that the solar cell 9633 can be provided on one or both surfaces of the housing 9630 and the power storage unit 9635 can be charged efficiently.

Figure 19C:
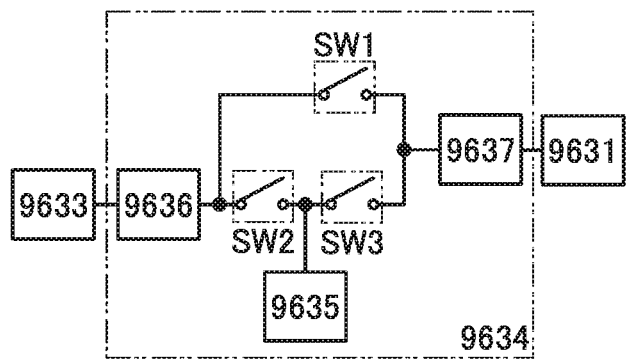

The structure and operation of the charge and discharge control circuit 9634 illustrated in FIG. 19B will be described with reference to a block diagram in FIG. 19C. The solar cell 9633, the power storage unit 9635, the DC-DC converter 9636, a converter 9637, switches SW1 to SW3, and the display portion 9631 are illustrated in FIG. 19C, and the power storage unit 9635, the DC-DC converter 9636, the converter 9637, and the switches SW1 to SW3 correspond to the charge and discharge control circuit 9634 in FIG. 19B.

First, an example of the operation in the case where power is generated by the solar cell 9633 using external light is described. The voltage of electric power generated by the solar cell is raised or lowered by the DCDC converter 9636 to a voltage for charging the power storage unit 9635. When the power from the solar cell 9633 is used for the operation of the display portion 9631, the switch SW1 is turned on and the voltage of the power is raised or lowered by the converter 9637 to a voltage needed for operating the display portion 9631. When display on the display portion 9631 is not performed, the switch SW1 is turned off and the switch SW2 is turned on, so that the power storage unit 9635 can be charged.

Note that the solar cell 9633 is described as an example of a power generation means; however, one embodiment of the present invention is not limited to this example. The power storage unit 9635 may be charged using another power generation means such as a piezoelectric element or a thermoelectric conversion element (Peltier element). For example, the power storage unit 9635 may be charged with a non-contact power transmission module that transmits and receives power wirelessly (without contact) to charge the battery or with a combination of other charging means.

Figure 20:
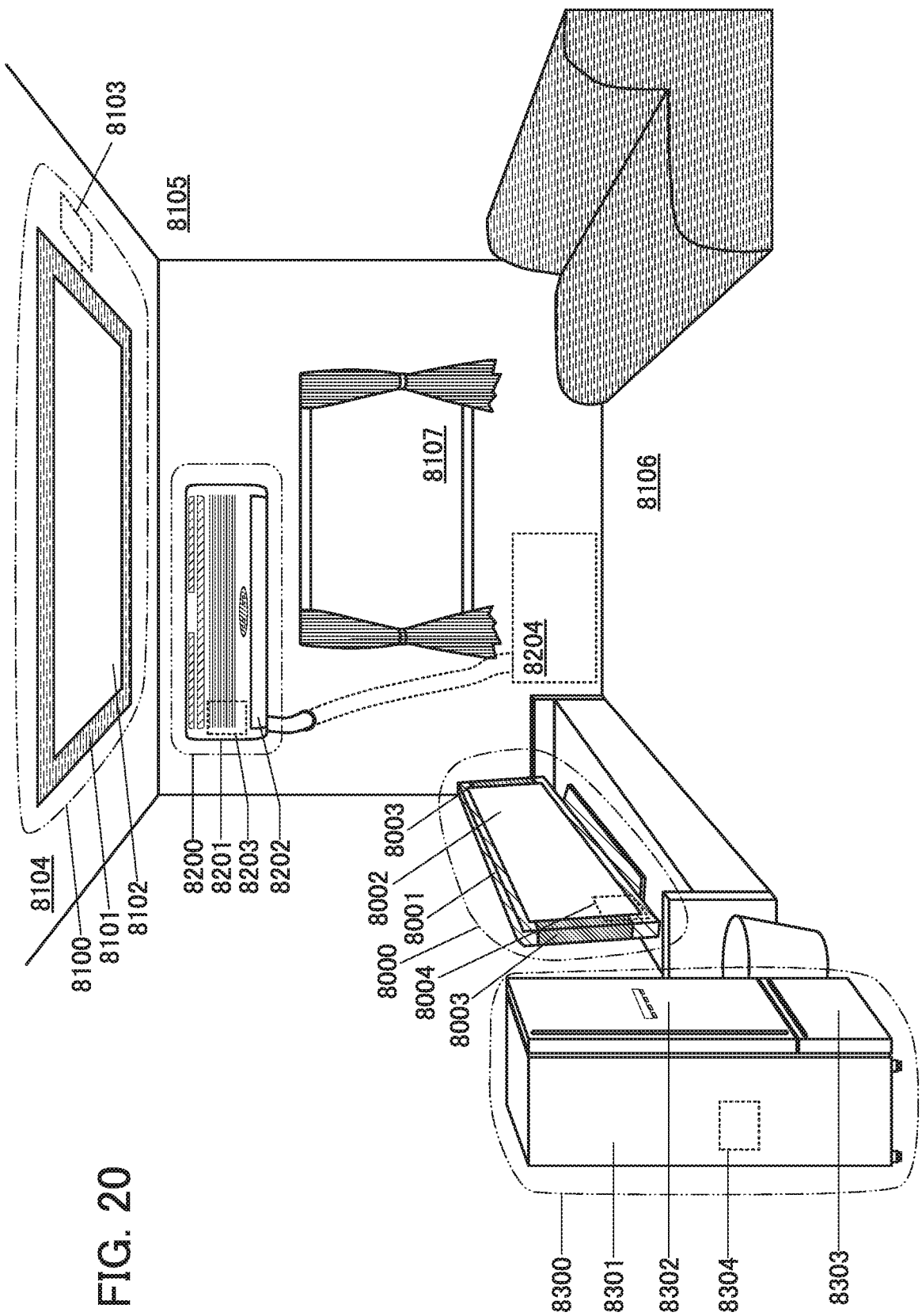
FIG. 20 illustrates an example of an electronic device.

FIG. 20 illustrates other examples of electronic devices. In FIG. 20, a display device 8000 is an example of an electronic device including a secondary battery 8004 of one embodiment of the present invention. Specifically, the display device 8000 corresponds to a display device for TV broadcast reception and includes a housing 8001, a display portion 8002, speaker portions 8003, the secondary battery 8004, and the like. The secondary battery 8004 of one embodiment of the present invention is provided in the housing 8001. The display device 8000 can receive electric power from a commercial power supply. Alternatively, the display device 8000 can use electric power stored in the secondary battery 8004. Thus, the display device 8000 can operate with the use of the secondary battery 8004 of one embodiment of the present invention as an uninterruptible power supply even when electric power cannot be supplied from a commercial power supply due to power failure or the like.

A semiconductor display device such as a liquid crystal display device, a light-emitting device in which a light-emitting element such as an organic EL element is provided in each pixel, an electrophoretic display device, a digital micromirror device (DMD), a plasma display panel (PDP), or a field emission display (FED) can be used for the display portion 8002.

Note that the display device includes, in its category, all of information display devices for personal computers, advertisement displays, and the like other than TV broadcast reception.

In FIG. 20, an installation lighting device 8100 is an example of an electronic device using a secondary battery 8103 of one embodiment of the present invention. Specifically, the lighting device 8100 includes a housing 8101, a light source 8102, the secondary battery 8103, and the like. Although FIG. 20 illustrates the case where the secondary battery 8103 is provided in a ceiling 8104 on which the housing 8101 and the light source 8102 are installed, the secondary battery 8103 may be provided in the housing 8101. The lighting device 8100 can receive electric power from a commercial power supply. Alternatively, the lighting device 8100 can use electric power stored in the secondary battery 8103. Thus, the lighting device 8100 can operate with the use of the secondary battery 8103 of one embodiment of the present invention as an uninterruptible power supply even when electric power cannot be supplied from a commercial power supply due to power failure or the like.

Note that although the installation lighting device 8100 provided in the ceiling 8104 is illustrated in FIG. 20 as an example, the secondary battery of one embodiment of the present invention can be used as an installation lighting device provided in, for example, a wall 8105, a floor 8106, a window 8107, or the like other than the ceiling 8104. Alternatively, the secondary battery can be used in a tabletop lighting device or the like.

As the light source 8102, an artificial light source which emits light artificially by using power can be used. Specifically, an incandescent lamp, a discharge lamp such as a fluorescent lamp, and a light-emitting element such as an LED or an organic EL element are given as examples of the artificial light source.

In FIG. 20, an air conditioner including an indoor unit 8200 and an outdoor unit 8204 is an example of an electronic device including a secondary battery 8203 of one embodiment of the present invention. Specifically, the indoor unit 8200 includes a housing 8201, an air outlet 8202, the secondary battery 8203, and the like. Although FIG. 20 illustrates the case where the secondary battery 8203 is provided in the indoor unit 8200, the secondary battery 8203 may be provided in the outdoor unit 8204. Alternatively, the secondary batteries 8203 may be provided in both the indoor unit 8200 and the outdoor unit 8204. The air conditioner can receive electric power from a commercial power supply. Alternatively, the air conditioner can use electric power stored in the secondary battery 8203. Particularly in the case where the secondary batteries 8203 are provided in both the indoor unit 8200 and the outdoor unit 8204, the air conditioner can operate with the use of the secondary battery 8203 of one embodiment of the present invention as an uninterruptible power supply even when electric power cannot be supplied from a commercial power supply due to power failure or the like.

Note that although the split-type air conditioner including the indoor unit and the outdoor unit is illustrated in FIG. 20 as an example, the secondary battery of one embodiment of the present invention can be used in an air conditioner in which the functions of an indoor unit and an outdoor unit are integrated in one housing.

In FIG. 20, an electric refrigerator-freezer 8300 is an example of an electronic device using a secondary battery 8304 of one embodiment of the present invention. Specifically, the electric refrigerator-freezer 8300 includes a housing 8301, a refrigerator door 8302, a freezer door 8303, the secondary battery 8304, and the like. The secondary battery 8304 is provided in the housing 8301 in FIG. 20. The electric refrigerator-freezer 8300 can receive electric power from a commercial power supply. Alternatively, the electric refrigerator-freezer 8300 can use electric power stored in the secondary battery 8304. Thus, the electric refrigerator-freezer 8300 can operate with the use of the secondary battery 8304 of one embodiment of the present invention as an uninterruptible power supply even when electric power cannot be supplied from a commercial power supply due to power failure or the like.

In addition, in a time period when electronic devices are not used, particularly when the proportion of the amount of power which is actually used to the total amount of power which can be supplied from a commercial power source (such a proportion referred to as a usage rate of power) is low, power can be stored in the secondary battery, whereby the usage rate of power can be reduced in a time period when the electronic devices are used. For example, in the case of the electric refrigerator-freezer 8300, power can be stored in the secondary battery 8304 in night time when the temperature is low and the refrigerator door 8302 and the freezer door 8303 are not often opened and closed. On the other hand, in daytime when the temperature is high and the refrigerator door 8302 and the freezer door 8303 are frequently opened and closed, the secondary battery 8304 is used as an auxiliary power source; thus, the usage rate of power in daytime can be reduced.

The secondary battery of one embodiment of the present invention can be used in any of a variety of electronic devices as well as the above electronic devices. According to one embodiment of the present invention, the secondary battery can have excellent cycle characteristics. Furthermore, in accordance with one embodiment of the present invention, a secondary battery with high capacity can be obtained; thus, the secondary battery itself can be made more compact and lightweight. Thus, the secondary battery of one embodiment of the present invention is used in the electronic device described in this embodiment, whereby a more lightweight electronic device with a longer lifetime can be obtained. This embodiment can be implemented in appropriate combination with any of the other embodiments.

Embodiment 5

In this embodiment, examples of vehicles including the secondary battery of one embodiment of the present invention are described.

The use of secondary batteries in vehicles enables production of next-generation clean energy vehicles such as hybrid electric vehicles (HEVs), electric vehicles (EVs), and plug-in hybrid electric vehicles (PHEVs).

Figure 21A:
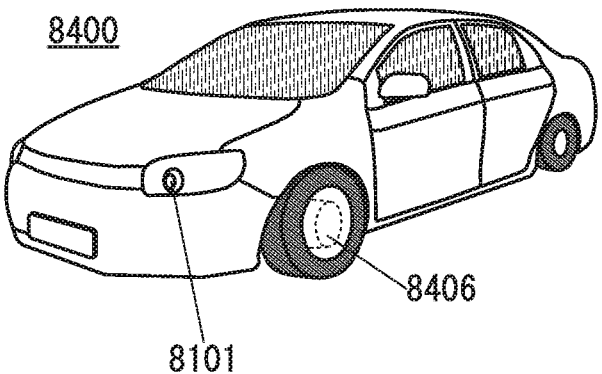
FIGS. 21A to 21C each illustrate an example of an electronic device.
Figure 21B:
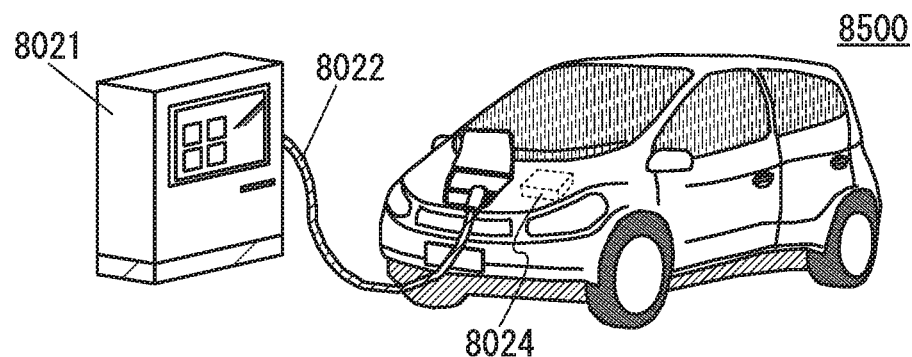
Figure 21C:
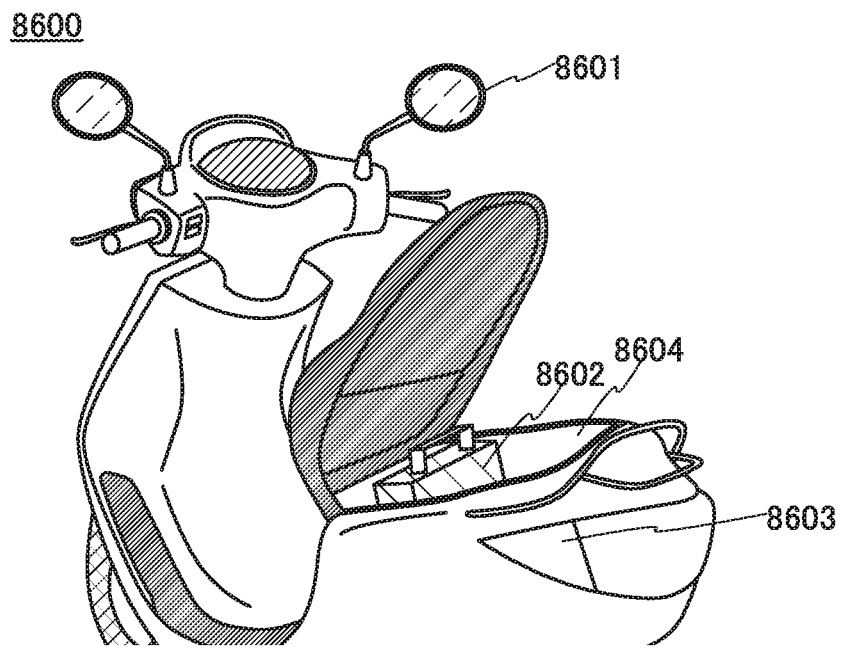

FIGS. 21A to 21C each illustrate an example of a vehicle using the secondary battery of one embodiment of the present invention. An automobile 8400 illustrated in FIG. 21A is an electric vehicle that runs on the power of an electric motor. Alternatively, the automobile 8400 is a hybrid electric vehicle capable of driving appropriately using either an electric motor or an engine. One embodiment of the present invention can provide a high-mileage vehicle. The automobile 8400 includes the secondary battery. As the secondary battery, the small cylindrical secondary batteries illustrated in FIGS. 5A and 5B may be arranged to be used in a floor portion in the automobile. Alternatively, a battery pack in which a plurality of secondary batteries each of which is illustrated in FIGS. 18A to 18C are combined may be placed in a floor portion in the automobile. The secondary battery is used not only for driving an electric motor 8406, but also for supplying electric power to a light-emitting device such as a headlight 8401 or a room light (not illustrated).

The secondary battery can also supply electric power to a display device of a speedometer, a tachometer, or the like included in the automobile 8400. Furthermore, the secondary battery can supply electric power to a semiconductor device included in the automobile 8400, such as a navigation system.

FIG. 21B illustrates an automobile 8500 including the secondary battery. The automobile 8500 can be charged when the secondary battery is supplied with electric power through external charging equipment by a plug-in system, a contactless power feeding system, or the like. In FIG. 21B, a secondary battery 8024 included in the automobile 8500 is charged with the use of a ground-based charging apparatus 8021 through a cable 8022. In charging, a given method such as CHAdeMO (registered trademark) or Combined Charging System may be employed as a charging method, the standard of a connector, or the like as appropriate. The ground-based charging apparatus 8021 may be a charging station provided in a commerce facility or a power source in a house. With the use of a plug-in technique, the secondary battery 8024 included in the automobile 8500 can be charged by being supplied with electric power from the outside, for example. The charging can be performed by converting AC electric power into DC electric power through a converter such as an AC-DC converter.

Furthermore, although not illustrated, the vehicle may include a power receiving device so that it can be charged by being supplied with electric power from an above-ground power transmitting device in a contactless manner. In the case of the contactless power feeding system, by fitting a power transmitting device in a road or an exterior wall, charging can be performed not only when the electric vehicle is stopped but also when driven. In addition, the contactless power feeding system may be utilized to perform transmission and reception of electric power between vehicles. A solar cell may be provided in the exterior of the automobile to charge the secondary battery when the automobile stops or moves. To supply electric power in such a contactless manner, an electromagnetic induction method or a magnetic resonance method can be used.

FIG. 21C shows an example of a motorcycle using the secondary battery of one embodiment of the present invention. A motor scooter 8600 illustrated in FIG. 21C includes a secondary battery 8602, side mirrors 8601, and indicators 8603. The secondary battery 8602 can supply electric power to the indicators 8603.

Furthermore, in the motor scooter 8600 illustrated in FIG. 21C, the secondary battery 8602 can be held in a storage unit under seat 8604. It is preferable that the secondary battery 8602 can be held in the storage unit under seat 8604 even with a small size. The secondary battery 8602 is detachable, can be carried indoors when charged, and be stored before the motorcycle is driven.

In accordance with one embodiment of the present invention, the secondary battery can have improved cycle characteristics and the capacity of the secondary battery can be increased. Thus, the secondary battery itself can be made more compact and lightweight. The compact and lightweight secondary battery contributes to a reduction in the weight of a vehicle, and thus increases the driving radius. Furthermore, the secondary battery included in the vehicle can be used as a power source for supplying electric power to products other than the vehicle. In such a case, the use of a commercial power source can be avoided at peak time of electric power demand, for example. If the use of a commercial power source can be avoided at peak time of electric power demand, the avoidance can contribute to energy saving and a reduction in carbon dioxide emissions. Moreover, if the cycle characteristics are excellent, the secondary battery can be used for a long period; thus, the use amount of rare metals such as cobalt can be reduced.

This embodiment can be implemented in appropriate combination with the other embodiments.

Example 1

This example will show results of comparing characteristics of secondary batteries formed using positive electrode active materials including different covering layers.

<Formation of Positive Electrode Active Material>

Positive electrode active materials of samples 1 to 5 were prepared. The formation method of each sample is as follows.

<<Sample 1>>

To form the sample 1 which is a positive electrode active material containing lithium cobaltate in the inner portion and including a covering layer containing aluminum and magnesium in the superficial portion, a lithium cobaltate particle containing magnesium and fluorine was covered with aluminum-containing layers by a sol-gel method and was heated.

The lithium cobaltate particle containing magnesium and fluorine was produced by NIPPON CHEMICAL INDUSTRIAL CO., LTD. (product name: C-20F).

To 20 ml of 2-propanol, 0.0348 g of tri-i-propoxyaluminum was added and dissolved. To this 2-propanol solution containing tri-i-propoxyaluminum, 5 g of a lithium cobaltate particle containing magnesium and fluorine was added.

This mixed solution was stirred with a magnetic stirrer for four hours, at 25° C., at a humidity of 90% RH. By the process, hydrolysis and polycondensation reaction occurred between $H_2O$ and tri-i-propoxyaluminum in the atmosphere, so that a layer containing aluminum was formed on the surface of the lithium cobaltate particle containing magnesium and fluorine.

The mixed solution which had been subjected to the above process was filtered to collect the residue. As a filter for the filtration, Kiriyama filter paper (No. 4) was used.

The collected residue was dried in a vacuum at 70° C. for one hour.

The dried powder was heated. The heating was performed in a dried air atmosphere at 800° C. (the temperature rising rate was 200° C./h) for a retention time of two hours.

The heated powder was cooled and subjected to crushing treatment. In the crushing treatment, the powder was made to pass through a sieve with an aperture width of 53 μm.

The particle subjected to the crushing treatment was used as the positive electrode active material of the sample 1.

<<Sample 2>>

To form the sample 2 (comparative example) which is a positive electrode active material containing lithium cobaltate in the inner portion and including a covering layer containing magnesium in the superficial portion, a lithium cobaltate particle containing magnesium and fluorine was heated.

The lithium cobaltate particle containing magnesium and fluorine was produced by NIPPON CHEMICAL INDUSTRIAL CO., LTD. (product name: C-20F).

The lithium cobaltate particle containing magnesium and fluorine was heated. The heating was performed in an oxygen atmosphere at 800° C. (the temperature rising rate was 200° C./h) for a retention time of two hours.

The heated powder was cooled and made to pass through the sieve with an aperture width of 53 μm, which was used as the positive electrode active material of the sample 2.

<<Sample 3>>

To form the sample 3 (comparative example) which is a positive electrode active material of lithium cobaltate containing magnesium and fluorine in which magnesium is not segregated in the superficial portion, a lithium cobaltate particle containing magnesium and fluorine was used without being heated.

The lithium cobaltate particle containing magnesium and fluorine was produced by NIPPON CHEMICAL INDUSTRIAL CO., LTD. (product name: C-20F).

<<Sample 4>>

To form the sample 4 (comparative example) which is a positive electrode active material containing lithium cobalt oxide in the inner portion and including the aluminum-containing covering layer in the superficial portion, a lithium cobaltate particle containing no magnesium was covered with an aluminum-containing layer by a sol-gel method and then was heated.

The lithium cobaltate particle containing no magnesium was produced by NIPPON CHEMICAL INDUSTRIAL CO., LTD. (product name: C-10N). In the lithium cobaltate particle, magnesium is not detected and fluorine is detected at approximately 1 atomic % by XPS.

As in the sample 1, an aluminum-containing covering layer was formed on the lithium cobaltate particle by a sol-gel method, and the particle was dried, heated, cooled, and made to pass through a sieve. In this manner, a positive electrode active material of the sample 4 was formed.

<<Sample 5>>

As the sample 5 (comparative example) which is a positive electrode active material including no covering layer, a lithium cobaltate particle containing no magnesium was used without being heated.

The lithium cobaltate particle containing no magnesium was produced by NIPPON CHEMICAL INDUSTRIAL CO., LTD. (product name: C-10N).

Table 1 shows the conditions of the samples 1 to 5.

TABLE 1

| Samples | Conditions |
| --- | --- |
| Sample1 | $LiCoO_2$ + Mg + F, Covered with Al-containing material, Heated |
| Sample2 | $LiCoO_2$ + Mg + F, Heated |
| Sample3 | $LiCoO_2$ + Mg + F, Not Heated |
| Sample4 | $LiCoO_2$, Covered with Al-containing material, Heated |
| Sample5 | $LiCoO_2$, Not Heated |

<Cycle Characteristics>

CR2032 coin-type secondary batteries (20 mm in diameter, 3.2 mm in height) were fabricated using the positive electrode active materials of the samples 1 to 5 formed in the above manner. Their cycle characteristics were evaluated.

A positive electrode formed by applying slurry in which the positive electrode active material ($LiCoO_2$) of each of the samples 1 to 5, acetylene black (AB), and polyvinylidene fluoride (PVDF) were mixed at a weight ratio of $LiCoO_2$:AB:PVDF=95:2.5:2.5 to an aluminum foil current collector was used.

A lithium metal was used for a counter electrode.

As an electrolyte contained in an electrolyte solution, 1 mol/L lithium hexafluorophosphate ($LiPF_6$) was used. As the electrolyte solution, a solution in which vinylene carbonate (VC) was added to ethylene carbonate (EC) and diethyl carbonate (DEC) mixed at a volume ratio of EC:DEC=3:7 at a 2 weight % was used.

A positive electrode can and a negative electrode can were formed of stainless steel (SUS).

The measurement temperature in the cycle characteristics test was 25° C. Charging was carried out at a constant current with a current density of 68.5 mA/g per active material weight and an upper limit voltage of 4.6 V, followed by constant voltage charge until a current density was reached to 1.4 mA/g. Discharge was carried out with a lower limit voltage of 2.5 V at a constant current with a current density of 68.5 mA/g per active material weight.

Figure 22A:
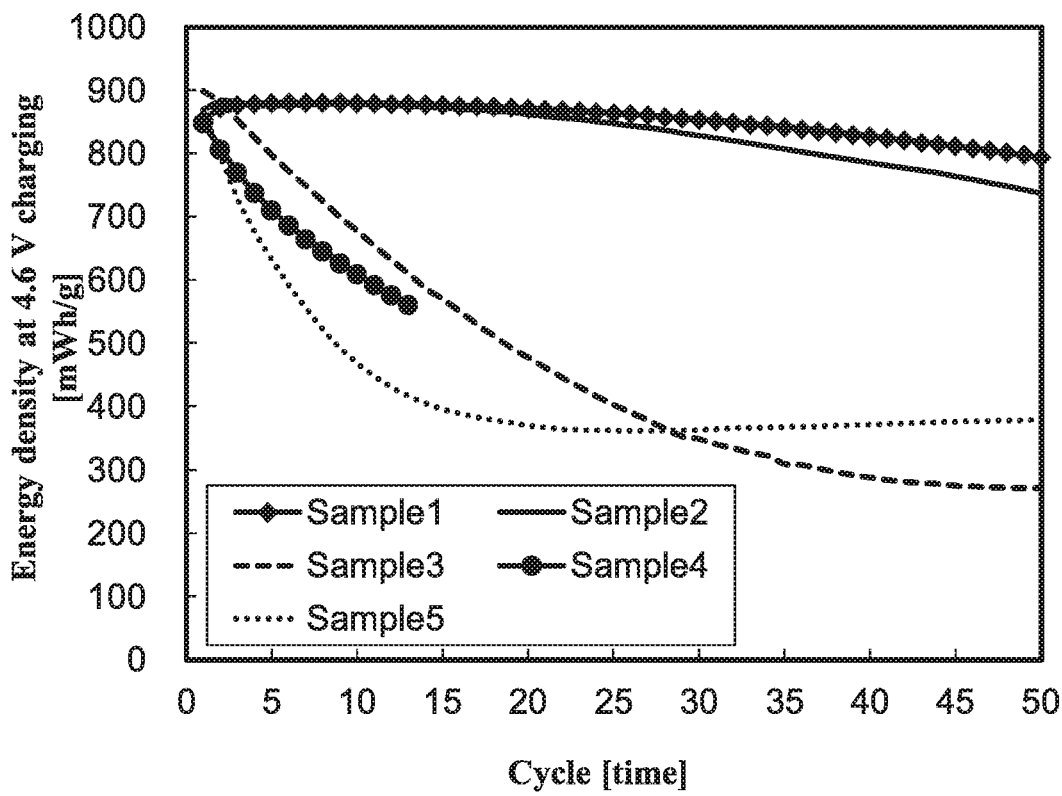
FIGS. 22A and 22B are each a graph showing cycle characteristics of a secondary battery containing a positive electrode active material in Example 1.
Figure 22B:
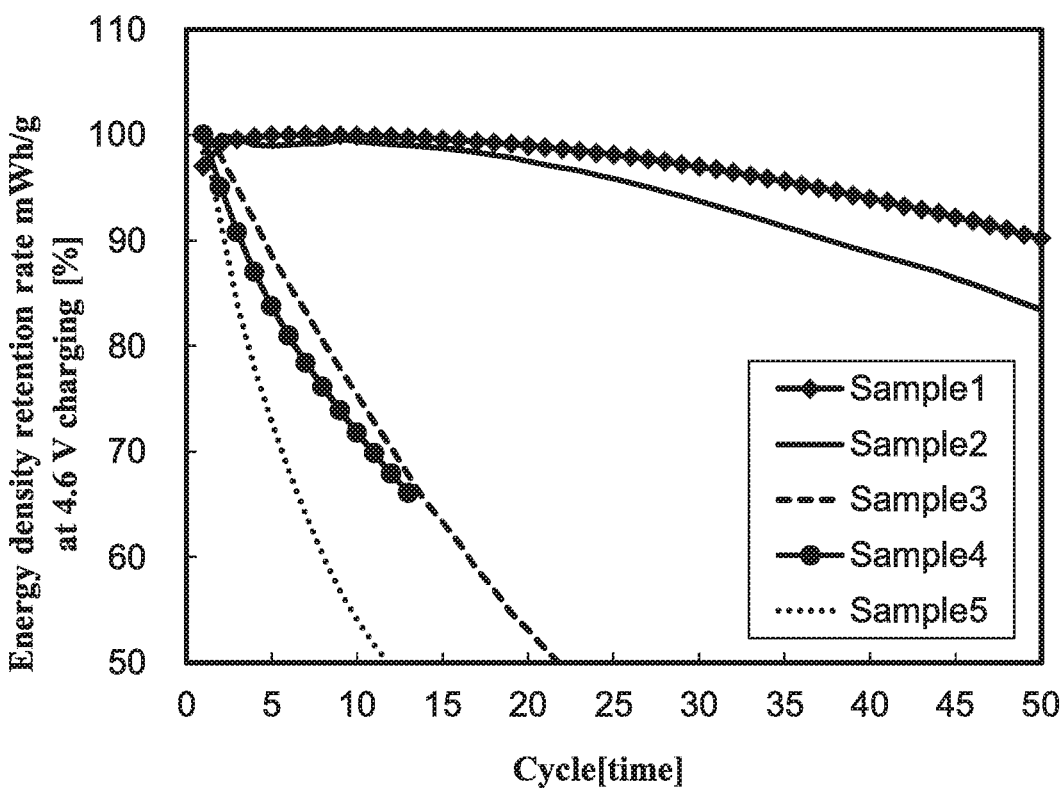

FIGS. 22A and 22B are graphs of cycle characteristics of the secondary batteries using the positive electrode active materials of the samples 1 to 5. FIG. 22A is a graph showing energy density at 4.6 V charging. FIG. 22B is a graph showing energy density retention rate at 4.6 V charging. The energy density corresponds to the product of the discharge capacity and the discharge average voltage. The energy density retention rate was obtained with the peak of energy density as 100%.

As is clear from FIGS. 22A and 22B, the cycle characteristics of the sample 4, which is a positive electrode active material including an aluminum-containing covering layer, were relatively better than those of the sample 5, which is lithium cobaltate not including a covering layer.

When the sample 2 and the sample 3 which are lithium cobaltate particles containing magnesium and fluorine were compared, the cycle characteristics of the sample 2 being heated was much better than those of the sample 3 not being heated. This is probably due to the effect of magnesium segregation on the superficial portion of the lithium cobaltate particle by heating.

The sample 1, which is the positive electrode active material including the aluminum-containing covering layer on the lithium cobaltate particle containing magnesium and fluorine, showed extremely favorable cycle characteristics, which exceeded those of the sample 2 in which magnesium was segregated on the superficial portion and those of the sample 4 including the aluminum-containing covering layer. It thus became clear that better cycle characteristics can be obtained from a sample including a covering layer containing both aluminum and magnesium than a sample including a covering layer containing only one of aluminum and magnesium.

Example 2

In this example, features of the lithium cobaltate particle having a covering layer containing aluminum and magnesium were disclosed.

<XPS>

XPS analysis was performed from the surface of the samples 1, 2, and 3 in Example 1. Also, XPS analysis was performed on a sample 6, which corresponds to a particle of the sample 1 in Example 1 which has been subjected to the sol-gel treatment and drying and has not been heated. The calculation results are shown in Table 2. Note that since the analysis results are rounded off to one decimal place, the total is not 100% in some cases.

TABLE 2

| Samples | Conditions | Quantitative values (atomic %) | | | | | | | | | |
|---|---|---|---|---|---|---|---|---|---|---|---|
| | | Li | Co | O | C | F | Mg | Al | Ca | Na | S | Total |
| Sample 1 | $LiCoO_2$ + Mg + F, Covered with Al-containing material, Heated | 10.0 | 14.1 | 47.3 | 5.8 | 7.1 | 12.0 | 0.2 | 1.5 | 1.1 | 1.0 | 100.1 |
| Sample 6 | $LiCoO_2$ + Mg + F, Covered with Al-containing material, Heated | 10.1 | 14.6 | 56.6 | 6.3 | 3.5 | 1.5 | 3.7 | 1.7 | 0.9 | 1.2 | 100.1 |
| Sample 2 | $LiCoO_2$ + Mg + F, Heated | 10.5 | 12.7 | 46.0 | 11.6 | 7.0 | 9.4 | 0.0 | 0.8 | 0.9 | 1.1 | 100.0 |
| Sample 3 | $LiCoO_2$ + Mg + F, Not Heated | 8.7 | 13.0 | 47.8 | 20.9 | 2.9 | 1.3 | 0.0 | 2.3 | 1.1 | 2.2 | 100.2 |

Table 3 shows atomic ratios calculated by taking the total amount of lithium, aluminum, cobalt, magnesium, oxygen, and fluorine as 100 atomic %, using the results in Table 2.

TABLE 3

| Samples | Conditions | Quantitative values (atomic %) | | | | | | |
|---|---|---|---|---|---|---|---|---|
| | | Li | Al | Co | Mg | O | F | Total |
| Sample 1 | $LiCoO_2$ + Mg + F, Covered with Al-containing material, Heated | 11.0 | 0.2 | 15.5 | 13.2 | 52.1 | 7.8 | 100.0 |
| Sample 6 | $LiCoO_2$ + Mg + F, Covered with Al-containing material, Heated | 11.2 | 4.1 | 16.2 | 1.7 | 62.9 | 3.9 | 100.0 |
| Sample 2 | $LiCoO_2$ + Mg + F, Heated | 12.3 | 0.0 | 14.8 | 11.0 | 53.7 | 8.2 | 100.0 |
| Sample 3 | $LiCoO_2$ + Mg + F, Not Heated | 11.8 | 0.0 | 17.6 | 1.8 | 64.9 | 3.9 | 100.0 |

XPS analysis can quantitatively analyze the positive electrode active material at a depth of about 5 nm from the surface. As shown in Table 2, in the sample 1 and the sample 2 which were heated positive electrode active materials, the atomic proportion of magnesium significantly increased compared with those in the sample 6 and the sample 3 which were not heated. That is, it was revealed that heating made magnesium segregate in the region at a depth of about 5 nm from the surface.

When the sample 1 and the sample 6 in each of which the covering layer containing aluminum was formed by the sol-gel method were compared, the atom proportion of aluminum was smaller in the sample 1 subjected to heating than in the sample 6 not subjected to heating. Therefore, it was inferred that heating made aluminum diffuse from the region at a depth of about 5 nm from the surface.

Therefore, it was inferred that in the sample 1 including a covering layer containing aluminum and magnesium, magnesium exists abundantly on the superficial portion and aluminum exists in a deeper region than magnesium.

<STEM-FFT>

Next, STEM observation results and FFT analysis results of the sample 1 are shown in FIGS. 23A to 23C and FIGS. 24A1 to 24B3.

Figure 23A:
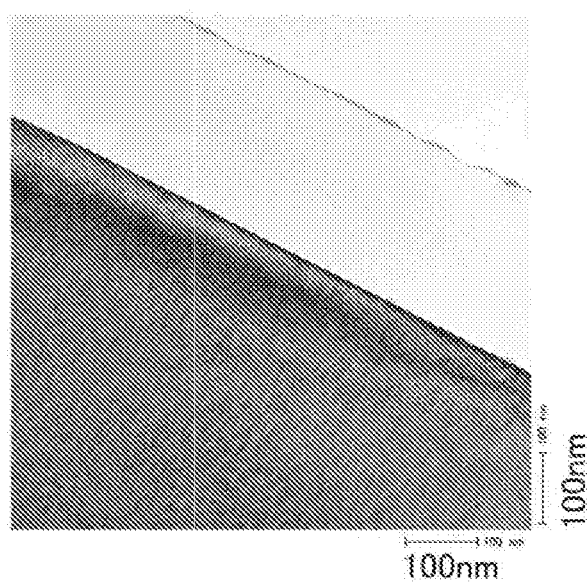
FIGS. 23A to 23C are STEM images of a positive electrode active material in Example 2.
Figure 23B:
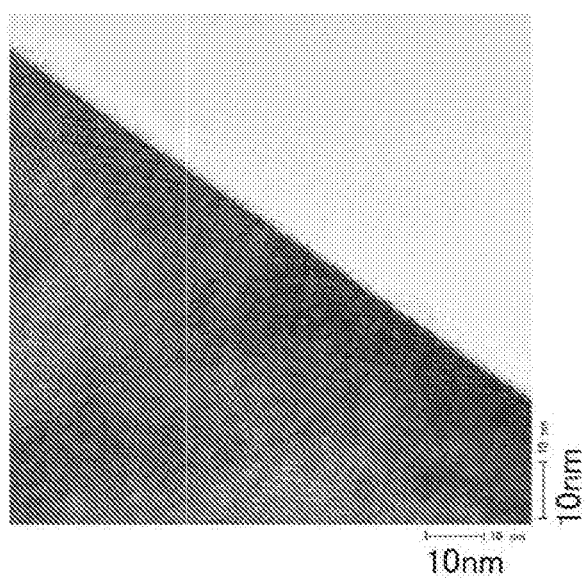
Figure 23C:
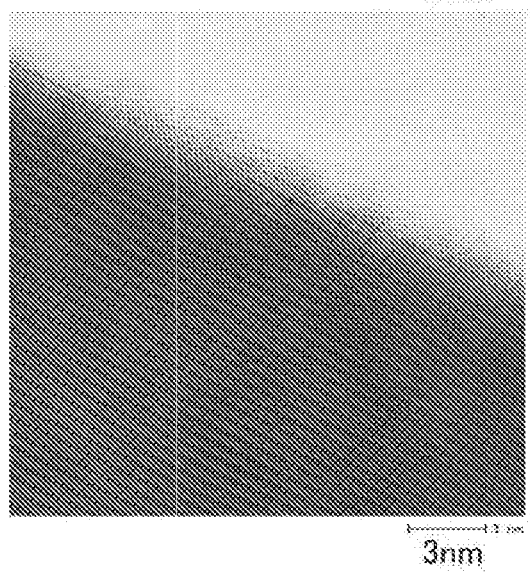

FIGS. 23A to 23C show bright-field STEM images of the cross section of the vicinity of the surface of the positive electrode active material of the sample 1. In FIG. 23C, it can be seen that elements which are assumed to be magnesium and which are observed to be brighter than the others are present in the superficial portion of the positive electrode active material particles. In the range observable in FIG. 23C, it was also observed that crystal orientations roughly coincided from the inside to the surface.

Figure 3B:
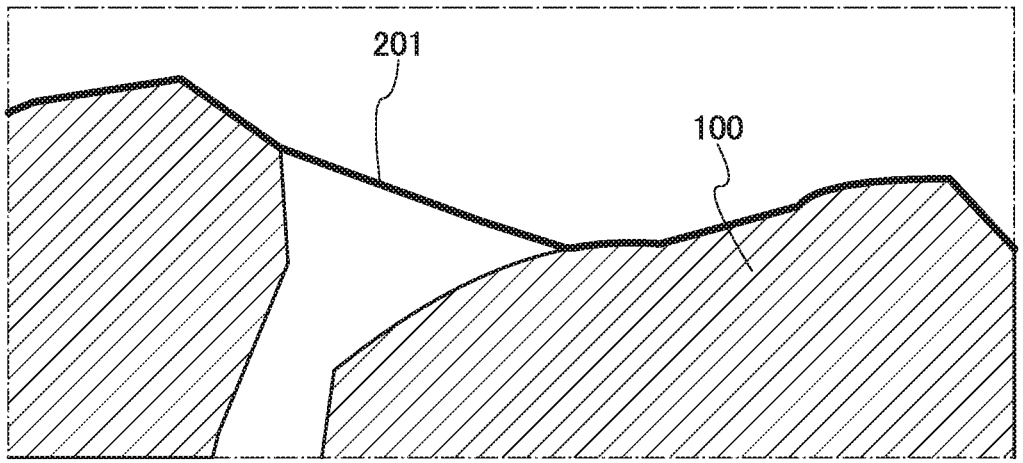

FIG. 24A1 is an HAADF-STEM image of the cross section of the vicinity of the surface of the positive electrode active material of the sample 1. FIG. 24A2 is an FFT (Fast Fourier Transform) image of the region indicated by FFT1 in FIG. 24A1. Some luminescent spots in the FFT image of FIG. 24A2 are referred to as A, B, C, and O as shown in FIG. 24A3.

Regarding the luminescent spots in the FFT image in the region indicated by FFT1, the measured values were as follows: d=0.25 nm for OA, d=0.16 nm for OB, d=0.26 nm for OC, ∠AOB=37°, ∠BOC=36°, and ∠AOC=73°.

They are close to the distance and angle obtained from magnesium oxide (MgO) data (ICDD 45-0945) and cobalt oxide (CoO) data (ICDD 48-1719) in the International Centre for Diffraction Data (ICDD) database.

In the magnesium oxide, d=0.24 nm for OA(1-11), d=0.15 nm for OB(0-22), d=0.24 nm for OC(-1-11), ∠AOB=35°, ∠BOC=35°, and ∠AOC=71°.

In the cobalt oxide, d=0.25 nm for OA(1-11), d=0.15 nm for OB(0-22), d=0.25 nm for OC(-1-11), ∠AOB=35°, ∠BOC=35°, and ∠AOC=71°.

Therefore, it became clear that the region of about 2 nm in depth from the surface of the positive electrode active material particle, which was indicated by FFT1, was a region having a rock-salt crystal structure and was an image of [011] incidence. It was also inferred that the region indicated by FFT1 contained either one or both of magnesium oxide and cobalt oxide.

FIG. 24B1 is a HAADF-STEM image of the cross section of the vicinity of the surface of positive electrode active material as the same image as FIG. 24A1. FIG. 24B2 is an FFT image of the region indicated by FFT2 in FIG. 24B1. Some luminescent spots in the FFT image of FIG. 24B2 are referred to as A, B, C, and O as shown in FIG. 24B3.

Regarding the luminescent spots in the region indicated by FFT2 in the FFT image, the measurement values were as follows: d=0.51 nm for OA, d=0.21 nm for OB, and d=0.25 nm for OC, ∠AOB=55°, ∠BOC=24°, and ∠AOC=79°.

They are close to the distance and angle obtained from lithium cobaltate ($LiCoO_2$) data (ICDD 50-0653) and $LiAl_{0.2}Co_{0.8}O_2$ data (ICDD 89-0912) in the ICDD database.

In the lithium cobaltate ($LiCoO_2$), d=0.47 nm for OA(003), d=0.20 nm for OB(104), d=0.24 nm for OC(101), ∠AOB=55°, ∠BOC=25°, and ∠AOC=80°.

In the $LiAl_{0.2}Co_{0.8}O_2$, d=0.47 nm for OA(003), d=0.20 nm for OB(104), d=0.24 nm for OC(101), ∠AOB=55°, ∠BOC=25°, and ∠AOC=80°.

Therefore, it became clear that the region at a depth of more than 3 nm and less than or equal to 6 nm from the surface of the positive electrode active material, which was indicated by FFT2, was a region having the same layered rock-salt crystal structure as the lithium cobaltate and $LiAl_{0.2}Co_{0.8}O_2$ and was an image of [0-10] incidence.

<STEM-EDX (Element Mapping, Line Analysis)>

Next, EDX analysis results of the sample 1 are shown in FIGS. 25A1 to 25C and FIGS. 26A to 26C.

Figures 1, 25A:
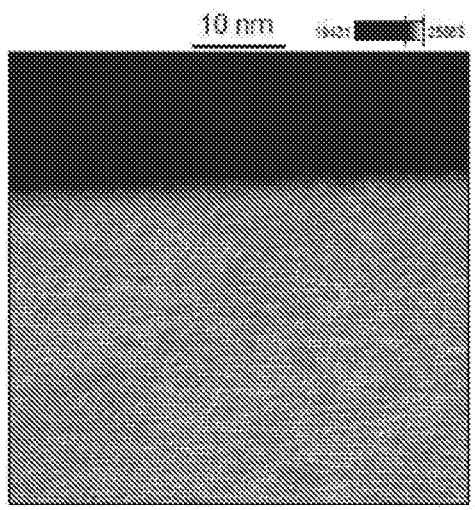
Figures 2, 25A:
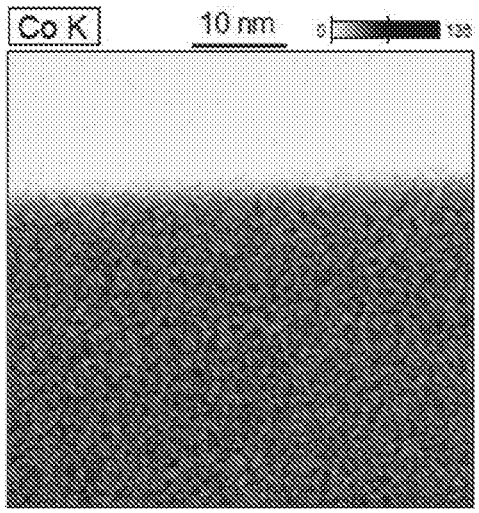
Figures 1, 25B:
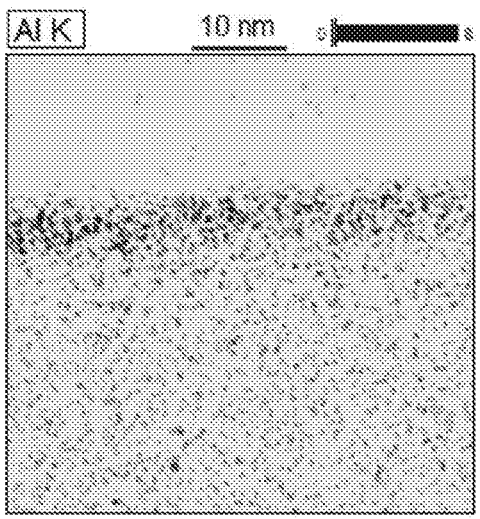
Figures 2, 25B:
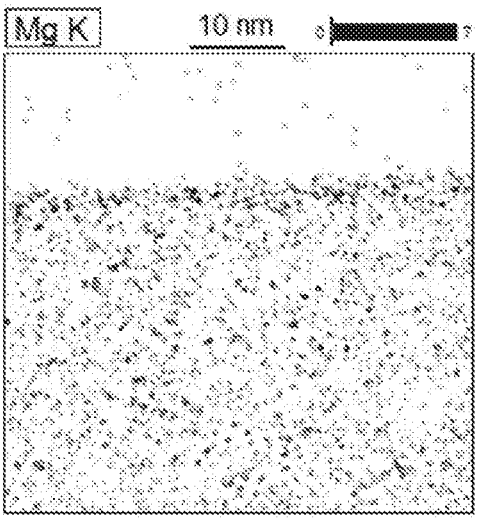
FIG. 2 shows an example of a manufacturing method of a positive electrode active material.
Figure 25C:
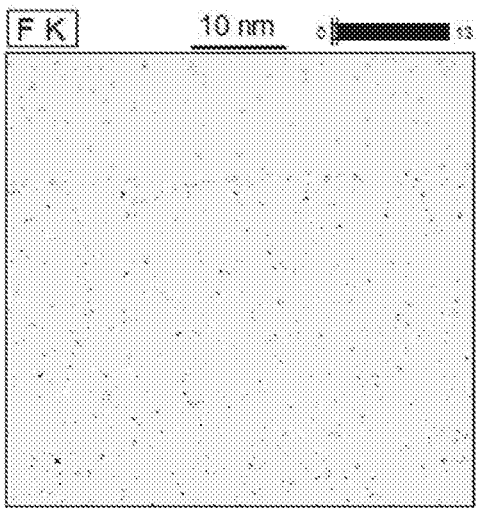

FIGS. 25A1 to 25C show STEM-EDX analysis results of the vicinity of the surface of the positive electrode active material of the sample 1. FIG. 25A1 is a HAADF-STEM image. FIG. 25A2 shows a cobalt mapping. FIG. 25B1 shows an aluminum mapping. FIG. 25B2 shows a magnesium mapping. FIG. 25C shows a fluorine mapping.

As shown in FIG. 25B1, it was observed that aluminum distributed in the region at a depth of about 10 nm from the surface of the positive electrode active material. As shown in FIG. 25B2, it was observed that magnesium segregated in the region at a depth of about 3 nm from the surface of the positive electrode active material. As shown in FIG. 25C, fluorine was hardly detected in the vicinity of the surface. This is probably because fluorine, which is a light-weight element, is difficult to detect with EDX.

Figure 26A:
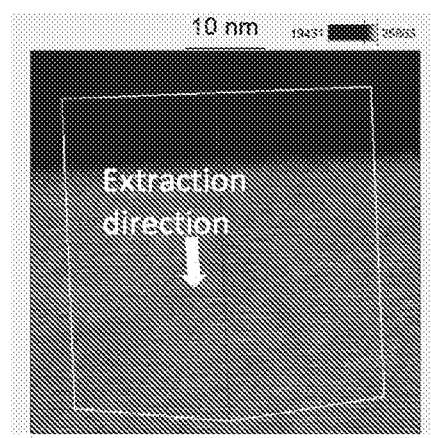
FIGS. 26A to 26C an STEM image and EDX line analysis of a positive electrode active material in Example 2.
Figure 26B:
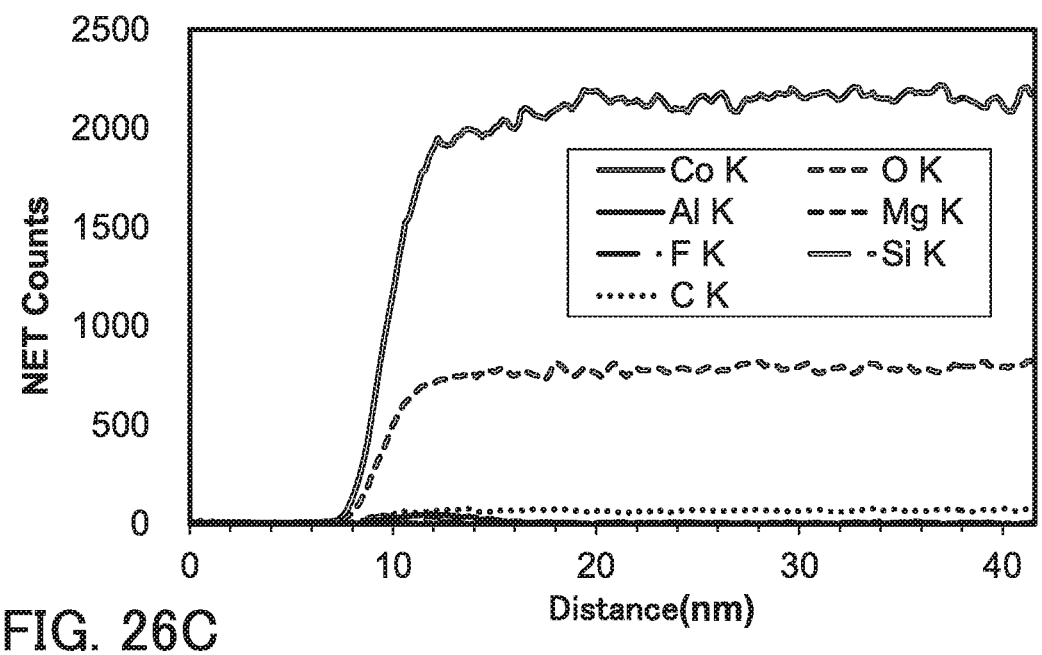
Figure 26C:
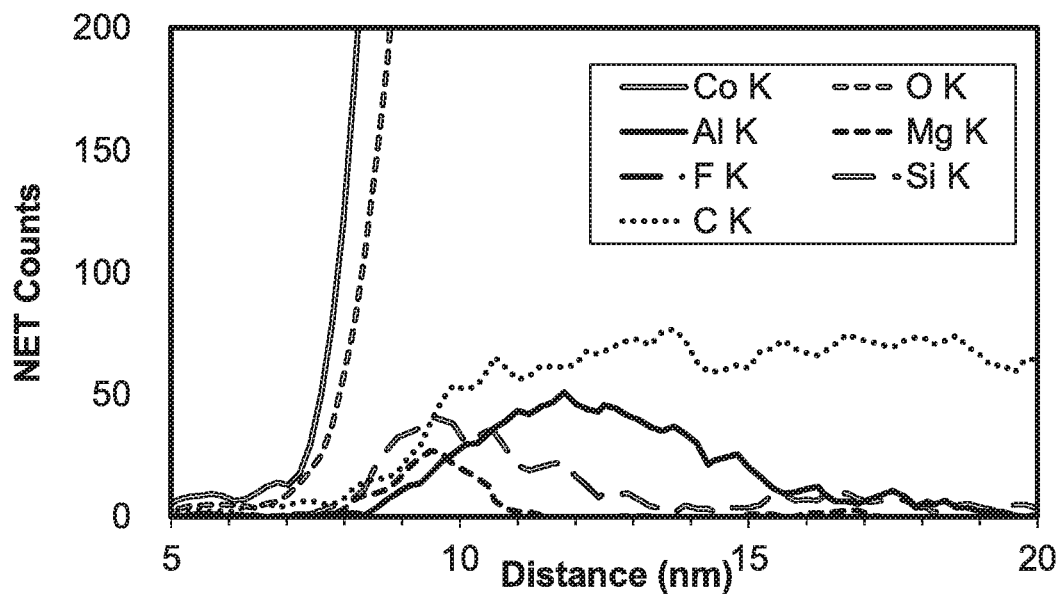

FIGS. 26A to 26C are STEM-EDX line analysis results of the cross section in the vicinity of the surface of the positive electrode active material of the sample 1. FIG. 26A is an HAADF-STEM image. FIG. 26A is a graph showing the results of EDX line analysis in the direction indicated by the white arrow for the region surrounded by the white line in FIG. 26A. FIG. 26C is a graph enlarging a part of FIG. 26B. Note that fluorine was hardly detected also in FIGS. 26A to 26C.

As shown in FIG. 26C, it was found that there were peaks of magnesium and aluminum in the vicinity of the surface of the positive electrode active material of the sample 1, the distribution of magnesium was closer to the surface than the distribution of aluminum is. It was also found that the peak of magnesium was closer to the surface than the peak of aluminum is. In addition, it is probable that cobalt and oxygen are present from the outermost surface of the positive electrode active material particle.

From the above XPS and EDX analysis results, it is found that the sample 1 is a positive electrode active material, which is one embodiment of the present invention, including a first region containing lithium cobaltate, a second region containing lithium, aluminum, cobalt, and oxygen, and a third region containing magnesium and oxygen. It becomes clear that, in the sample 1, part of the second region and part of the third region overlap with each other.

In the graph of FIG. 26B, the amount of detected oxygen is stable at a distance of 11 nm or more. Thus, in this example, the average value $O_{ave}$ of the amount of detected oxygen in the stable region is obtained, and a distance x at the measurement point at which the measurement value closest to 0.5 $O_{ave}$ (the value of 50% of the average value $O_{ave}$) is obtained is assumed to be the outermost surface of the positive electrode active material particle.

In this example, the average value $O_{ave}$ of the amount of detected oxygen in a distance range from 11 nm to 40 nm was 777. The x axis of the measurement point at which the measurement value closest to 388.5, which is 50% of 777, was obtained indicated a distance of 9.5 nm. Thus, in this example, a distance of 9.5 nm in the graph of FIG. 26B is assumed to be the outermost surface of the positive electrode active material particle.

When the outermost surface of the positive electrode active material particle is set at a distance of 9.5 nm, the peak of magnesium agrees with the outermost surface, and the peak of aluminum is present at 2.3 nm in distance from the outermost surface. From the above results of Example 1 and Example 2, it was found that the positive electrode active material of one embodiment of the present invention in which lithium cobaltate is included in the first region 101, lithium, aluminum, cobalt, and oxygen are included in the second region 102, and magnesium and oxygen are included in the third region 103 can obtain extremely favorable cycle characteristics when used for a secondary battery.

This application is based on Japanese Patent Application serial no. 2016-225046 filed with Japan Patent Office on Nov. 18, 2016, the entire contents of which are hereby incorporated by reference.

What is claimed is:

1. A lithium-ion secondary battery comprising:
a positive electrode comprising a positive electrode active material,
wherein the positive electrode active material comprises a first region, a second region, and a third region,
wherein the first region comprises a layered rock-salt crystal structure,
wherein the third region comprises a rock-salt crystal structure,
wherein the second region covers at least a part of the first region,
wherein the third region covers at least a part of the second region,
wherein at least the part of the second region covered by the third region comprises a layered rock-salt crystal structure,
wherein the first region comprises lithium cobaltate,
wherein the second region comprises aluminum and oxygen,
wherein the third region comprises magnesium and oxygen,
wherein a crystal orientation of the rock-salt crystal structure of the third region is substantially aligned with a crystal orientation of the layered rock-salt crystal structure of at least the part of the second region covered by the third region,
wherein the positive electrode active material includes a crystal defect in the positive electrode active material, the crystal defect being observable from a TEM image,
wherein the crystal defect includes magnesium, and wherein a distribution of aluminum comprises a region existing deeper from a surface of the positive electrode active material than a distribution of magnesium, and wherein the positive electrode active material is free of at least one of intentionally added nickel and manganese.

2. The lithium-ion secondary battery according to claim 1, wherein the crystal defect exists in the first region of the positive electrode active material.

3. The lithium-ion secondary battery according to claim 1, wherein a maximum peak of a concentration of the magnesium is positioned closer to a surface of the positive electrode active material than a maximum peak of a concentration of the aluminum in line analysis of energy dispersive X-ray spectrometry.

4. The lithium-ion secondary battery according to claim 1, wherein the crystal defect includes aluminum.

5. A lithium-ion secondary battery comprising:
a positive electrode comprising a positive electrode active material,
wherein the positive electrode active material comprises a first region, a second region, and a third region,
wherein the first region comprises a layered rock-salt crystal structure,
wherein the third region comprises a rock-salt crystal structure,
wherein the second region covers at least a part of the first region,
wherein the third region covers at least a part of the second region,
wherein at least the part of the second region covered by the third region comprises a layered rock-salt crystal structure,
wherein the first region comprises lithium cobaltate,
wherein the second region comprises aluminum and oxygen,
wherein the third region comprises magnesium and oxygen,
wherein a crystal orientation of the rock-salt crystal structure of the third region is substantially aligned with a crystal orientation of the layered rock-salt crystal structure of at least the part of the second region covered by the third region,
wherein the positive electrode active material includes a crystal defect in the positive electrode active material, the crystal defect being observable from a TEM image,
wherein the positive electrode active material is free of at least one of intentionally added nickel and manganese,
wherein a distribution of aluminum comprises a region existing deeper from a surface of the positive electrode active material than a distribution of magnesium, and
wherein a depth at which a concentration of the magnesium becomes $1/5$ of a peak of the concentration of the magnesium is 2 nm to 5 nm from the surface of the positive electrode active material in line analysis of energy dispersive X-ray spectrometry.

* * * * *